(12) United States Patent
Komasaki et al.

(10) Patent No.: US 8,589,105 B2
(45) Date of Patent: Nov. 19, 2013

(54) ROTATING FIELD SENSOR

(75) Inventors: Yosuke Komasaki, Tokyo (JP); Hiraku Hirabayashi, Tokyo (JP)

(73) Assignee: TDK Corporation, Tokyo (JP)

( * ) Notice: Subject to any disclaimer, the term of this patent is extended or adjusted under 35 U.S.C. 154(b) by 347 days.

(21) Appl. No.: 13/187,942

(22) Filed: Jul. 21, 2011

(65) Prior Publication Data

US 2012/0095712 A1   Apr. 19, 2012

(30) Foreign Application Priority Data

Oct. 13, 2010 (JP) ................. 2010-230578

(51) Int. Cl.
*G01R 35/00* (2006.01)
*G01B 7/30* (2006.01)

(52) U.S. Cl.
USPC ........... 702/94; 324/207.21; 702/90; 702/151

(58) Field of Classification Search
USPC ................. 702/90, 92, 93, 94, 115, 150, 151; 324/207.21, 207.25; 360/315; 365/173
See application file for complete search history.

(56) References Cited

U.S. PATENT DOCUMENTS

| | | | |
|---|---|---|---|
| 5,216,363 A | 6/1993 | Masaaki | |
| 5,363,034 A | 11/1994 | Tada et al. | |
| 6,465,053 B1 | 10/2002 | Lenssen et al. | |
| 6,501,678 B1 | 12/2002 | Lenssen et al. | |
| 6,633,462 B2 | 10/2003 | Adelerhof | |
| 6,943,544 B2 | 9/2005 | Waffenschmidt | |
| 8,058,866 B2 * | 11/2011 | Granig et al. | 324/207.21 |
| 2006/0214656 A1 * | 9/2006 | Sudo et al. | 324/207.21 |
| 2009/0206827 A1 | 8/2009 | Aimuta et al. | |

FOREIGN PATENT DOCUMENTS

| | | |
|---|---|---|
| JP | B2-2787783 | 8/1998 |
| JP | B2-2990822 | 12/1999 |
| JP | A-2003-502674 | 1/2003 |
| JP | A-2003-502876 | 1/2003 |
| JP | A-2003-65795 | 3/2003 |
| JP | A-2004-504713 | 2/2004 |
| JP | A-2009-25319 | 2/2009 |
| JP | B2-4273363 | 6/2009 |

* cited by examiner

*Primary Examiner* — John H Le
(74) *Attorney, Agent, or Firm* — Oliff & Berridge, PLC

(57) ABSTRACT

An angle detection unit including first to third arithmetic units receives first and second signals that are associated with intensities of components of a rotating magnetic field in mutually different directions. The first arithmetic unit generates a sum of squares signal made up of the sum of squares of the first and second signals. Based on the sum of squares signal, the second arithmetic unit calculates a first error component estimate which is an estimated value of a first error component included in the first signal and a second error component estimate which is an estimated value of a second error component included in the second signal. The third arithmetic unit generates a first corrected signal by subtracting the first error component estimate from the first signal, generates a second corrected signal by subtracting the second error component estimate from the second signal, and calculates a detected angle value based on the first and second corrected signals.

17 Claims, 27 Drawing Sheets

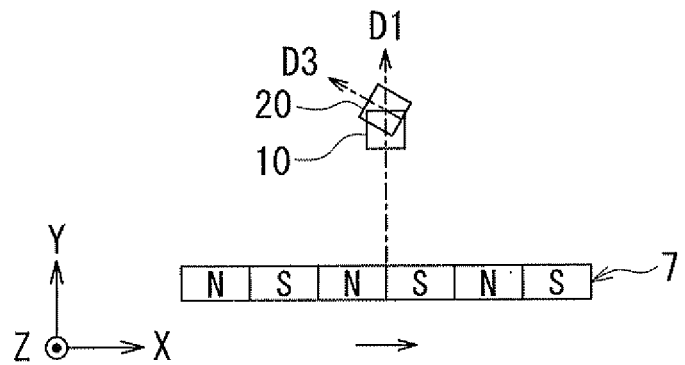
F I G. 25
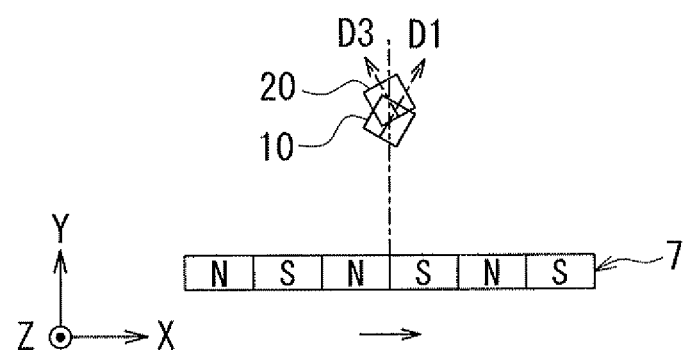
F I G. 26

ROTATING FIELD SENSOR

BACKGROUND OF THE INVENTION

1. Field of the Invention

The present invention relates to a rotating field sensor for detecting an angle that the direction of a rotating magnetic field forms with respect to a reference direction.

2. Description of the Related Art

In recent years, rotating field sensors have been widely used to detect the rotational position of an object in various applications such as detecting the rotational position of an automotive steering wheel. Rotating field sensors are used not only to detect the rotational position of an object but also to detect a linear displacement of an object. Systems using rotating field sensors are typically provided with means (for example, a magnet) for generating a rotating magnetic field whose direction rotates in conjunction with the rotation or linear movement of the object. The rotating field sensors use magnetic detection elements to detect the angle that the direction of the rotating magnetic field forms with respect to a reference direction. The rotational position or linear displacement of the object is thus detected.

There has been known a rotating field sensor that has two bridge circuits (Wheatstone bridge circuits) as shown in U.S. Pat. Nos. 6,943,544 B2, 6,633,462 B2, and U.S. Patent Application Publication No. 2009/0206827 A1. In such a rotating field sensor, each of the two bridge circuits includes four magnetoresistive elements (hereinafter referred to as MR elements) serving as magnetic detection elements. Each of the bridge circuits detects the intensity of a component of the rotating magnetic field in one direction, and outputs a signal that indicates the intensity. The output signals of the two bridge circuits differ in phase by ¼ the period of the output signals of the bridge circuits. The angle that the direction of the rotating magnetic field forms with respect to a reference direction is calculated based on the output signals of the two bridge circuits.

In a rotating field sensor that uses MR elements as the magnetic detection elements, the waveforms of the output signals of the MR elements corresponding to the resistance values ideally trace a sinusoidal curve (including a sine waveform and a cosine waveform) as the direction of the rotating magnetic field rotates. However, it is known that the waveforms of the output signals of the MR elements can be distorted from a sinusoidal curve, as described in U.S. Pat. No. 6,633,462 B2. If the waveforms of the output signals of the MR elements are distorted, the angle detected by the rotating field sensor may include some error. One of the causes of the distortion of the output signal waveforms of the MR elements is the MR elements themselves.

A description will now be given of an example in which the output signal waveform of an MR element is distorted due to the MR element itself. Here, assume that the MR element is a giant magnetoresistive (GMR) element or a tunneling magnetoresistive (TMR) element. The GMR or TMR element includes a magnetization pinned layer whose direction of magnetization is pinned, a free layer whose direction of magnetization varies according to the direction of the rotating magnetic field, and a nonmagnetic layer disposed between the magnetization pinned layer and the free layer. Examples of the situation where the output signal waveform of an MR element is distorted due to the MR element itself include the case where the free layer has an induced magnetic anisotropy. The induced magnetic anisotropy of the free layer occurs, for example, when the rotating field sensor is installed at a predetermined location and thereafter the location of installation of the rotating field sensor including the MR element once increases and then decreases in temperature with an external magnetic field kept applied to the MR element in a specific direction. If the free layer has an induced magnetic anisotropy, the direction of magnetization of the free layer cannot accurately follow the direction of the rotating magnetic field. As a result, the output signal waveform of the MR element is distorted from a sinusoidal curve.

U.S. Pat. No. 6,633,462 B2 discloses a magnetoresistive sensor including a main sensing element having a main reference magnetization axis, and two correction sensing elements having their respective reference magnetization axes inclined with respect to the main reference magnetization axis. The two correction sensing elements are electrically connected to the main sensing element to correct the detected angle. The technology disclosed in U.S. Pat. No. 6,633,462 B2 is useful for reducing an error signal included in the output signal of the main sensing element if any relationship between the phase of the error signal and the phase of an ideal output signal of the main sensing element is known in the design stage of the sensor.

However, if there occurs an induced magnetic anisotropy of the free layer after the installation of the rotating field sensor as described above, the induced magnetic anisotropy causes the direction of easy magnetization to be oriented in an arbitrary direction. Therefore, in this case, the relationship between the phase of an error component included in an output signal of an MR element and the phase of an ideal output signal of the MR element is not constant, and thus cannot be known in the design stage of the rotating field sensor. For this reason, the technology disclosed in U.S. Pat. No. 6,633,462 B2 is not applicable to the case where there occurs an induced magnetic anisotropy of the free layer after the installation of the rotating field sensor.

The foregoing descriptions have dealt with a rotating field sensor that employs MR elements as magnetic detection elements, especially focusing on the problem of an error component having an arbitrary phase due to the occurrence of an induced magnetic anisotropy of the free layer after the installation of the rotating field sensor. However, this problem holds true for all cases where, in a rotating field sensor that includes at least one magnetic detection element and detects an angle that the direction of a rotating magnetic field forms with respect to a reference direction, an error component included in the output signal of the magnetic detection element has an arbitrary phase.

OBJECT AND SUMMARY OF THE INVENTION

It is an object of the present invention to provide a rotating field sensor that includes at least one magnetic detection element and detects an angle that the direction of a rotating magnetic field forms with respect to a reference direction, the rotating field sensor being capable of reducing an error in the detected angle even when an error component included in the output signal of the magnetic detection element has an arbitrary phase.

A rotating field sensor of the present invention detects an angle that the direction of a rotating magnetic field in a reference position forms with respect to a reference direction. The rotating field sensor includes a signal generation unit and an angle detection unit. The signal generation unit includes a plurality of magnetic detection elements for detecting the rotating magnetic field, and generates a first signal and a second signal based on output signals of the plurality of magnetic detection elements. The first and second signals are associated with intensities of components of the rotating magnetic field in mutually different directions. The angle detection unit calculates, based on the first and second signals generated by the signal generation unit, a detected angle value that has a correspondence relationship with the angle that the direction of the rotating magnetic field in the reference position forms with respect to the reference direction. The first signal includes a first ideal component and a first error component. The second signal includes a second ideal component and a second error component. The first ideal component and the second ideal component vary periodically with the same signal period in an ideal sinusoidal manner. The second ideal component differs from the first ideal component in phase. The sum of the square of the first ideal component and the square of the second ideal component takes on a constant value. The first error component and the second error component vary in synchronization with each other, each with a period of ⅓ the signal period.

The angle detection unit includes a first, a second, and a third arithmetic unit. The first arithmetic unit generates a sum of squares signal that is made up of the sum of the square of the first signal and the square of the second signal and that has a period of ½ the signal period. Based on the sum of squares signal, the second arithmetic unit calculates a first error component estimate which is an estimated value of the first error component, and a second error component estimate which is an estimated value of the second error component. The third arithmetic unit generates a first corrected signal by subtracting the first error component estimate from the first signal, generates a second corrected signal by subtracting the second error component estimate from the second signal, and calculates the detected angle value based on the first and second corrected signals.

In the rotating field sensor of the present invention, the signal generation unit generates the first and second signals that are associated with the intensities of components of the rotating magnetic field in mutually different directions. The angle detection unit calculates the detected angle value based on the first and second signals. In the angle detection unit, the first arithmetic unit generates a sum of squares signal that is made up of the sum of the square of the first signal and the square of the second signal and that has a period of ½ the signal period. If the first signal does not include the first error component and the second signal does not include the second error component, then the sum of squares signal is equal to the sum of the square of the first ideal component and the square of the second ideal component, and takes on a constant value. In contrast, with the first and second error components included in the first and second signals, respectively, the sum of squares signal varies with a period of ½ the signal period. The amplitude and the initial phase of the sum of squares signal depend on the amplitude and the initial phase of the first and second error components. Taking advantage of this property, in the present invention, the second arithmetic unit calculates the first error component estimate and the second error component estimate based on the sum of squares signal. The third arithmetic unit subtracts the first error component estimate from the first signal to generate the first corrected signal, and subtracts the second error component estimate from the second signal to generate the second corrected signal. The third arithmetic unit then calculates the detected angle value based on the first and second corrected signals. Consequently, according to the present invention, it is possible to reduce an error in the detected angle even when the error component included in the output signal of a magnetic detection element has an arbitrary phase.

In the rotating field sensor of the present invention, the first arithmetic unit may calculate a temporary detected angle value based on the first and second signals, and may express the sum of squares signal as a function of the temporary detected angle value. The second arithmetic unit may detect the amplitude of the sum of squares signal and the initial phase of the sum of squares signal expressed as the function of the temporary detected angle value. Then, the second arithmetic unit may calculate the first and second error component estimates using the amplitude and the initial phase of the sum of squares signal and the temporary detected angle value. In this case, the temporary detected angle value may be calculated as atan(S1/S2), where S1 and S2 represent the first and second signals, respectively. The sum of squares signal may be expressed as $1+Ft^2+2Ft\cdot\cos(2\theta t+\phi t)$, the first error component estimate may be calculated as $Ft\cdot\sin(3\theta t+\phi t)$, and the second error component estimate may be calculated as $Ft\cdot\cos(3\theta t+\phi t)$, where $\theta t$ represents the temporary detected angle value, $2Ft$ represents the amplitude of the sum of squares signal, and $\phi t$ represents the initial phase of the sum of squares signal.

In the rotating field sensor of the present invention, the signal generation unit may include a first detection circuit and a second detection circuit that detect the intensities of the components of the rotating magnetic field in mutually different directions and output respective signals indicating the intensities. Each of the first and second detection circuits includes at least one magnetic detection element. The output signals of the first and second detection circuits vary periodically with the signal period. The output signal of the second detection circuit differs from the output signal of the first detection circuit in phase by an odd number of times ¼ the signal period. The first signal is generated based on the output signal of the first detection circuit, and the second signal is generated based on the output signal of the second detection circuit.

Each of the first and second detection circuits may include, as the at least one magnetic detection element, a pair of magnetic detection elements connected in series. In this case, each of the first and second detection circuits may have a Wheatstone bridge circuit that includes a first pair of magnetic detection elements connected in series and a second pair of magnetic detection elements connected in series. The magnetic detection elements may be magnetoresistive elements. Each of the magnetoresistive elements may have a magnetization pinned layer whose direction of magnetization is pinned, a free layer whose direction of magnetization varies according to the direction of the rotating magnetic field, and a nonmagnetic layer disposed between the magnetization pinned layer and the free layer. The directions of magnetization of the magnetization pinned layers of the magnetoresistive elements in the second detection circuit may be orthogonal to those of the magnetization pinned layers of the magnetoresistive elements in the first detection circuit.

In the rotating field sensor of the present invention, the signal generation unit may include a first detection unit that detects the rotating magnetic field in a first position, and a second detection unit that detects the rotating magnetic field in a second position. The first detection unit has a first detection circuit that detects the intensity of a component of the rotating magnetic field in a first direction and outputs a signal indicating the intensity, and a second detection circuit that detects the intensity of a component of the rotating magnetic field in a second direction and outputs a signal indicating the intensity. The second detection unit has a third detection circuit that detects the intensity of a component of the rotating magnetic field in a third direction and outputs a signal indicating the intensity, and a fourth detection circuit that detects the intensity of a component of the rotating magnetic field in a fourth direction and outputs a signal indicating the intensity. Each of the first to fourth detection circuits includes at least one magnetic detection element. The output signals of the first to fourth detection circuits vary periodically with the signal period. The output signal of the third detection circuit differs from the output signal of the first detection circuit in phase. The output signal of the fourth detection circuit differs from the output signal of the second detection circuit in phase. The output signals of the first to fourth detection circuits may include respective third error components that vary in synchronization with the output signals of the first to fourth detection circuits, respectively, each with a period of ⅓ the signal period. The signal generation unit may further include a first arithmetic circuit that generates the first signal based on the output signals of the first and third detection circuits, and a second arithmetic circuit that generates the second signal based on the output signals of the second and fourth detection circuits. The first signal has a correspondence relationship with both the intensity of the component of the rotating magnetic field in the first direction and the intensity of the component of the rotating magnetic field in the third direction. The first signal includes a smaller third error component than the third error components included in the output signals of the first and third detection circuits. The second signal has a correspondence relationship with both the intensity of the component of the rotating magnetic field in the second direction and the intensity of the component of the rotating magnetic field in the fourth direction. The second signal includes a smaller third error component than the third error components included in the output signals of the second and fourth detection circuits.

Where the output signals of the first to fourth detection circuits include the respective third error components in the foregoing configuration, the first arithmetic circuit generates the first signal that includes a smaller third error components than the third error components included in the output signals of the first and third detection circuits, and the second arithmetic circuit generates the second signal that includes a smaller third error component than the third error components included in the output signals of the second and fourth detection circuits. This makes it possible to reduce an error in the angle detected by the rotating field sensor resulting from the third error components. As used herein, the phrase "a smaller third error component" means that the ratio of the amplitude of the third error component to the amplitude of the signal is lower.

The first and second arithmetic circuits may generate the first and second signals that are normalized to have the same amplitude.

Preferably, the output signal of the second detection circuit differs from the output signal of the first detection circuit in phase by an odd number of times ¼ the signal period. Preferably, the output signal of the third detection circuit differs from the output signal of the first detection circuit in phase by an integer multiple of ⅙ the signal period other than an integer multiple of ½ the signal period. Also preferably, the output signal of the fourth detection circuit differs from the output signal of the third detection circuit in phase by an odd number of times ¼ the signal period.

Each of the first to fourth detection circuits may include, as the at least one magnetic detection element, a pair of magnetic detection elements connected in series. In this case, each of the first to fourth detection circuits may have a Wheatstone bridge circuit that includes a first pair of magnetic detection elements connected in series and a second pair of magnetic detection elements connected in series. The magnetic detection elements may be magnetoresistive elements. Each of the magnetoresistive elements may have a magnetization pinned layer whose direction of magnetization is pinned, a free layer whose direction of magnetization varies according to the direction of the rotating magnetic field, and a nonmagnetic layer disposed between the magnetization pinned layer and the free layer. The directions of magnetization of the magnetization pinned layers of the magnetoresistive elements in the second detection circuit may be orthogonal to those of the magnetization pinned layers of the magnetoresistive elements in the first detection circuit. The directions of magnetization of the magnetization pinned layers of the magnetoresistive elements in the fourth detection circuit may be orthogonal to those of the magnetization pinned layers of the magnetoresistive elements in the third detection circuit.

According to the rotating field sensor of the present invention, the signal generation unit generates the first and second signals that are associated with the intensities of components of the rotating magnetic field in mutually different directions, and the angle detection unit calculates the detected angle value based on the first and second signals. In the angle detection unit, the first arithmetic unit generates the sum of squares signal that is made up of the sum of the square of the first signal and the square of the second signal and that has a period of ½ the signal period. The second arithmetic unit calculates the first error component estimate and the second error component estimate based on the sum of squares signal. The third arithmetic unit generates the first corrected signal by subtracting the first error component estimate from the first signal, and generates the second corrected signal by subtracting the second error component estimate from the second signal. Based on the first and second corrected signals, the third arithmetic unit calculates the detected angle value. Consequently, according to the present invention, it is possible to reduce an error in the detected angle even when the error component included in the output signal of a magnetic detection element has an arbitrary phase.

Other and further objects, features and advantages of the present invention will appear more fully from the following description.

BRIEF DESCRIPTION OF THE DRAWINGS

FIG. 25 is an explanatory diagram showing the configuration of a rotating field sensor of a second modification example of the second embodiment of the invention.

FIG. 26 is an explanatory diagram showing the configuration of a rotating field sensor of a third modification example of the second embodiment of the invention.

DETAILED DESCRIPTION OF THE PREFERRED EMBODIMENTS

[First Embodiment]

Figure 1:
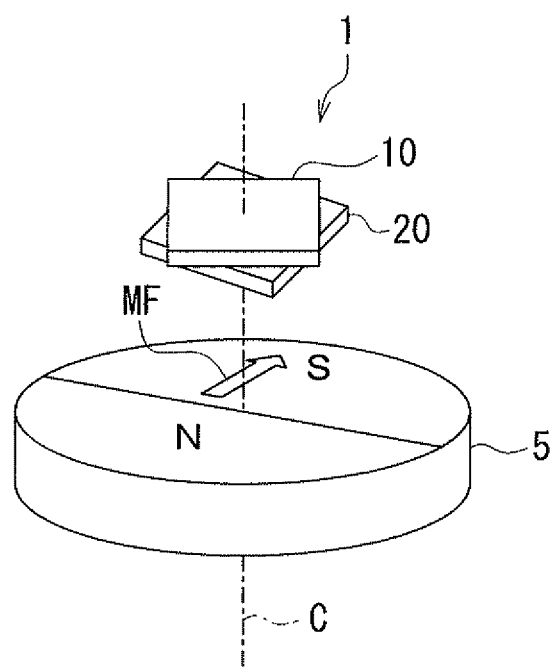
FIG. 1 is a perspective view showing the general configuration of a rotating field sensor according to a first embodiment of the invention.
Figure 2:
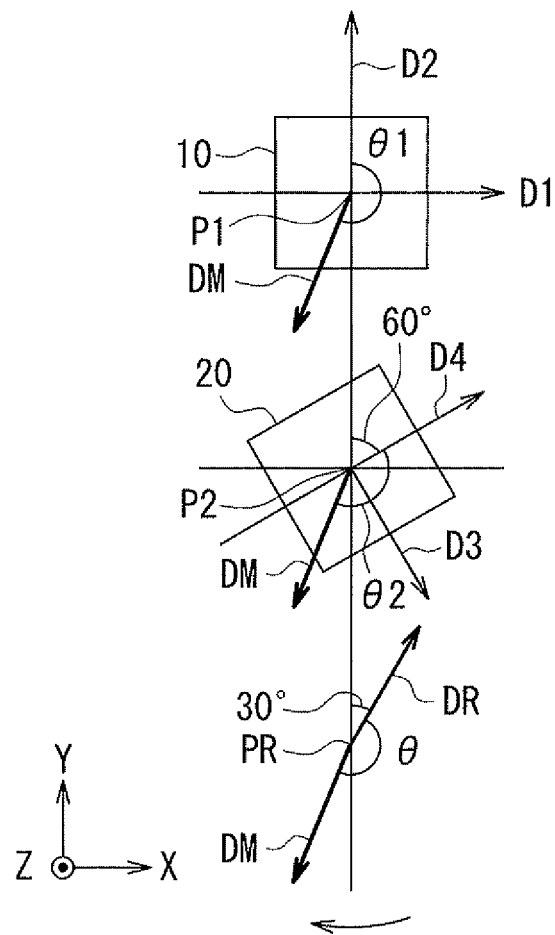
FIG. 2 is an explanatory diagram illustrating the definitions of directions and angles in the first embodiment of the invention.

Preferred embodiments of the present invention will now be described in detail with reference to the drawings. First, reference is made to FIG. 1 and FIG. 2 to describe the general configuration of a rotating field sensor according to a first embodiment of the invention. FIG. 1 is a perspective view showing the general configuration of the rotating field sensor according to the present embodiment. FIG. 2 is an explanatory diagram illustrating the definitions of directions and angles in the present embodiment.

As shown in FIG. 1, the rotating field sensor 1 according to the present embodiment detects the angle that the direction of a rotating magnetic field MF in a reference position forms with respect to a reference direction. In FIG. 1, a cylindrical magnet 5 is shown as an example of means for generating the rotating magnetic field MF whose direction rotates. The magnet 5 has an N pole and an S pole that are arranged symmetrically with respect to a virtual plane including the central axis of the cylinder. The magnet 5 rotates about the central axis of the cylinder. Consequently, the direction of the rotating magnetic field MF generated by the magnet 5 rotates about a center of rotation C including the central axis of the cylinder. The rotating field sensor 1 is disposed to face one end face of the magnet 5. The means for generating the rotating magnetic field MF whose direction rotates is not limited to the magnet 5 shown in FIG. 1, as will be described later in relation to other embodiments.

The rotating field sensor 1 includes a first detection unit 10 that detects the rotating magnetic field MF in a first position, and a second detection unit 20 that detects the rotating magnetic field MF in a second position. In FIG. 1, the first detection unit 10 and the second detection unit 20 are shown as separate members, for ease of understanding. However, the first detection unit 10 and the second detection unit 20 may be integrated with each other.

With reference to FIG. 2, the definitions of directions and angles in the present embodiment will be described. First, a direction that is parallel to the center of rotation C shown in FIG. 1 and is from the one end face of the magnet 5 to the rotating field sensor 1 will be defined as the Z direction. Next, two mutually-orthogonal directions on a virtual plane perpendicular to the Z direction will be defined as the X direction and Y direction. In FIG. 2, the X direction is shown as the direction toward the right, and the Y direction is shown as the upward direction. The direction opposite to the X direction will be defined as the −X direction, and the direction opposite to the Y direction will be defined as the −Y direction.

The reference position PR is the position where the rotating field sensor 1 detects the rotating magnetic field MF. For example, the reference position PR shall be where the first detection unit 10 is located. The reference direction DR shall be the direction that is rotated from the Y direction clockwise by 30°. The angle that the direction DM of the rotating magnetic field MF in the reference position PR forms with respect to the reference direction DR will be designated by symbol θ. The direction DM of the rotating magnetic field MF shall rotate clockwise in FIG. 2. The angle θ will be expressed in a positive value when seen clockwise from the reference direction DR, and in a negative value when seen counterclockwise from the reference direction DR.

The first detection unit 10 detects, in the first position P1, a component of the rotating magnetic field MF in a first direction D1 and a component of the rotating magnetic field MF in a second direction D2. The second detection unit 20 detects, in the second position P2, a component of the rotating magnetic field MF in a third direction D3 and a component of the rotating magnetic field MF in a fourth direction D4. In the present embodiment, the first direction D1 and the second direction D2 are orthogonal to each other, and the third direction D3 and the fourth direction D4 are also orthogonal to each other. The first position P1 and the second position P2 are identical with each other in the direction of rotation of the rotating magnetic field MF and coincide with the reference position PR. The first direction D1 and the third direction D3 differ from each other by 60° in the direction of rotation of the rotating magnetic field MF.

In the present embodiment, the second direction D2 is the direction rotated from the reference direction DR by −30°, and coincides with the Y direction. The angle that the direction DM of the rotating magnetic field MF in the first position P1 forms with respect to the second direction D2 will be referred to as a first angle and designated by symbol θ1. The definition of the sign of the angle θ1 is the same as that of the angle θ. In the present embodiment, the angle θ1 is greater than the angle θ by 30°. The first direction D1 is the direction rotated from the second direction D2 by 90°.

The third direction D3 is the direction rotated from the first direction D1 by 60°, and the fourth direction D4 is the direction rotated from the second direction D2 by 60°. The fourth direction D4 is also the direction rotated from the reference direction DR by 30°. The angle that the direction DM of the rotating magnetic field MF in the second position P2 forms with respect to the fourth direction D4 will be referred to as a second angle and designated by symbol θ2. The definition of the sign of the angle θ2 is the same as that of the angle θ. In the present embodiment, the angle θ2 is smaller than the angle θ by 30', and smaller than the angle θ1 by 60°. The third direction D3 is the direction rotated from the fourth direction D4 by 90°.

Figure 3:
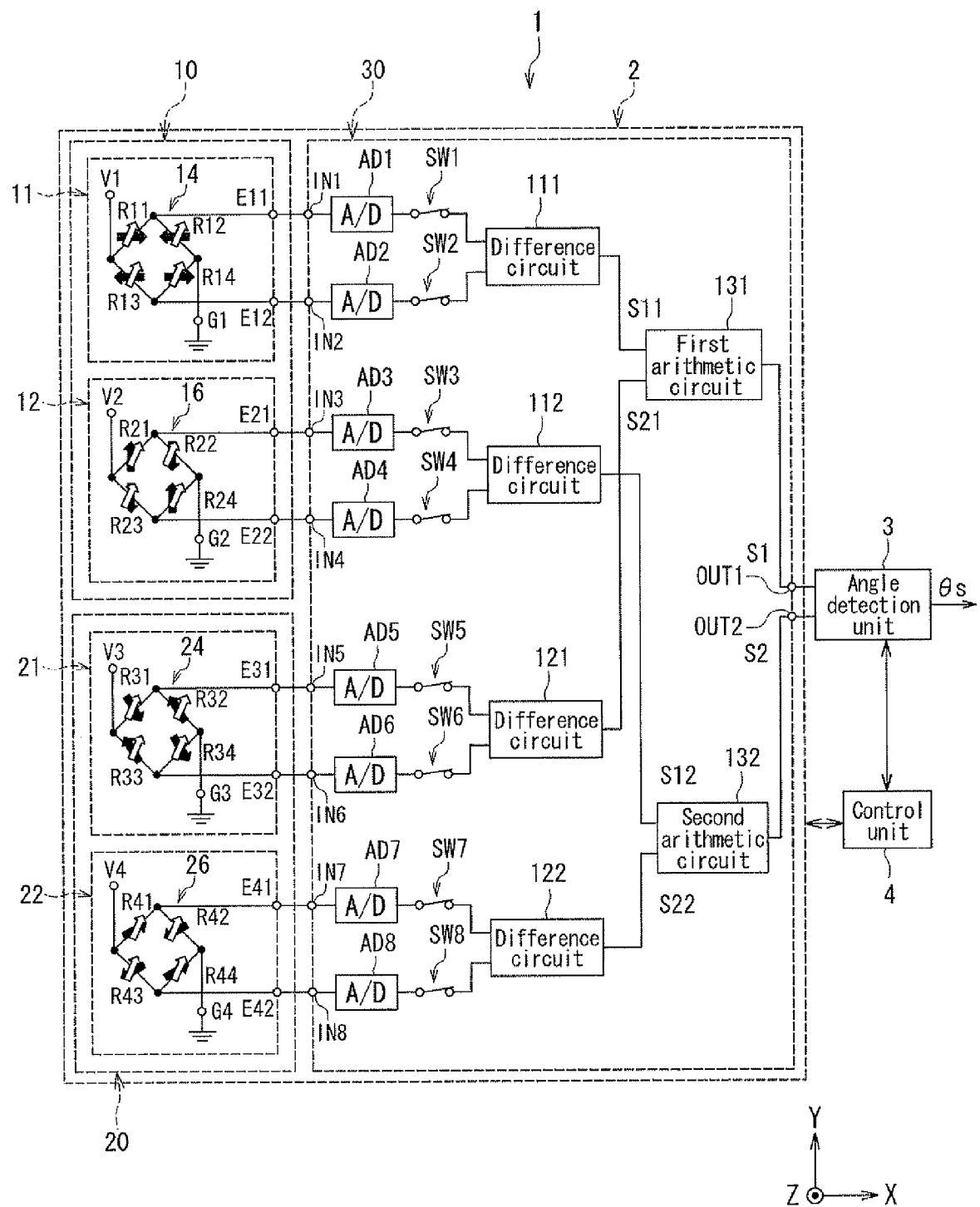
FIG. 3 is a circuit diagram showing the configuration of the rotating field sensor according to the first embodiment of the invention.

Next, the configuration of the rotating field sensor 1 will be described in detail with reference to FIG. 3 to FIG. 5. FIG. 3 is a circuit diagram showing the configuration of the rotating field sensor 1. As shown in FIG. 3, the rotating field sensor 1 includes a signal generation unit 2 and an angle detection unit 3. The signal generation unit 2 includes a plurality of magnetic detection elements for detecting the rotating magnetic field MF, and generates a first signal and a second signal based on the output signals of the plurality of magnetic detection elements. The first and second signals are associated with the intensities of components of the rotating magnetic field MF in mutually different directions. Based on the first and second signals generated by the signal generation unit 2, the angle detection unit 3 calculates a detected angle value that has a correspondence relationship with the angle θ that the direction DM of the rotating magnetic field MF in the reference position PR forms with respect to the reference direction DR.

The first signal includes a first ideal component and a first error component. The second signal includes a second ideal component and a second error component. The first ideal component and the second ideal component vary periodically with the same signal period in an ideal sinusoidal manner. The second ideal component differs from the first ideal component in phase. The sum of the square of the first ideal component and the square of the second ideal component takes on a constant value.

Figure 4:
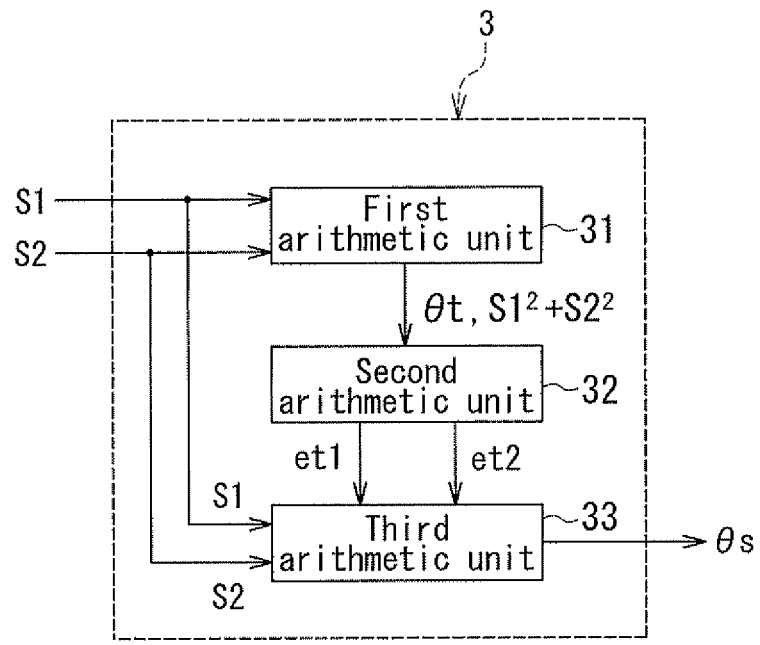
FIG. 4 is a block diagram showing the configuration of the angle detection unit shown in FIG. 3.
Figure 5:
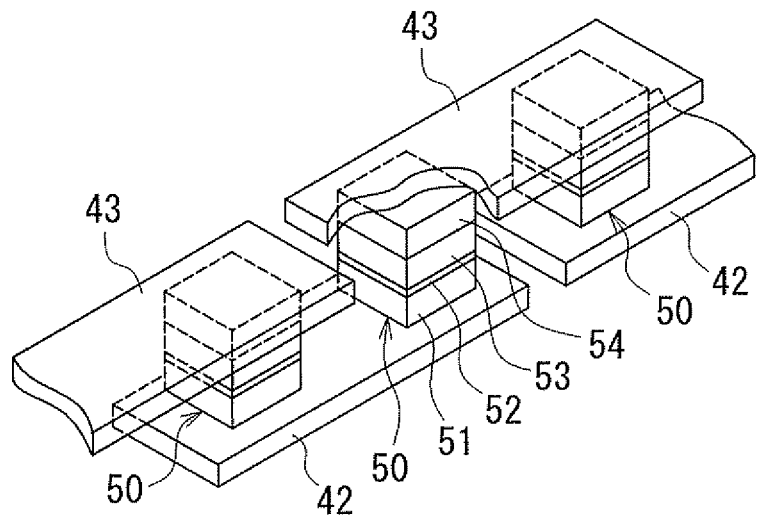
FIG. 5 is a perspective view showing part of an MR element shown in FIG. 3.

FIG. 4 is a block diagram showing the configuration of the angle detection unit 3. As shown in FIG. 4, the angle detection unit 3 includes a first arithmetic unit 31, a second arithmetic unit 32, and a third arithmetic unit 33. The first arithmetic unit 31 generates a sum of squares signal that is made up of the sum of the square of the first signal and the square of the second signal and that has a period of ½ the signal period, which will be described later. Based on the sum of squares signal, the second arithmetic unit 32 calculates a first error component estimate which is an estimated value of the first error component, and a second error component estimate which is an estimated value of the second error component. The third arithmetic unit 33 generates a first corrected signal by subtracting the first error component estimate from the first signal, and generates a second corrected signal by subtracting the second error component estimate from the second signal. Based on the first and second corrected signals, the third arithmetic unit 33 then calculates the detected angle value θs having a correspondence relationship with the angle θ that the direction DM of the rotating magnetic field MF in the reference position PR forms with respect to the reference direction DR. The first and second signals and the method of calculating the detected angle value θs will be described in detail later.

The signal generation unit 2 includes the foregoing first and second detection units 10 and 20. The first detection unit 10 includes a first detection circuit 11 and a second detection circuit 12. The first detection circuit 11 detects the intensity of the component of the rotating magnetic field MF in the first direction D1 and outputs a signal indicating the intensity. The second detection circuit 12 detects the intensity of the component of the rotating magnetic field MF in the second direction D2 and outputs a signal indicating the intensity. The second detection unit 20 includes a third detection circuit 21 and a fourth detection circuit 22. The third detection circuit 21 detects the intensity of the component of the rotating magnetic field MF in the third direction D3 and outputs a signal indicating the intensity. The fourth detection circuit 22 detects the intensity of the component of the rotating magnetic field MF in the fourth direction D4 and outputs a signal indicating the intensity. Each of the first to fourth detection circuits 11, 12, 21, and 22 includes at least one magnetic detection element.

The output signals of the first to fourth detection circuits 11, 12, 21, and 22 vary periodically with the same signal period T. The output signal of the third detection circuit 21 differs from the output signal of the first detection circuit 11 in phase. The output signal of the fourth detection circuit 22 differs from the output signal of the second detection circuit 12 in phase. In the present embodiment, the phases of the output signals of the first to fourth detection circuits 11, 12, 21, and 22 preferably satisfy the following particular relationships.

Preferably, the output signal of the second detection circuit 12 differs from the output signal of the first detection circuit 11 in phase by an odd number of times ¼ the signal period T. Also preferably, the output signal of the fourth detection circuit 22 differs from the output signal of the third detection circuit 21 in phase by an odd number of times ¼ the signal period T. However, in consideration of the production accuracy of the magnetic detection elements and other factors, the difference in phase between the output signal of the first detection circuit 11 and the output signal of the second detection circuit 12 and the difference in phase between the output signal of the third detection circuit 21 and the output signal of the fourth detection circuit 22 can each be slightly different from an odd number of times ¼ the signal period T.

Preferably, the output signal of the third detection circuit 21 differs from the output signal of the first detection circuit 11 in phase by an integer multiple of ⅙ the signal period T other than an integer multiple of ½ the signal period T. The phrase "an integer multiple of ⅙ the signal period T other than an integer multiple of ½ the signal period T" means one of integer multiples of ⅙ the signal period T excluding integer multiples (including a zero multiple) of ½ the signal period T. The following description assumes that the phases of the output signals of the first to fourth detection circuits 11, 12, 21, and 22 satisfy the preferred relationships described above.

Each of the first to fourth detection circuits 11, 12, 21, and 22 may include, as the at least one magnetic detection element, a pair of magnetic detection elements connected in series. In this case, each of the first to fourth detection circuits 11, 12, 21, and 22 may have a Wheatstone bridge circuit that includes a first pair of magnetic detection elements connected in series and a second pair of magnetic detection elements connected in series. The following description will deal with the case where each of the first to fourth detection circuits 11, 12, 21, and 22 has such a Wheatstone bridge circuit.

The first detection circuit 11 has a Wheatstone bridge circuit 14. The Wheatstone bridge circuit 14 includes a power supply port V1, a ground port G1, two output ports E11 and E12, a first pair of magnetic detection elements R11 and R12 connected in series, and a second pair of magnetic detection elements R13 and R14 connected in series. One end of each of the magnetic detection elements R11 and R13 is connected to the power supply port V1. The other end of the magnetic detection element R11 is connected to one end of the magnetic detection element R12 and the output port E11. The other end of the magnetic detection element R13 is connected to one end of the magnetic detection element R14 and the output port E12. The other end of each of the magnetic detection elements R12 and R14 is connected to the ground port G1. A power supply voltage of predetermined magnitude is applied to the power supply port V1. The ground port G1 is grounded.

The second detection circuit 12 has a Wheatstone bridge circuit 16. The Wheatstone bridge circuit 16 includes a power supply port V2, a ground port G2, two output ports E21 and E22, a first pair of magnetic detection elements R21 and R22 connected in series, and a second pair of magnetic detection elements R23 and R24 connected in series. One end of each of the magnetic detection elements R21 and R23 is connected to the power supply port V2. The other end of the magnetic detection element R21 is connected to one end of the magnetic detection element R22 and the output port E21. The other end of the magnetic detection element R23 is connected to one end of the magnetic detection element R24 and the output port E22. The other end of each of the magnetic detection elements R22 and R24 is connected to the ground port G2. A power supply voltage of predetermined magnitude is applied to the power supply port V2. The ground port G2 is grounded.

The third detection circuit 21 has a Wheatstone bridge circuit 24. The Wheatstone bridge circuit 24 includes a power supply port V3, a ground port G3, two output ports E31 and E32, a first pair of magnetic detection elements R31 and R32 connected in series, and a second pair of magnetic detection elements R33 and R34 connected in series. One end of each of the magnetic detection elements R31 and R33 is connected to the power supply port V3. The other end of the magnetic detection element R31 is connected to one end of the magnetic detection element R32 and the output port E31. The other end of the magnetic detection element R33 is connected to one end of the magnetic detection element R34 and the output port E32. The other end of each of the magnetic detection elements R32 and R34 is connected to the ground port G3. A power supply voltage of predetermined magnitude is applied to the power supply port V3. The ground port G3 is grounded.

The fourth detection circuit 22 has a Wheatstone bridge circuit 26. The Wheatstone bridge circuit 26 includes a power supply port V4, a ground port G4, two output ports E41 and E42, a first pair of magnetic detection elements R41 and R42 connected in series, and a second pair of magnetic detection elements R43 and R44 connected in series. One end of each of the magnetic detection elements R41 and R43 is connected to the power supply port V4. The other end of the magnetic detection element R41 is connected to one end of the magnetic detection element R42 and the output port E41. The other end of the magnetic detection element R43 is connected to one end of the magnetic detection element R44 and the output port E42. The other end of each of the magnetic detection elements R42 and R44 is connected to the ground port G4. A power supply voltage of predetermined magnitude is applied to the power supply port V4. The ground port G4 is grounded.

In the present embodiment, all the magnetic detection elements included in the Wheatstone bridge circuits (hereinafter, referred to as bridge circuits) 14, 16, 24, and 26 are MR elements, or TMR elements in particular. GMR elements may be employed instead of the TMR elements. The TMR elements or GMR elements each have a magnetization pinned layer whose direction of magnetization is pinned, a free layer whose direction of magnetization varies according to the direction of the rotating magnetic field MF, and a nonmagnetic layer disposed between the magnetization pinned layer and the free layer. For TMR elements, the nonmagnetic layer is a tunnel barrier layer. For GMR elements, the nonmagnetic layer is a nonmagnetic conductive layer. The TMR elements or GMR elements vary in resistance depending on the angle that the direction of magnetization of the free layer forms with respect to the direction of magnetization of the magnetization pinned layer. The resistance reaches its minimum value when the foregoing angle is 0°. The resistance reaches its maximum value when the foregoing angle is 180°. In the following description, the magnetic detection elements included in the bridge circuits 14, 16, 24, and 26 will be referred to as MR elements. In FIG. 3, the filled arrows indicate the directions of magnetization of the magnetization pinned layers in the MR elements. The hollow arrows indicate the directions of magnetization of the free layers in the MR elements.

In the first detection circuit 11, the magnetization pinned layers of the MR elements R11 and R14 are magnetized in a direction parallel to the first direction D1, and the magnetization pinned layers of the MR elements R12 and R13 are magnetized in a direction opposite to the direction of magnetization of the magnetization pinned layers of the MR elements R11 and R14. In this case, the potential difference between the output ports E11 and E12 varies according to the intensity of the component of the rotating magnetic field MF in the first direction D1. The first direction D1 therefore serves as a reference direction when the first detection circuit 11 detects the rotating magnetic field MF. The first detection circuit 11 detects the intensity of the component of the rotating magnetic field MF in the first direction D1, and outputs a signal that indicates the intensity. Specifically, the potential difference between the output ports E11 and E12 is the output signal of the first detection circuit 11. In the example shown in FIG. 3, the magnetization pinned layers of the MR elements R11 and R14 are magnetized in the X direction, and the magnetization pinned layers of the MR elements R12 and R13 are magnetized in the −X direction. In such an example, the first direction D1 is the same as the X direction.

In the second detection circuit 12, the magnetization pinned layers of the MR elements R21 and R24 are magnetized in a direction parallel to the second direction D2, and the magnetization pinned layers of the MR elements R22 and R23 are magnetized in a direction opposite to the direction of magnetization of the magnetization pinned layers of the MR elements R21 and R24. In this case, the potential difference between the output ports E21 and E22 varies according to the intensity of the component of the rotating magnetic field MF in the second direction D2. The second direction D2 therefore serves as a reference direction when the second detection circuit 12 detects the rotating magnetic field MF The second detection circuit 12 detects the intensity of the component of the rotating magnetic field MF in the second direction D2, and outputs a signal that indicates the intensity. Specifically, the potential difference between the output ports E21 and E22 is the output signal of the second detection circuit 12. In the example shown in FIG. 3, the magnetization pinned layers of the MR elements R21 and R24 are magnetized in the Y direction, and the magnetization pinned layers of the MR elements R22 and R23 are magnetized in the −Y direction. In such an example, the second direction D2 is the same as the Y direction.

In the third detection circuit 21, the magnetization pinned layers of the MR elements R31 and R34 are magnetized in a direction parallel to the third direction D3, and the magnetization pinned layers of the MR elements R32 and R33 are magnetized in a direction opposite to the direction of magnetization of the magnetization pinned layers of the MR elements R31 and R34. In this case, the potential difference between the output ports E31 and E32 varies according to the intensity of the component of the rotating magnetic field MF in the third direction D3. The third direction D3 therefore serves as a reference direction when the third detection circuit 21 detects the rotating magnetic field MF. The third detection circuit 21 detects the intensity of the component of the rotating magnetic field MF in the third direction D3, and outputs a signal that indicates the intensity. Specifically, the potential difference between the output ports E31 and E32 is the output signal of the third detection circuit 21. In the example shown in FIG. 3, the magnetization pinned layers of the MR elements R31 and R34 are magnetized in the same direction as the third direction D3 shown in FIG. 2, and the magnetization pinned layers of the MR elements R32 and R33 are magnetized in a direction opposite to the third direction D3.

In the fourth detection circuit 22, the magnetization pinned layers of the MR elements R41 and R44 are magnetized in a direction parallel to the fourth direction D4, and the magnetization pinned layers of the MR elements R42 and R43 are magnetized in a direction opposite to the direction of magnetization of the magnetization pinned layers of the MR elements R41 and R44. In this case, the potential difference between the output ports E41 and E42 varies according to the intensity of the component of the rotating magnetic field MF in the fourth direction D4. The fourth direction D4 therefore serves as a reference direction when the fourth detection circuit 22 detects the rotating magnetic field MF. The fourth detection circuit 22 detects the intensity of the component of the rotating magnetic field MF in the fourth direction D4, and outputs a signal that indicates the intensity. Specifically, the potential difference between the output ports E41 and E42 is the output signal of the fourth detection circuit 22. In the example shown in FIG. 3, the magnetization pinned layers of the MR elements R41 and R44 are magnetized in the same direction as the fourth direction D4 shown in FIG. 2, and the magnetization pinned layers of the MR elements R42 and R43 are magnetized in a direction opposite to the fourth direction D4.

In consideration of the production accuracy of the MR elements and other factors, the magnetization pinned layers of the plurality of MR elements in the detection circuits 11, 12, 21, and 22 may be magnetized in directions that are slightly different from the above-described directions.

An example of the configuration of the MR elements will now be described with reference to FIG. 5. FIG. 5 is a perspective view showing a part of an MR element in the rotating field sensor 1 shown in FIG. 3. In this example, the MR element has a plurality of lower electrodes, a plurality of MR films, and a plurality of upper electrodes. The plurality of lower electrodes 42 are arranged on a not-shown substrate. Each of the lower electrodes 42 has a long slender shape. Two lower electrodes 42 adjoining in the longitudinal direction of the lower electrodes 42 have a gap therebetween. As shown in FIG. 5, MR films 50 are provided on the top surfaces of the lower electrodes 42, near opposite ends in the longitudinal direction. Each of the MR films 50 includes a free layer 51, a nonmagnetic layer 52, a magnetization pinned layer 53, and an antiferromagnetic layer 54 that are stacked in this order, the free layer 51 being closest to the lower electrode 42. The free layer 51 is electrically connected to the lower electrode 42. The antiferromagnetic layer 54 is made of an antiferromagnetic material. The antiferromagnetic layer 54 is in exchange coupling with the magnetization pinned layer 53 so as to pin the direction of magnetization of the magnetization pinned layer 53. The plurality of upper electrodes 43 are arranged over the plurality of MR films 50. Each of the upper electrodes 43 has a long slender shape, and establishes electrical connection between the respective antiferromagnetic layers 54 of two adjoining MR films 50 that are arranged on two lower electrodes 42 adjoining in the longitudinal direction of the lower electrodes 42. With such a configuration, the plurality of MR films 50 in the MR element shown in FIG. 5 are connected in series by the plurality of lower electrodes 42 and the plurality of upper electrodes 43. It should be appreciated that the layers 51 to 54 of the MR films 50 may be stacked in an order reverse to that shown in FIG. 5.

The signal generation unit 2 further includes an arithmetic unit 30. As shown in FIG. 3, the arithmetic unit 30 includes a first arithmetic circuit 131 and a second arithmetic circuit 132. The first arithmetic circuit 131 generates, based on the output signals of the first and third detection circuits 11 and 21, a first signal that has a correspondence relationship with both the intensity of the component of the rotating magnetic field MF in the first direction D1 and the intensity of the component of the rotating magnetic field MF in the third direction D3. The second arithmetic circuit 132 generates, based on the output signals of the second and fourth detection circuits 12 and 22, a second signal that has a correspondence relationship with both the intensity of the component of the rotating magnetic field MF in the second direction D2 and the intensity of the component of the rotating magnetic field MF in the fourth direction D4. The first and second arithmetic circuits 131 and 132 and the angle detection unit 3 can be implemented by a single microcomputer, for example.

The arithmetic unit 30 has eight input ports IN1 to IN8 and two output ports OUT1 and OUT2. The input ports IN1 to IN8 are connected to the output ports E11, E12, E21, E22, E31, E32, E41, and E42, respectively. The arithmetic unit 30 further includes eight analog-digital converters (hereinafter referred to as A/D converters) AD1 to AD8 and eight switches SW1 to SW8. Each of the switches SW1 to SW8 has a first port and a second port, and allows one of the conduction and non-conduction states between the first and second ports to be selected. The A/D converters AD1 to AD8 have their respective inputs connected to the input ports IN1 to IN8. The A/D converters AD1 to AD8 convert the potentials at the respective output ports E11, E12, E21, E22, E31, E32, E41, and E42 to digital signals and output the resultant digital signals. The first ports of the switches SW1 to SW8 are connected to outputs of the A/D converters AD1 to AD8, respectively.

The arithmetic unit 30 further includes four difference circuits 111, 112, 121, and 122. Each of the difference circuits 111, 112, 121, and 122 has first and second inputs and an output. The first input of the difference circuit 111 is connected to the second port of the switch SW1. The second input of the difference circuit 111 is connected to the second port of the switch SW2. The first input of the difference circuit 112 is connected to the second port of the switch SW3. The second input of the difference circuit 112 is connected to the second port of the switch SW4. The first input of the difference circuit 121 is connected to the second port of the switch SW5. The second input of the difference circuit 121 is connected to the second port of the switch SW6. The first input of the difference circuit 122 is connected to the second port of the switch SW7. The second input of the difference circuit 122 is connected to the second port of the switch SW8.

Each of the first and second arithmetic circuits 131 and 132 has first and second inputs and an output. The first input of the first arithmetic circuit 131 is connected to the output of the difference circuit 111. The second input of the first arithmetic circuit 131 is connected to the output of the difference circuit 121. The output of the first arithmetic circuit 131 is connected to the output port OUT1. The first input of the second arithmetic circuit 132 is connected to the output of the difference circuit 112. The second input of the second arithmetic circuit 132 is connected to the output of the difference circuit 122. The output of the second arithmetic circuit 132 is connected to the output port OUT2.

The angle detection unit 3 has first and second inputs and an output. The first input of the angle detection unit 3 is connected to the output port OUT1. The second input of the angle detection unit 3 is connected to the output port OUT2.

In a normal state, each of the switches SW1 to SW8 is in a conduction state. When in this state, the difference circuit 111 outputs a signal corresponding to the potential difference between the output ports E11 and E12 to the first arithmetic circuit 131. The difference circuit 112 outputs a signal corresponding to the potential difference between the output ports E21 and E22 to the second arithmetic circuit 132. The difference circuit 121 outputs a signal corresponding to the potential difference between the output ports E31 and E32 to the first arithmetic circuit 131. The difference circuit 122 outputs a signal corresponding to the potential difference between the output ports E41 and E42 to the second arithmetic circuit 132.

The rotating field sensor 1 has a fail-safe function. The rotating field sensor 1 includes a control unit 4 that controls the fail-safe function. The control unit 4 controls the switches SW1 to SW8. The control unit 4 can be implemented by a microcomputer, like the first and second arithmetic circuits 131 and 132 and the angle detection unit 3. The fail-safe function will be described in detail later.

Now, a description will be given of the output signals of the detection circuits 11, 12, 21, and 22 with reference to FIG. 3, FIG. 6, and FIG. 8. In the example shown in FIG. 3, the directions of magnetization of the magnetization pinned layers of the MR elements in the second detection circuit 12 are ideally orthogonal to the directions of magnetization of the magnetization pinned layers of the MR elements in the first detection circuit 11. The output signal of the difference circuit 111 ideally has a sine waveform that depends on the first angle $\theta 1$, and the output signal of the difference circuit 112 ideally has a cosine waveform that depends on the first angle $\theta 1$. In this case, the output signal of the difference circuit 112 differs from the output signal of the difference circuit 111 in phase by ¼ the signal period T, i.e., by $\pi/2$ (90°).

When the first angle $\theta 1$ is greater than 0° and smaller than 180°, the output signal of the difference circuit 111 has a positive value. When the first angle $\theta 1$ is greater than 180° and smaller than 360°, the output signal of the difference circuit 111 has a negative value. When the first angle $\theta 1$ is equal to or greater than 0° and smaller than 90° and when the first angle $\theta 1$ is greater than 270° and smaller than or equal to 360°, the output signal of the difference circuit 112 has a positive value. When the first angle $\theta 1$ is greater than 90° and smaller than 270°, the output signal of the difference circuit 112 has a negative value. Hereinafter, the output signal of the difference circuit 111 will be denoted by S11, and the output signal of the difference circuit 112 will be denoted by S12. The output signal S11 is a signal that indicates the intensity of the component of the rotating magnetic field MF in the first direction D1. The output signal S12 is a signal that indicates the intensity of the component of the rotating magnetic field MF in the second direction D2.

In the example shown in FIG. 3, the directions of magnetization of the magnetization pinned layers of the MR elements in the fourth detection circuit 22 are ideally orthogonal to the directions of magnetization of the magnetization pinned layers of the MR elements in the third detection circuit 21. The output signal of the difference circuit 121 ideally has a sine waveform that depends on the second angle $\theta 2$, and the output signal of the difference circuit 122 ideally has a cosine waveform that depends on the second angle $\theta 2$. In this case, the output signal of the difference circuit 122 differs from the output signal of the difference circuit 121 in phase by ¼ the signal period T, i.e., by $\pi/2$ (90°).

When the second angle $\theta 2$ is greater than 0° and smaller than 180°, the output signal of the difference circuit 121 has a positive value. When the second angle $\theta 2$ is greater than 180° and smaller than 360°, the output signal of the difference circuit 121 has a negative value. When the second angle $\theta 2$ is equal to or greater than 0° and smaller than 90° and when the second angle $\theta 2$ is greater than 270° and smaller than or equal to 360°, the output signal of the difference circuit 122 has a positive value. When the second angle θ2 is greater than 90° and smaller than 270°, the output signal of the difference circuit 122 has a negative value. Hereinafter, the output signal of the difference circuit 121 will be denoted by S21, and the output signal of the difference circuit 122 will be denoted by S22. The output signal S21 is a signal that indicates the intensity of the component of the rotating magnetic field MF in the third direction D3. The output signal S22 is a signal that indicates the intensity of the component of the rotating magnetic field MF in the fourth direction D4.

As described above, in the present embodiment, the output signals of the difference circuits 111, 112, 121, and 122 corresponding to the output signals (potential differences between the respective two output ports) of the detection circuits 11, 12, 21, and 22 ideally have sinusoidal waveforms (including a sine waveform and a cosine waveform). In actuality, however, distortion of the output signal waveforms of the MR elements occurring due to the MR elements themselves distorts the waveforms of the output signals of the difference circuits 111, 112, 121, and 122 from a sinusoidal curve. Examples of the situation where the output signal waveforms of the MR elements are distorted due to the MR elements themselves include: when the directions of magnetization of the magnetization pinned layers in the MR elements vary due to the influence of the rotating magnetic field MF or the like; and when the directions of magnetization of the free layers in the MR elements do not coincide with the direction of the rotating magnetic field MF due to the influence of such factors as the shape anisotropy and coercivity of the free layers. An output signal distorted from a sinusoidal curve includes not only an ideal sinusoidal component but also an error component.

Figure 6:
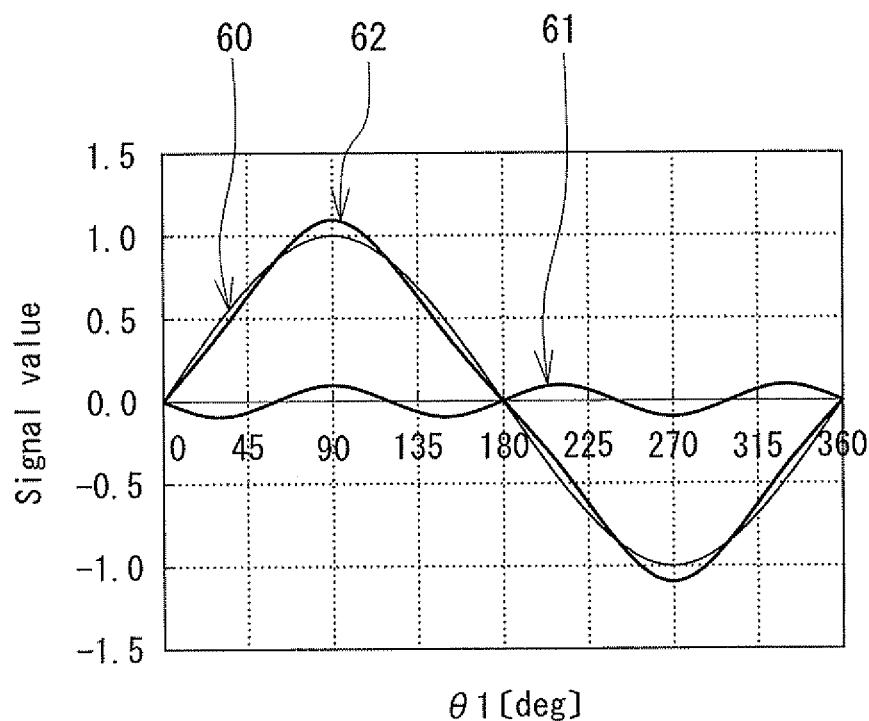
FIG. 6 is a waveform chart showing an example of waveforms of the output signal of a first detection circuit of the first embodiment and a third error component included therein.
Figure 7:
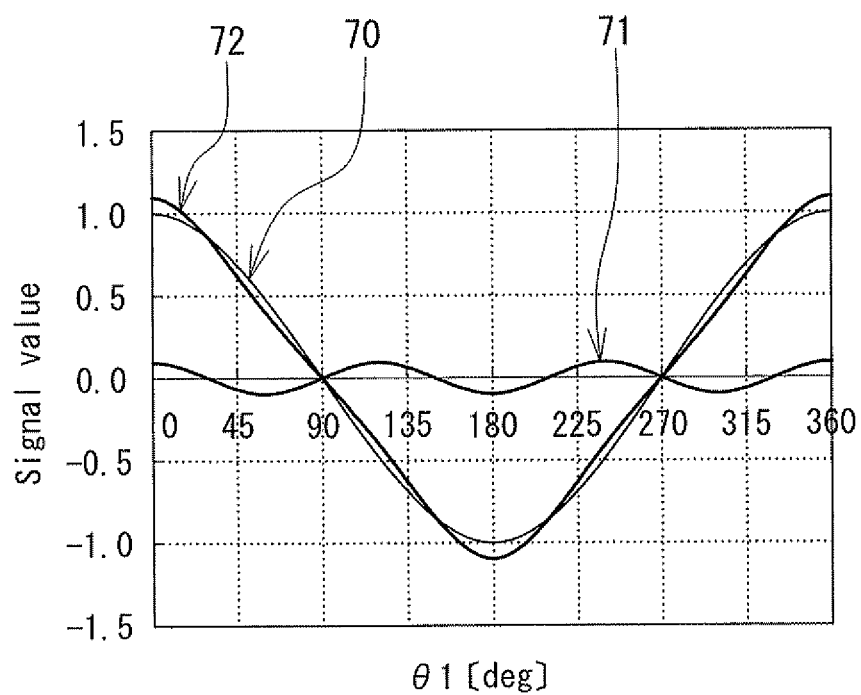
FIG. 7 is a waveform chart showing an example of waveforms of the output signal of a second detection circuit of the first embodiment and a third error component included therein.

FIG. 6 and FIG. 7 show examples of waveforms of output signals distorted from a sinusoidal curve. FIG. 6 shows an example of the waveform of the output signal S11 of the difference circuit 111. FIG. 7 shows an example of the waveform of the output signal S12 of the difference circuit 112. In each of FIG. 6 and FIG. 7, the horizontal axis indicates the angle θ1, and the vertical axis indicates the signal value, where the maximum value of the ideal sinusoidal component is assumed as 1. Reference numerals 60 and 70 each indicate an ideal sinusoidal curve. Reference numeral 61 indicates the waveform of the error component included in the output signal S11. Reference numeral 62 indicates the waveform of the output signal S11 that is distorted due to the MR elements. Reference numeral 71 indicates the waveform of the error component included in the output signal S12. Reference numeral 72 indicates the waveform of the output signal S12 that is distorted due to the MR elements. The waveforms shown in FIG. 6 and FIG. 7 were generated by simulation.

As shown in FIG. 6, the error component included in the output signal S11 varies depending on the variation in the output signal S11. As shown in FIG. 7, the error component included in the output signal S12 varies depending on the variation in the output signal S12. Likewise, the error component included in the output signal S21 varies depending on the variation in the output signal S21. The error component included in the output signal S22 varies depending on the variation in the output signal S22. When the output signals of the difference circuits are distorted in waveform as shown in FIG. 6 and FIG. 7, the error components included in the output signals of the difference circuits vary in synchronization with the respective output signals of the difference circuits, each with a period of ⅓ the signal period T, i.e., 2π/3 (120°), as can be seen from the waveforms designated by reference numerals 61 and 71 in FIG. 6 and FIG. 7. Hereinafter, these error components will be referred to as third error components.

However, examples of distortion of the output signals of the difference circuits from a sinusoidal curve due to the MR elements are not limited to those shown in FIG. 6 and FIG. 7. In the examples shown in FIG. 6 and FIG. 7, the output signals of the difference circuits are each distorted from an ideal sinusoidal curve so as to come close to a triangular waveform. In contrast to the examples shown in FIG. 6 and FIG. 7, the output signals of the difference circuits may be distorted from an ideal sinusoidal curve so as to come close to a rectangular waveform. In such a case also, the output signals of the difference circuits include the third error components. In any case, the third error components included in the output signals of the difference circuits have a period (hereinafter referred to as a third error component period) of ⅓ the signal period T, 2π/3 (120°).

Because of the distortion of the output signal waveforms of the MR elements occurring due to the MR elements themselves as described above, the detected angle value θs, which has a correspondence relationship with the angle θ that the direction DM of the rotating magnetic field MF in the reference position PR forms with respect to the reference direction DR, may include an angular error with respect to the theoretical value of the detected angle value θs that is expected when the direction of the rotating magnetic field rotates ideally. The angular error varies periodically as the direction of the rotating magnetic field varies. The variation in the angular error depends on the variation in the detected angle value θs.

If the rotating field sensor includes only the first detection unit 10 and does not include the second detection unit 20, the detected angle value θs is calculated based on the output signals S11 and S12. Specifically, for example, the detected angle value θs is calculated by using the following equation (1). Note that "atan" represents an arctangent.

$$\theta s = \text{atan}(S11/S12) \quad (1)$$

The term "atan(S11/S12)" of the equation (1) represents the arctangent calculation for determining θs. Within the range of 360°, θs in the equation (1) has two solutions with a difference of 180° in value. Which of the two solutions of θs in the equation (1) is the true solution to θs can be determined from the combination of positive and negative signs on S11 and S12. More specifically, if S11 is positive in value, θs is greater than 0° and smaller than 180°. If S11 is negative in value, θs is greater than 180° and smaller than 360°. If S12 is positive in value, θs is equal to or greater than 0° and smaller than 90°, or is greater than 270° and smaller than or equal to 360°. If S12 is negative in value, θs is greater than 90° and smaller than 270°. Using the equation (1) and based on the foregoing determination of the combination of positive and negative signs on S11 and S12, θs is determined within the range of 360°.

Figure 8:
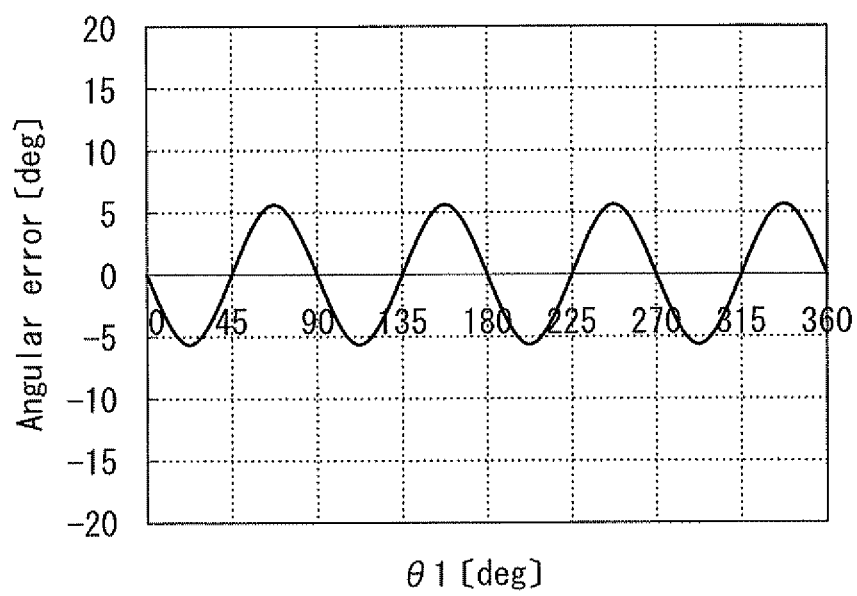
FIG. 8 is a waveform chart showing the waveform of an angular error included in a detected angle value that is calculated based on the waveforms of the output signals shown in FIG. 6 and FIG. 7.

FIG. 8 shows an angular error dθ1 included in the detected angle value θs that is calculated using the equation (1) on the basis of the waveform of the output signal S11 (reference numeral 62) shown in FIG. 6 and the waveform of the output signal S12 (reference numeral 72) shown in FIG. 7. In FIG. 8, the horizontal axis indicates the angle θ1, and the vertical axis indicates the angular error. When the output signals of the difference circuits 111 and 112 are distorted in waveform as shown in FIG. 6 and FIG. 7, the angular error dθ1 has a period of ¼ the signal period T, i.e., π/2 (90°), as shown in FIG. 8.

Now, a description will be given of a method of calculating the detected angle value θs in the case where the output signals of the difference circuits 111, 112, 121 and 122 corresponding to the output signals of the detection circuits 11, 12, 21 and 22 include the third error components. The operation and effects of the rotating field sensor 1 according to the present embodiment in such a case will also be described.

First, with reference to FIG. 9 to FIG. 11, a method of generating the first and second signals in normal conditions will be described. The first arithmetic circuit 131 generates the first signal S1 based on the output signal S11 of the difference circuit 111 and the output signal S21 of the difference circuit 121. The first signal S1 has a correspondence relationship with both the intensity of the component of the rotating magnetic field MF in the first direction D1 and the intensity of the component of the rotating magnetic field MF in the third direction D3. The first signal S1 includes a smaller third error component than the third error components included in the output signals S11 and S21. For example, the output signal S11 and the output signal S21 can be added to generate a yet-to-be-normalized first signal S1, which can then be normalized into a normalized first signal S1.

In the present embodiment, in particular, the output signal S11 and the output signal S21 differ in phase by ½ the third error component period (⅙ the signal period T), i.e., by π/3 (60°. To achieve such a difference, the present embodiment is configured so that the first direction D1 and the third direction D3 differ by 60° in the direction of rotation of the rotating magnetic field MF. The present embodiment allows the third error component included in the output signal S11 and the third error component included in the output signal S21 to cancel each other out. This will be described with reference to FIG. 9. Portion (a) of FIG. 9 shows an example of the waveform of the output signal S11 of the difference circuit 111, like FIG. 6. The waveform shown in portion (a) of FIG. 9 is different in phase from the waveform shown in FIG. 6 by π/6. Portion (b) of FIG. 9 shows an example of the waveform of the output signal S21 of the difference circuit 121. The horizontal axis in each of portions (a) and (b) of FIG. 9 indicates the angle θ. Reference numeral 65 indicates an ideal sinusoidal curve. Reference numeral 66 indicates the waveform of the third error component included in the output signal S21. Reference numeral 67 indicates the waveform of the output signal S21 that is distorted due to the MR elements. Here, consider a case where the output signal S11 and the output signal S21 are added to generate the first signal S1. In this case, when the first signal S1 is generated, the third error component included in the output signal S11 and the third error component included in the output signal S21 are in opposite phases. Consequently, the third error components included in the output signals S11 and S21 cancel each other out.

Figure 9:
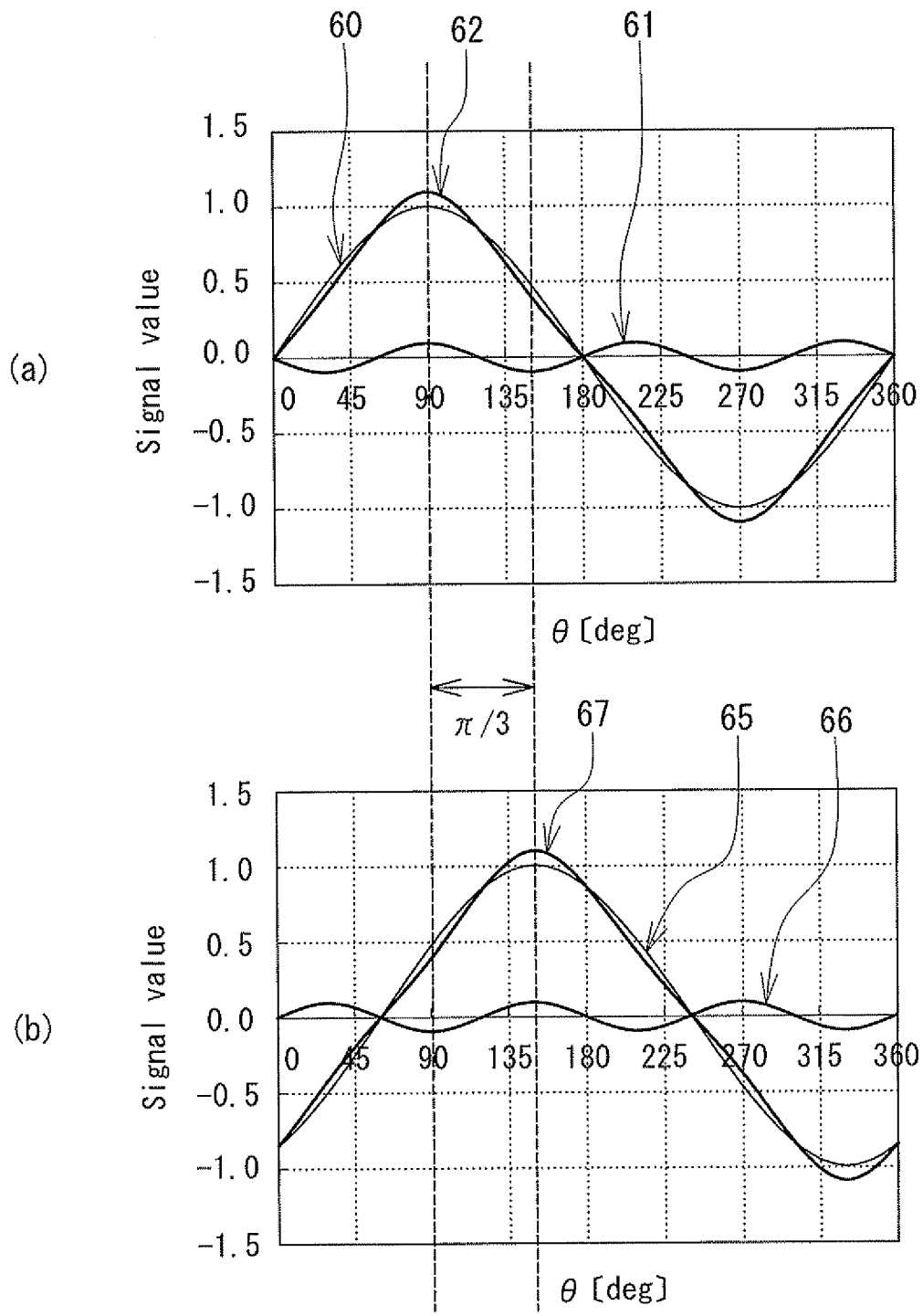
FIG. 9 is an explanatory diagram showing the cancellation of the third error components included in the output signals of the first and third detection circuits of the first embodiment of the invention.

The third error components included in the output signals S11 and S21 shown in FIG. 9 may or may not be of the same amplitude. In particular, if the third error components included in the output signals S11 and S21 are of the same amplitude, those third error components cancel each other out when the first signal S1 is generated. As a result, the first signal S1 includes theoretically zero third error component. Now, this will be described in detail. Letting p represent the amplitude of the third error components included in the output signals S11 and S21 and letting θ1 and θ2 be expressed as θ+π/6 and θ−π/6, respectively, the yet-to-be-normalized first signal S1 is expressed by the following equation (2).

$$S1 = S11 + S21 \quad (2)$$
$$= \sin\theta1 - p\cdot\sin3\theta1 + \sin\theta2 - p\cdot\sin3\theta2$$
$$= \sin(\theta + \pi/6) - p\cdot\sin3(\theta + \pi/6) +$$
$$\sin(\theta - \pi/6) - p\cdot\sin3(\theta - \pi/6)$$
$$= \sin\theta\cdot\cos(\pi/6) + \cos\theta\cdot\sin(\pi/6) +$$
$$\sin\theta\cdot\cos(-\pi/6) + \cos\theta\cdot\sin(-\pi/6) -$$
$$p\{\sin(3\theta + \pi/2) + \sin(3\theta - \pi/2)\}$$
$$= 2\sin\theta\cdot\cos(\pi/6) - p(\cos3\theta - \cos3\theta)$$
$$= 1.73\sin\theta$$

In the equation (2), sin θ1 represents the ideal sinusoidal component included in the output signal S11, and sin θ2 represents the ideal sinusoidal component included in the output signal S12. The term "−p·sin 3θ1" represents the third error component included in the output signal S11. The term "−p·sin 3θ2" represents the third error component included in the output signal S21. As can be seen from the equation (2), adding the output signal S11 and the output signal S21 causes the third error components included in the output signals S11 and S21 to cancel each other out, thereby allowing the first signal S1 to include theoretically zero third error component.

The second arithmetic circuit 132 generates the second signal S2 based on the output signal S12 and the output signal S22. The second signal S2 has a correspondence relationship with both the intensity of the component of the rotating magnetic field MF in the second direction D2 and the intensity of the component of the rotating magnetic field MF in the fourth direction D4. The second signal S2 includes a smaller third error component than the third error components included in the output signals S12 and S22. For example, the output signal 812 and the output signal S22 can be added to generate a yet-to-be-normalized second signal S2, which can then be normalized into a normalized second signal S2. In the present embodiment, the first and second arithmetic circuits 131 and 132 generate the first and second signals S1 and S2 that are normalized to have the same amplitude.

In the present embodiment, in particular, the output signal S12 and the output signal S22 differ in phase by ½ the third error component period (⅙ the signal period T), i.e., by π/3 (60°). The present embodiment allows the third error component included in the output signal S12 and the third error component included in the output signal S22 to cancel each other out, as with the third error components included in the output signals S11 and S21. This will be described with reference to FIG. 10. Portion (a) of FIG. 10 shows an example of the waveform of the output signal S12 of the difference circuit 112, like FIG. 7. The waveform shown in portion (a) of FIG. 10 is different in phase from the waveform shown in FIG. 7 by π/6. Portion (b) of FIG. 10 shows an example of the waveform of the output signal S22 of the difference circuit 122. The horizontal axis in each of portions (a) and (b) of FIG. 10 indicates the angle θ. Reference numeral 75 indicates an ideal sinusoidal curve. Reference numeral 76 indicates the waveform of the third error component included in the output signal S22. Reference numeral 77 indicates the waveform of the output signal S22 that is distorted due to the MR elements. Here, consider a case where the output signal S12 and the output signal S22 are added to generate the second signal S2. In this case, when the second signal S2 is generated, the third error component included in the output signal S12 and the third error component included in the output signal S22 are in opposite phases. Consequently, the third error components included in the output signals S12 and S22 cancel each other out.

Figure 10:
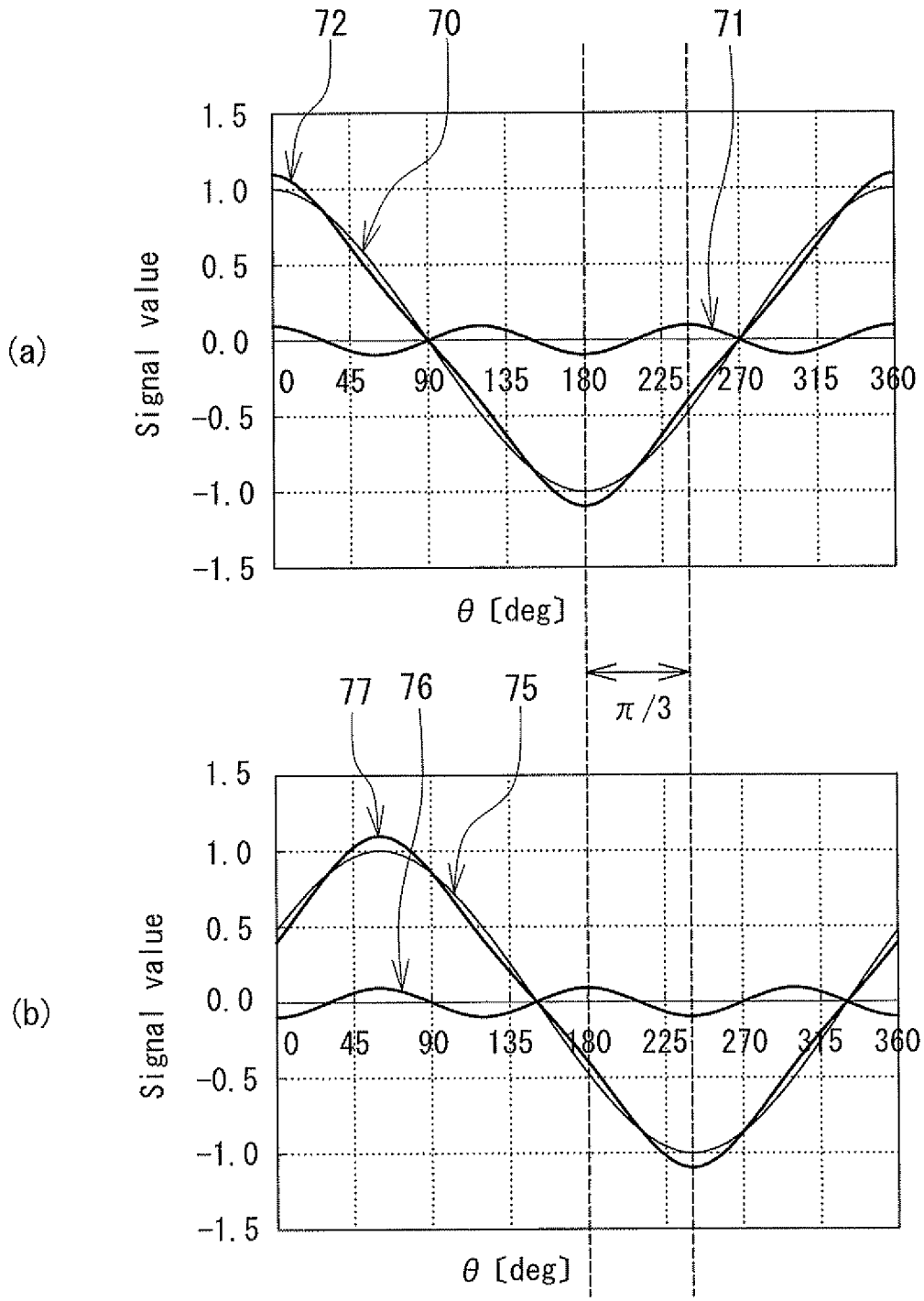
FIG. 10 is an explanatory diagram showing the cancellation of the third error components included in the output signals of the second and fourth detection circuits of the first embodiment of the invention.

The third error components included in the output signals S12 and S22 shown in FIG. 10 may or may not be of the same amplitude. In particular, if the third error components included in the output signals S12 and S22 are of the same amplitude, those third error components cancel each other out when the second signal S2 is generated. As a result, the second signal S2 includes theoretically zero third error component. Now, this will be described in detail. As in the foregoing, letting p represent the amplitude of the third error components included in the output signals S12 and S22 and letting $\theta 1$ and $\theta 2$ be expressed as $\theta+\pi/6$ and $\theta-\pi/6$, respectively, the yet-to-be-normalized second signal S2 is expressed by the following equation (3).

$$\begin{aligned} S2 &= S12 + S22 \\ &= \cos\theta 1 + p\cdot\cos 3\theta 1 + \cos\theta 2 + p\cdot\cos 3\theta 2 \\ &= \cos(\theta + \pi/6) + p\cdot\cos 3(\theta + \pi/6) + \\ &\quad \cos(\theta - \pi/6) + p\cdot\cos 3(\theta - \pi/6) \\ &= \cos\theta\cdot\cos(\pi/6) - \sin\theta\cdot\sin(\pi/6) + \\ &\quad \cos\theta\cdot\cos(-\pi/6) + \sin\theta\cdot\sin(-\pi/6) + \\ &\quad p\{\cos(3\theta + \pi/2) + \cos(3\theta - \pi/2)\} \\ &= 2\cos\theta\cdot\cos(\pi/6) + p(-\sin 3\theta + \sin 3\theta) \\ &= 1.73\cos\theta \end{aligned} \tag{3}$$

In the equation (3), cos $\theta 1$ represents the ideal sinusoidal component included in the output signal S12, and cos $\theta 2$ represents the ideal sinusoidal component included in the output signal S22. The term "p·cos 3($\theta+\pi/6$)" represents the third error component included in the output signal S12. The term "p·cos 3($\theta-\pi/6$)" represents the third error component included in the output signal S22. As can be seen from the equation (3), adding the output signal S12 and the output signal S22 causes the third error components included in the output signals S12 and S22 to cancel each other out, thereby allowing the second signal S2 to include theoretically zero third error component.

Figure 11:
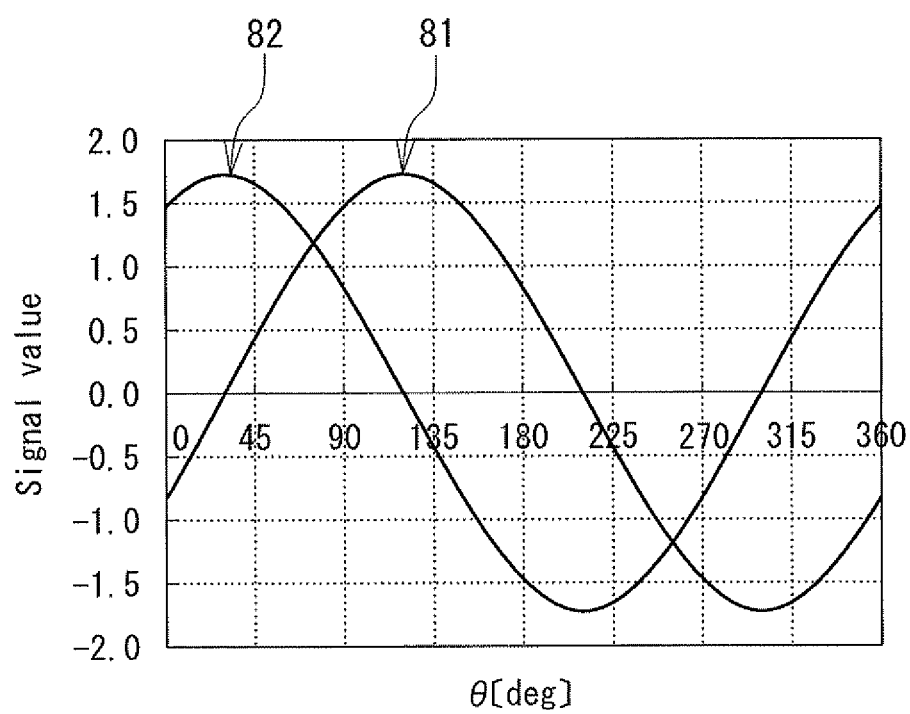
FIG. 11 is a waveform chart showing the waveforms of first and second signals of the first embodiment of the invention.

FIG. 11 shows the waveform of the first signal S1 (reference numeral 81) obtained by adding the output signals S11 and S21 shown in FIG. 9, and the waveform of the second signal S2 (reference numeral 82) obtained by adding the output signals S12 and S22 shown in FIG. 10. The horizontal axis in FIG. 11 indicates the angle $\theta$. As shown in FIG. 11, because of the cancellation of the third error components included in the output signals S11 and S21, the first signal S1 has a sinusoidal waveform achieving a reduction in distortion, i.e., a reduction in the third error component. Likewise, because of the cancellation of the third error components included in the output signals S12 and S22, the second signal S2 has a sinusoidal waveform achieving a reduction in distortion, i.e., a reduction in the third error component.

Now, a description will be given of the method of calculating the detected angle value $\theta s$ on the assumption that the first signal S1 does not include a first error component to be described later and the second signal S2 does not include a second error component to be described later. In this case, the following equation (4) can be used to calculate the detected angle value $\theta s$ having a correspondence relationship with the angle $\theta$ that the direction DM of the rotating magnetic field MF in the reference position PR forms with respect to the reference direction DR. Note that S1 and S2 in the equation (4) represent the normalized first and second signals, respectively.

$$\theta s = \mathrm{atan}(S1/S2) \tag{4}$$

More specifically, as with the method of determining $\theta s$ using the foregoing equation (1), $\theta s$ can be determined within the range of 360° from the equation (4) and based on the determination of the combination of positive and negative signs on S1 and S2.

Where the yet-to-be-normalized first and second signals S1 and S2 are expressed by the foregoing equations (2) and (3), respectively, S1/S2 in the equation (4) is equal to sin $\theta$/cos $\theta$. Consequently, $\theta s$ calculated by the equation (4) is equal to $\theta$. In this case, the detected angle value $\theta s$ includes theoretically zero angular error. As such, according to the present embodiment, even when the output signal waveforms of the MR elements are distorted due to the MR elements themselves and the respective output signals include the third error components, it is possible to reduce the error in the detected angle value $\theta s$ caused by the MR elements.

In the present embodiment, the phase difference between the output signals S11 and S21 is not limited to ½ the third error component period (⅙ the signal period T), and may be any odd number of times ½ the third error component period (⅙ the signal period T) (other than an integer multiple of ½ the signal period T). In such cases, the third error component included in the output signal S11 and the third error component included in the output signal S21 cancel each other out when the first signal S1 is generated by adding together the output signal S11 and the output signal S21. This allows reducing the error in the detected angle value $\theta s$. Likewise, the phase difference between the output signals S12 and S22 is not limited to ½ the third error component period (⅙ the signal period T), and may be any odd number of times ½ the third error component period (⅙ the signal period T) (other than an integer multiple of ½ the signal period T). In such cases, the third error component included in the output signal S12 and the third error component included in the output signal S22 cancel each other out when the second signal S2 is generated by adding together the output signal S12 and the output signal S22. This allows reducing the error in the detected angle value $\theta s$.

In the present embodiment, the first position P1 and the second position P2 are identical with each other in the direction of rotation of the rotating magnetic field MF. In this case, the first direction D1 and the third direction D3 may be different from each other in the direction of rotation of the rotating magnetic field MF by a spatial angle equivalent to an odd number of times ½ the third error component period (⅙ the signal period T) (other than an integer multiple of ½ the signal period T). This allows the output signals S11 and S21 to differ in phase by an odd number of times ½ the third error component period (⅙ the signal period T) (other than an integer multiple of ½ the signal period T). In the example shown in FIG. 2, the first direction D1 and the third direction D3 are different from each other in the direction of rotation of the rotating magnetic field MF by a spatial angle equivalent to ½ the third error component period (⅙ the signal period T), i.e., by 60°.

The phase difference between the output signals S11 and S21 is not limited to an odd number of times ½ the third error component period (⅙ the signal period T), and may be an even number of times ½ the third error component period (⅙ the signal period T) (other than an integer multiple of ½ the signal period T). In such cases, the third error component included in the output signal S11 and the third error component included in the output signal S21 are in the same phase when the first signal S1 is generated. In this case, for example, the output signal S21 is subtracted from the output signal S11, and the resultant is normalized to serve as the first signal S1. This allows the third error component included in the output signal S11 and the third error component included in the output signal S21 to cancel each other out. Likewise, the phase difference between the output signals S12 and S22 is not limited to an odd number of times ½ the third error component period (⅙ the signal period T), and may be an even number of times ½ the third error component period (⅙ the signal period T) (other than an integer multiple of ½ the signal period T). In such cases, the third error component included in the output signal S12 and the third error component included in the output signal S22 are in the same phase when the second signal S2 is generated. In this case, for example, the output signal S22 is subtracted from the output signal S12, and the resultant is normalized to serve as the second signal S2. This allows the third error component included in the output signal S12 and the third error component included in the output signal S22 to cancel each other out.

Preferably, each of the phase difference between the output signals S11 and S21 and the phase difference between the output signals S12 and S22 is an integer multiple of ⅙ the signal period T other than an integer multiple of ½ the signal period T. However, the phase difference between the output signals S11 and S21 and the phase difference between the output signals S12 and S22 may each be different from an integer multiple of ⅙ the signal period T other than an integer multiple of ½ the signal period T, so long as the first signal S1 can achieve a reduction in the third error component as compared with the output signals S11 and S21 and the second signal S2 can achieve a reduction in the third error component as compared with the output signals S12 and S22.

In the present embodiment, the detected angle value is determined by using the two detection units 10 and 20 that have the same configuration except for the directions of magnetization of the magnetization pinned layers of the MR elements. Therefore, even if the third error components included in the respective output signals of the difference circuits vary as a function of temperature, it is possible to cancel out the third error components, which include fluctuations due to temperature, in the output signals of the difference circuits when determining the detected angle value. Consequently, according to the present embodiment, it is eventually possible to obtain the detected angle value with less temperature-based error variations.

The following description deals with a method of calculating the detected angle value θs in the case where the first signal S1 includes the first error component and the second signal S2 includes the second error component. The operation and effects of the rotating field sensor 1 according to the present embodiment in such a case will also be described.

First, a description will be given of the case where the first signal S1 includes the first error component and the second signal S2 includes the second error component. As described previously, the output signal waveform of an MR element is distorted when the direction of magnetization of the free layer of the MR element differs from the direction of the rotating magnetic field MF. Such a situation may occur due to the influence of the induced magnetic anisotropy of the free layer, as well as the influence of the shape anisotropy and coercivity of the free layer as described previously. The induced magnetic anisotropy occurs, for example, when the rotating field sensor 1 is installed at a predetermined location and thereafter the location of installation of the rotating field sensor 1 including the MR elements once increases and then decreases in temperature with an external magnetic field kept applied to the MR elements in a specific direction. If the free layers have an induced magnetic anisotropy, the direction of magnetization of the free layers cannot accurately follow the direction of the rotating magnetic field. This distorts the output signal waveforms of the MR elements from a sinusoidal curve. In this case, the output signal distorted from a sinusoidal curve includes not only an ideal sinusoidal component but also an error component that depends on the variation in the direction of the rotating magnetic field MF.

Figure 12:
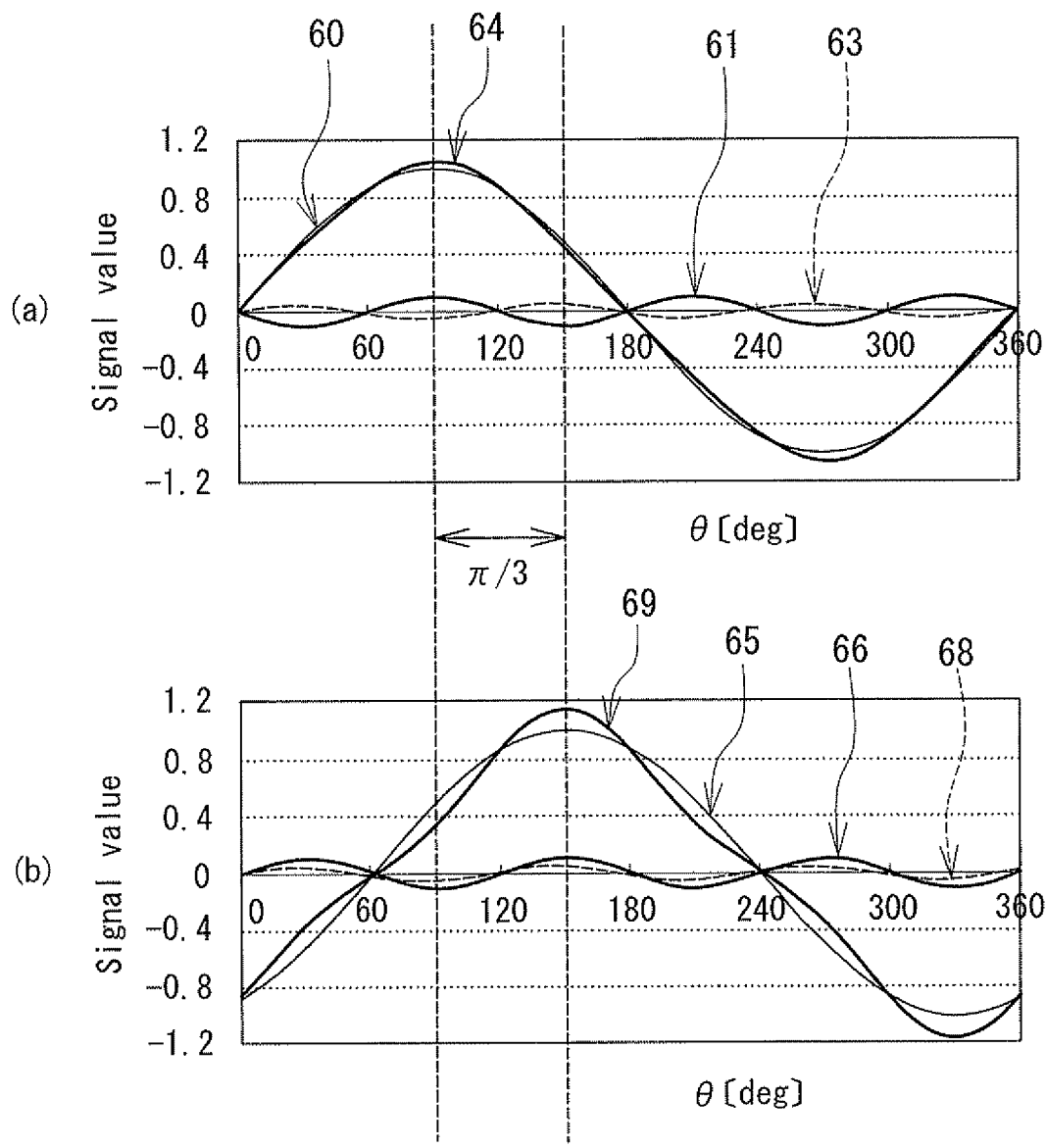
FIG. 12 is a waveform chart showing the waveforms of the output signal of the first detection circuit of the first embodiment and first and third error components included therein, and the waveforms of the output signal of the third detection circuit of the first embodiment and first and third error components included therein.
Figure 13:
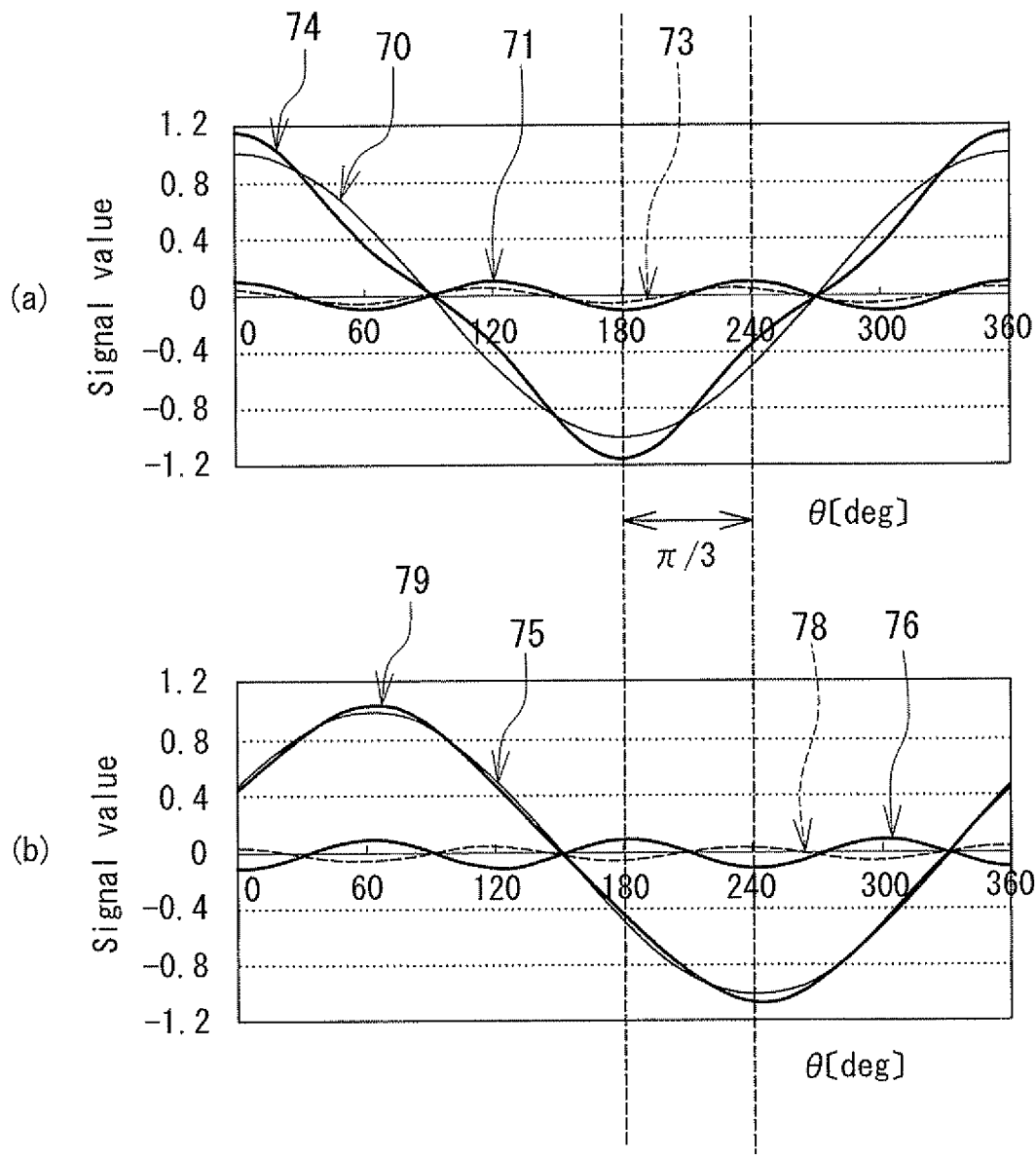
FIG. 13 is a waveform chart showing the waveforms of the output signal of the second detection circuit of the first embodiment and second and third error components included therein, and the waveforms of the output signal of the fourth detection circuit of the first embodiment and second and third error components included therein.

FIG. 12 and FIG. 13 show examples of waveforms of output signals distorted from a sinusoidal curve. Portion (a) of FIG. 12 shows the waveform of the output signal S11 of the difference circuit 111. Portion (b) of FIG. 12 shows the waveform of the output signal S22 of the difference circuit 121. In each of portions (a) and (b) of FIG. 12, the horizontal axis indicates the angle θ, while the vertical axis indicates the signal value in like manner with FIG. 6 and FIG. 7. In FIG. 12, the same waveforms as those in FIG. 9 are denoted with the same reference numerals as those in FIG. 9. Reference numerals 60 and 65 each indicate an ideal sinusoidal curve. Reference numerals 61 and 66 indicate the waveforms of the third error components included in the respective output signals. Reference numerals 63 and 68 indicate the waveforms of error components that depend on the variation in the direction of the rotating magnetic field MF, included in the respective output signals. Reference numerals 64 and 69 indicate the waveforms of the output signals that are distorted due to the MR elements. The waveforms shown in FIG. 12 were generated by simulation. As shown in FIG. 12, the variation in the error component shown by reference numeral 63, which is included in the output signal S11, is the same as the variation in the error component shown by reference numeral 68, which is included in the output signal S21. The error components shown by reference numerals 63 and 68 are caused by the induced magnetic anisotropy of the free layer described above.

Portion (a) of FIG. 13 shows the waveform of the output signal S12 of the difference circuit 112. Portion (b) of FIG. 13 shows the waveform of the output signal S22 of the difference circuit 122. In each of portions (a) and (b) of FIG. 13, the horizontal axis indicates the angle θ, while the vertical axis indicates the signal value in like manner with FIG. 6 and FIG. 7. In FIG. 13, the same waveforms as those in FIG. 10 are denoted with the same reference numerals as those in FIG. 10. Reference numerals 70 and 75 each indicate an ideal sinusoidal curve. Reference numerals 71 and 76 indicate the waveforms of the third error components included in the respective output signals. Reference numerals 73 and 78 indicate the waveforms of error components that depend on the variation in the direction of the rotating magnetic field MF, included in the respective output signals. Reference numerals 74 and 79 indicate the waveforms of the output signals that are distorted due to the MR elements. The waveforms shown in FIG. 13 were generated by simulation. As shown in FIG. 13, the variation in the error component shown by reference numeral 73, which is included in the output signal S12, is the same as the variation in the error component shown by reference numeral 78, which is included in the output signal S22. The error components shown by reference numerals 73 and 78 are caused by the induced magnetic anisotropy of the free layer described above.

As shown in FIG. 12, the error component shown by reference numeral 63 and the error component shown by reference numeral 68 vary in synchronization with each other, each with a period of ⅓ the signal period T, i.e., 2π/3 (120°). Likewise, as shown in FIG. 13, the error component shown by reference numeral 73 and the error component shown by reference numeral 78 vary in synchronization with each other, each with a period of ⅓ the signal period T, i.e., 2π/3 (120°). As such, the error components shown by reference numerals 63, 68, 73, and 78 have the same period as the period of the third error component (the third error component period). However, the error components shown by reference numerals 63, 68, 73, and 78 do not necessarily have the same phase as that of the ideal sinusoidal curves shown by reference numerals 60, 65, 70, and 75, and do not necessarily have the same phase as that of the third error component. This is because, as described previously, there are cases where an induced magnetic anisotropy of the free layer occurring after the installation of the rotating field sensor 1 causes the direction of easy magnetization to be oriented in an arbitrary direction. Hereinafter, the error components shown by reference numerals 63, 68, 73, and 78 will be referred to as out-of-phase error components. The error in the detected angle value θs caused by the out-of-phase error components cannot be reduced by the aforementioned method of reducing the third error components. To cope with this, in the present embodiment, the first and second signals S1 and S2 with the reduced third error components are corrected by the angle detection unit 3 in the manner described below. The error in the detected angle value θs caused by the out-of-phase error components is thereby reduced.

The out-of-phase error components shown by reference numerals 63, 68, 73, and 78 may or may not be of the same amplitude. For the sake of simplicity, the following description assumes that the out-of-phase error components shown by reference numerals 63, 68, 73, and 78 are of the same amplitude.

First, a description will be given of the output signals S11, S12, S21, and S22 each of which includes the third error component and the out-of-phase error component. The output signals S11, S12, S21, and S22 are expressed by the following equations (5) to (8), respectively, where p is the amplitude of the third error component, f is the amplitude of the out-of-phase error component, and φ is the initial phase of the out-of-phase error component, i.e., the phase of the out-of-phase error component at θ=0. Note that φ takes on an arbitrary value.

$$S11 = \sin\theta1 - p\cdot\sin3\theta1 + f\cdot\sin(3\theta+\phi) \tag{5}$$

$$S12 = \cos\theta1 + p\cdot\cos3\theta1 + f\cdot\cos(3\theta+\phi) \tag{6}$$

$$S21 = \sin\theta2 - p\cdot\sin3\theta2 + f\cdot\sin(3\theta+\phi) \tag{7}$$

$$S22 = \cos\theta2 + p\cdot\cos3\theta2 + f\cdot\cos(3\theta+\phi) \tag{8}$$

Letting θ1 and θ2 be expressed as θ+π/6 and θ−π/6, respectively, the first signal S1 is expressed by the following equation (9).

$$\begin{aligned}
S1 &= S11 + S21 \\
&= \sin\theta1 - p\cdot\sin3\theta1 + f\cdot\sin(3\theta+\phi) + \\
&\quad \sin\theta2 - p\cdot\sin3\theta2 + f\cdot\sin(3\theta+\phi) \\
&= \sin(\theta+\pi/6) - p\cdot\sin3(\theta+\pi/6) + \\
&\quad \sin(\theta-\pi/6) - p\cdot\sin3(\theta-\pi/6) + \\
&\quad 2f\cdot\sin(3\theta+\phi) \\
&= 1.73\,\sin\theta + 2f\cdot\sin(3\theta+\phi)
\end{aligned} \tag{9}$$

As has been described with reference to FIG. 9 and the equation (2), adding the output signal S11 and the output signal S21 causes the third error components included in the respective output signals S11 and S21 to cancel each other out. However, the out-of-phase error components included in the respective output signals S11 and S21 cannot cancel each other out. As a result, the first signal S1 includes an error component resulting from the out-of-phase error components. The error component of the first signal S1 resulting from the out-of-phase error components will hereinafter be referred to as the first error component.

The second signal S2 is expressed by the following equation (10), which is similar to the equation (9).

$$\begin{aligned}
S2 &= S12 + S22 \\
&= \cos\theta1 + p\cdot\cos3\theta1 + f\cdot\cos(3\theta+\phi) + \\
&\quad \cos\theta2 + p\cdot\cos3\theta2 + f\cdot\cos(3\theta+\phi) \\
&= \cos(\theta+\pi/6) + p\cdot\cos3(\theta+\pi/6) + \\
&\quad \cos(\theta-\pi/6) + p\cdot\cos3(\phi-\pi/6) + \\
&\quad 2f\cdot\cos(3\theta+\phi) \\
&= 1.73\,\cos\theta + 2f\cdot\cos(3\theta+\phi)
\end{aligned} \tag{10}$$

As has been described with reference to FIG. 10 and the equation (3), adding the output signal S12 and the output signal S22 causes the third error components included in the respective output signals S12 and S22 to cancel each other out. However, the out-of-phase error components included in the respective output signals S12 and S22 cannot cancel each other out. As a result, the second signal S2 includes an error component resulting from the out-of-phase error components. The error component of the second signal S2 resulting from the out-of-phase error components will hereinafter be referred to as the second error component.

The following describes the method of calculating the detected angle value θs in the present embodiment. The first and second arithmetic circuits 131 and 132 respectively generate the first and second signals S1 and S2 that are associated with the intensities of components of the rotating magnetic field in mutually different directions and that are normalized to have the same amplitude. The normalized first and second signals S1 and S2 are supplied to the angle detection unit 3. In the angle detection unit 3, the first arithmetic unit 31 first generates a sum of squares signal $S1^2+S2^2$. The sum of squares signal $S1^2+S2^2$ is made up of the sum of the square of the first signal S1 and the square of the second signal S2, and has a period of ½ the signal period T. More specifically, the first arithmetic unit 31 calculates a temporary detected angle value θt based on the first and second signals S1 and S2, and expresses the sum of squares signal $S1^2+S2^2$ as a function of the temporary detected angle value θt.

Figure 14:
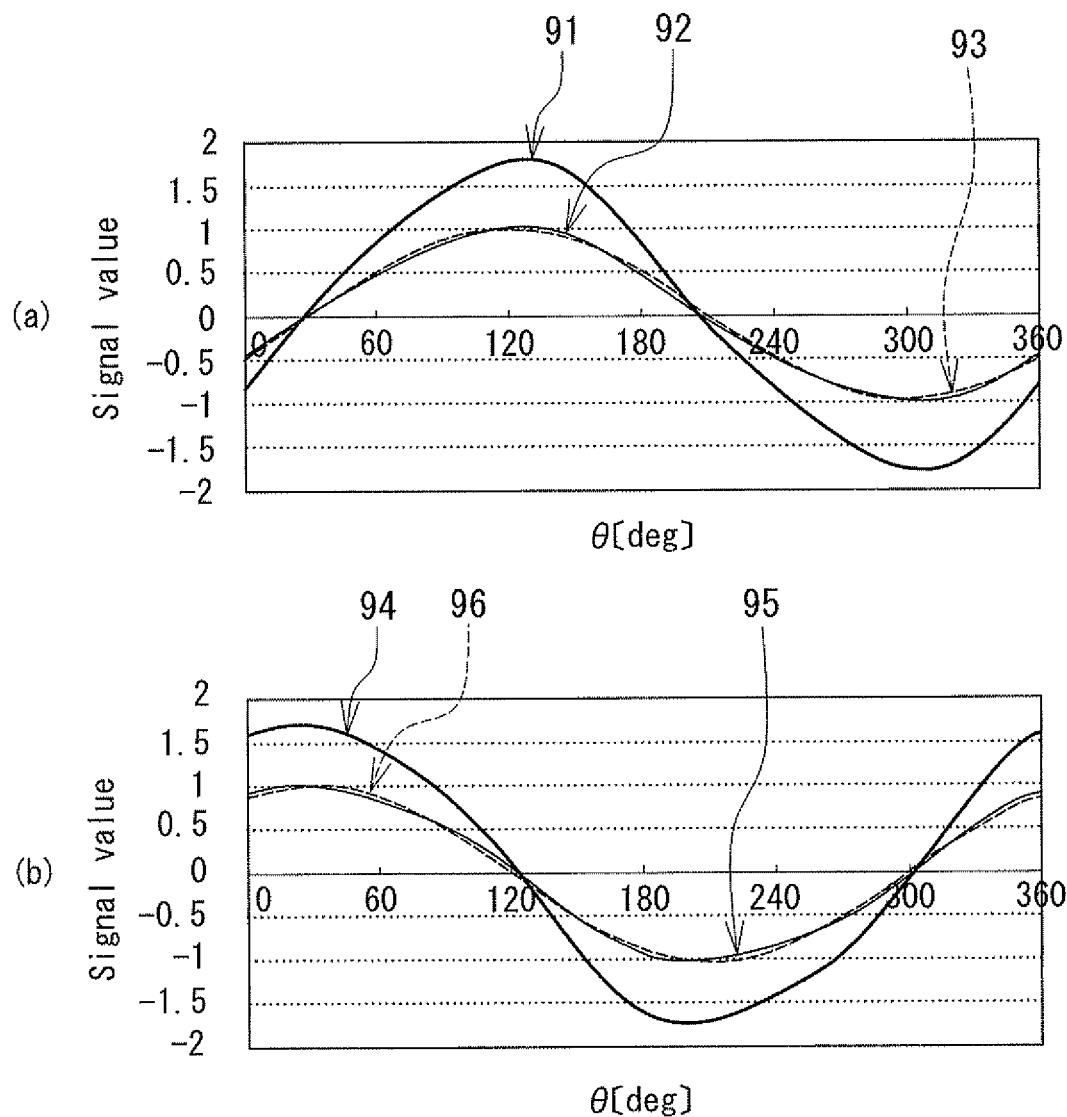
FIG. 14 is a waveform chart showing the waveforms of the first and second signals and first and second corrected signals of the first embodiment of the invention.
Figure 15:
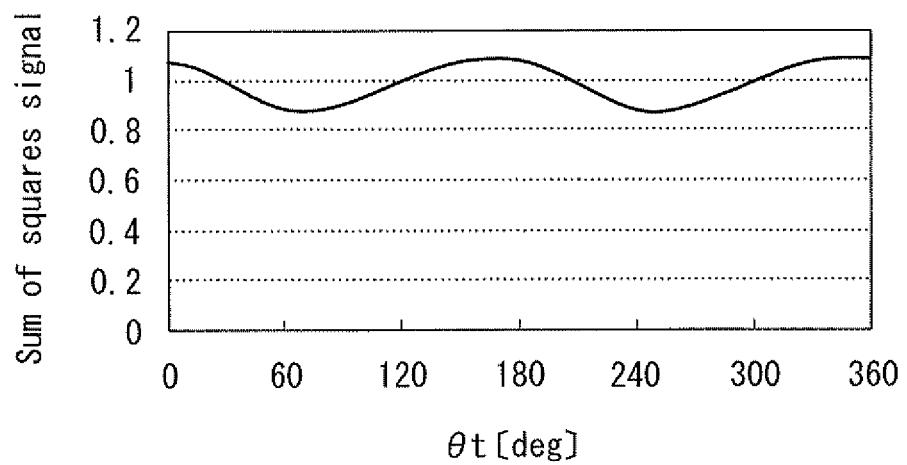
FIG. 15 is a waveform chart showing the waveform of a sum of squares signal of the first embodiment of the invention.

Reference is now made to FIG. 14 and FIG. 15 to describe the process of generating the sum of squares signal and the property of the sum of squares signal. FIG. 14 shows the waveforms of the first and second signals S1 and S2 that are generated based on the waveforms of the respective output signals shown in FIG. 12 and FIG. 13. Portion (a) of FIG. 14 shows the waveform of the yet-to-be-normalized first signal S1 (reference numeral 91), the waveform of the normalized first signal S1 (reference numeral 92), and the waveform of the first corrected signal (reference numeral 93). Portion (b) of FIG. 14 shows the waveform of the yet-to-be-normalized second signal S2 (reference numeral 94), the waveform of the normalized second signal S2 (reference numeral 95), and the waveform of the second corrected signal (reference numeral 96). In each of portions (a) and (b) of FIG. 14, the horizontal axis indicates the angle θ, while the vertical axis indicates the signal value, where the maximum value of the normalized signal is assumed as 1. The first and second corrected signals will be described later in more detail. Since the normalized first and second signals S1 and S2 include the first and second error components, respectively, the waveforms of the normalized first and second signals S1 and S2 are distorted from a sinusoidal curve, as shown in FIG. 14.

The first arithmetic unit 31 calculates the temporary detected angle value θt based on the first and second signals S1 and S2, by using the following equation (11). The temporary detected angle value θt is a temporary detected value of the angle θ that the direction DM of the rotating magnetic field MF in the reference position PR forms with respect to the reference direction DR.

$$θt=\text{atan}(S1/S2) \quad (11)$$

The first arithmetic unit 31 expresses the sum of squares signal $S1^2+S2^2$ as a function of the temporary detected angle value θt. FIG. 15 shows the waveform of the sum of squares signal $S1^2+S2^2$ expressed as a function of the temporary detected angle value θt. In FIG. 15, the horizontal axis indicates the temporary detected angle value θt, while the vertical axis indicates the value of the sum of squares signal $S1^2+S2^2$.

The first signal S1 includes the first ideal component and the first error component. The second signal S2 includes the second ideal component and the second error component. The first ideal component and the second ideal component vary periodically with the same signal period T in an ideal sinusoidal manner. The second ideal component differs from the first ideal component in phase. More specifically, the second ideal component differs from the first ideal component in phase by an odd number of times ¼ the signal period T. The sum of the square of the first ideal component and the square of the second ideal component takes on a constant value.

If the first signal S1 does not include the first error component and the second signal S2 does not include the second error component, then the sum of squares signal $S1^2+S2^2$ is equal to the sum of the square of the first ideal component and the square of the second ideal component, taking on a constant value. In contrast, with the first and second error components included in the first and second signals S1 and S2, respectively, the sum of squares signal $S1^2+S2^2$ varies with a period of ½ the signal period T, as shown in FIG. 15. The amplitude and the initial phase of the sum of squares signal $S1^2+S2^2$ depend on the amplitude and the initial phase of the first and second error components. Taking advantage of this property, the present embodiment allows the second arithmetic unit 32 to calculate the first error component estimate and the second error component estimate, based on the sum of squares signal $S1^2+S2^2$.

When the first signal S1 includes the first error component and the second signal S2 includes the second error component, the first signal S1 can be expressed as $\sinθ+F·\sin(3θ+φ)$ and the second signal S2 can be expressed as $\cosθ+F·\cos(3θ+φ)$. Here, F represents the amplitude of the first and second error components included in the first and second signals S1 and 52, and has a correspondence relationship with the amplitude f of the out-of-phase error components included in the output signals S11, S12, S21, and S22 expressed by the equations (5) to (8). More specifically, it holds that $F=2f/1.73$. Theoretically, the sum of squares signal $S1^2+S2^2$ is expressed by the following equation (12).

$$\begin{aligned}S1^2 + S2^2 &= \{\sinθ + F·\sin(3θ + φ)\}^2 + \\ &\quad \{\cosθ + F·\cos(3θ + φ)\}^2 \\ &= \sin^2θ + \cos^2θ + \\ &\quad F^2\{\sin^2(3θ + φ) + \cos^2(3θ + φ)\} + \\ &\quad 2F\{\cosθ·\cos(3θ + φ) + \sinθ·\sin(3θ + φ)\} \\ &= 1 + F^2 + 2F·\cos(θ - 3θ + φ) \\ &= 1 + F^2 + 2F·\cos(2θ + φ)\end{aligned} \quad (12)$$

As can be seen from the equation (12), the amplitude and the initial phase of the theoretical sum of squares signal $S1^2+S2^2$ are 2F and φ, respectively. As such, the amplitude and the initial phase of the theoretical sum of squares signal $S1^2+S2^2$ depend on the amplitude F and the initial phase φ of the first and second error components. From the waveform of the actual sum of squares signal $S1^2+S2^2$ expressed as a function of the temporary detected angle value θt shown in FIG. 15, the second arithmetic unit 32 detects the amplitude 2Ft and the initial phase φt of the actual sum of squares signal. The initial phase φt is the phase of the actual sum of squares signal $S1^2+S2^2$ at θt=0. The term 2Ft is equivalent to an estimated value of 2F in the equation (12), and φt is equivalent to an estimated value of φ in the equation (12). In this case, the actual sum of squares signal $S1^2+S2^2$ is expressed as $1+Ft^2+2Ft·\cos(2θt+φt)$. Here, it is assumed that the yet-to-be-normalized first signal S1 expressed by the equation (9) is divided by Sa to generate the normalized first signal S1, while the yet-to-be-normalized second signal S2 expressed by the equation (10) is divided by Sb to generate the normalized second signal S2. In this case, Ft is f/(Sa+Sb). This is nearly equal to F that is determined from 2f/1.73.

The following describes a specific example of the method of detecting the amplitude 2Ft and the initial phase φt of the actual sum of squares signal. For example, the second arithmetic unit 32 detects the maximum and minimum values of the sum of squares signal $S1^2+S2^2$ from the waveform of the actual sum of squares signal $S1^2+S2^2$, and determines ½ the difference between the maximum value and the minimum value as the amplitude 2Ft. Furthermore, from the waveform of the actual sum of squares signal $S1^2+S2^2$, the second arithmetic unit 32 detects a temporary detected angle value θt at which the sum of squares signal $S1^2+S2^2$ is maximized. Such a temporary detected angle value θt is detected within the range from 0 to less than 2π. If the detected value is equal to or greater than 0 and smaller than π, then the detected value is defined as θmax. If the detected value is equal to or greater than π and smaller than 2π, then π is subtracted from that value, and the resultant value is defined as θmax. Since the sum of squares signal $S1^2+S2^2$ takes on the maximum value when 2θmax+φt=2π, the second arithmetic unit 32 detects 2π−2θmax as the initial phase φt.

The second arithmetic unit 32 calculates the first and second error component estimates et1 and et2 using the amplitude 2Ft and the initial phase φt of the actual sum of squares signal and the temporary detected angle value θt. More specifically, the first error component estimate et1 is calculated as Ft·sin(3θt+φt), and the second error component estimate et2 is calculated as Ft·cos(3θt+φt). The second arithmetic unit 32 may detect 2Ft and φt at intervals of once per period of the sum of squares signal $S1^2+S2^2$ or at intervals of once every two or more periods of the sum of squares signal $S1^2+S2^2$ to update the first and second error component estimates et1 and et2.

In the angle detection unit 3, the third arithmetic unit 33 then subtracts the first error component estimate et1 from the first signal S1 to generate the first corrected signal St1 and subtracts the second error component estimate et2 from the second signal S2 to generate the second corrected signal St2. More specifically, the third arithmetic unit 33 generates the first corrected signal St1 by subtracting the latest first error component estimate et1 updated at the second arithmetic unit 32 from the latest first signal S1 given by the signal generation unit 2. The third arithmetic unit 33 also generates the second corrected signal St2 by subtracting the latest second error component estimate et2 updated at the second arithmetic unit 32 from the latest second signal S2 given by the signal generation unit 2. Based on the first and second corrected signals St1 and St2, the third arithmetic unit 33 then calculates the detected angle value θs having a correspondence relationship with the angle θ that the direction DM of the rotating magnetic field MF in the reference position PR forms with respect to the reference direction DR. In FIG. 14, reference numeral 93 indicates the waveform of the first corrected signal St1, and reference numeral 96 indicates the waveform of the second corrected signal St2. The detected angle value θs is calculated by the following equation (13).

$$\theta s = a\tan(St1/St2) \quad (13)$$
$$= a\tan\{(S1-et1)/(S2-et2)\}$$

Figure 16:
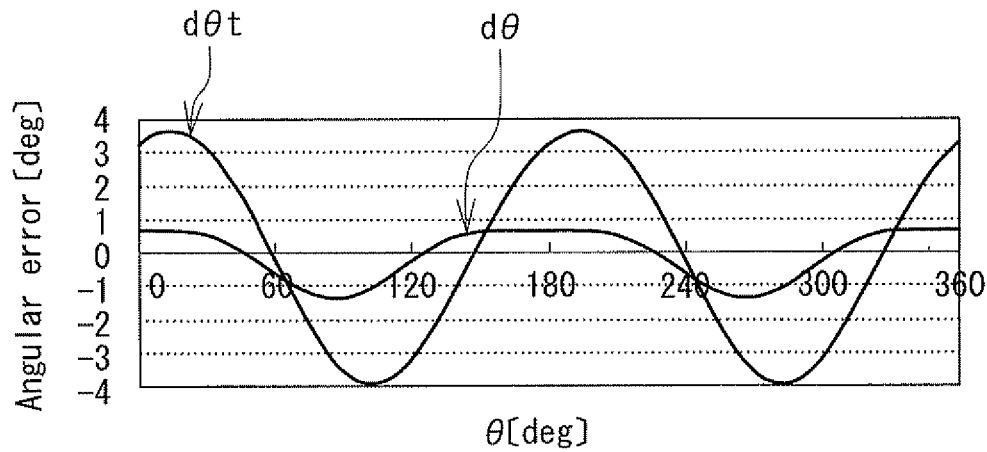
FIG. 16 is a waveform chart showing the waveforms of an angular error included in the detected angle value calculated based on the first and second signals and an angular error included in the detected angle value calculated based on the first and second corrected signals.

FIG. 16 shows an angular error dθt that is included in the temporary detected angle value θt calculated by the equation (11) based on the waveforms of the first and second signals S1 and S2 (reference numerals 92 and 95) shown in FIG. 14, and an angular error dθ that is included in the detected angle value θs calculated by the equation (13) based on the waveforms of the first and second corrected signals St1 and St2 (reference numerals 93 and 96) shown in FIG. 14. In FIG. 16, the horizontal axis indicates the angle θ, while the vertical axis indicates the angular error. As shown in FIG. 16, the angular error de is smaller than the angular error dθt.

As such, according to the present embodiment, even when the first signal S1 includes the first error component resulting from the out-of-phase error component and the second signal S2 includes the second error component resulting from the out-of-phase error component, it is possible to calculate the first and second error component estimates et1 and et2 by taking advantage of the property of the sum of squares signal $S1^2+S2^2$. According to the present embodiment, the detected angle value θs is calculated based on the first corrected signal St1 generated by subtracting the first error component estimate et1 from the first signal S1, and the second corrected signal St2 generated by subtracting the second error component estimate et2 from the second signal S2. This makes it possible to reduce the error in the detected angle value θs.

Consequently, according to the present embodiment, it is possible to reduce the error in the detected angle even when an error component included in the output signal of a magnetic detection element has an arbitrary phase.

Figure 17:
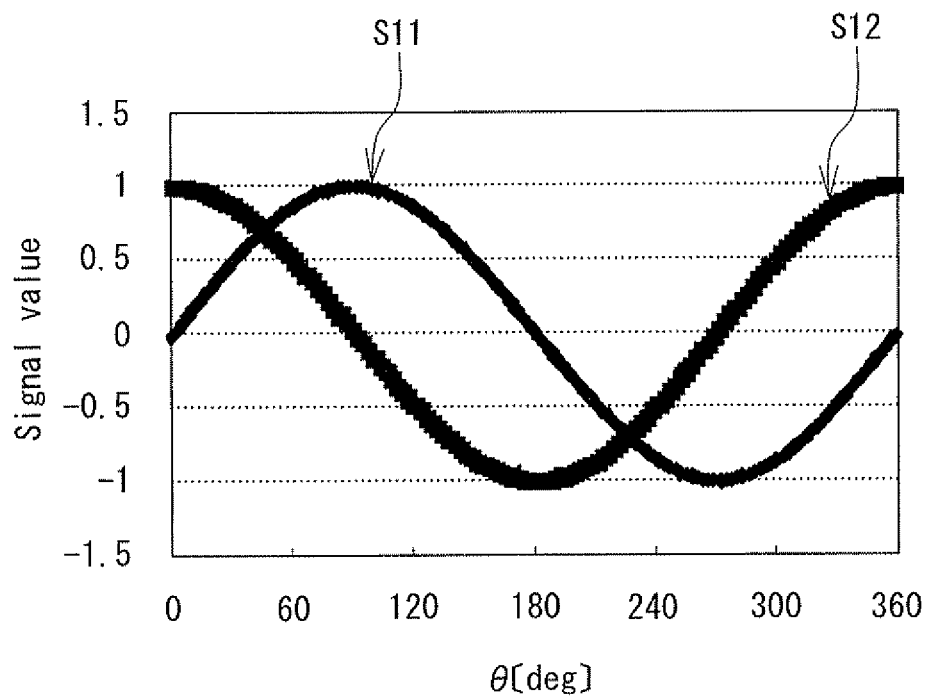
FIG. 17 is a waveform chart showing the waveforms of the output signals of the first and second detection circuits of the first embodiment of the invention.

With reference to actual measurement results, the following describes the fact that the present embodiment allows for reducing the error in the detected angle. FIG. 17 shows actually measured values of the output signals S11 and S12 of the difference circuits 111 and 112. In FIG. 17, the horizontal axis indicates the angle θ, while the vertical axis indicates the signal value in like manner with FIG. 6 and FIG. 7. Although not shown in the drawing, actually measured values of the output signals S21 and S22 of the difference circuits 121 and 122 are the same as those of the output signals S11 and S12 except that the output signals S21 and S22 differ from the output signals S11 and S12 in phase by π/3 (60°). As already described, the first arithmetic circuit 131 generates the first signal S1 based on the output signals S11 and S21. The first signal S1 has a correspondence relationship with both the intensity of the component of the rotating magnetic field MF in the first direction D1 and the intensity of the component of the rotating magnetic field MF in the third direction D3. The first signal S1 includes a smaller third error component than the third error components included in the output signals S11 and S21. The second arithmetic circuit 132 generates the second signal S2 based on the output signals S12 and S22. The second signal S2 has a correspondence relationship with both the intensity of the component of the rotating magnetic field MF in the second direction D2 and the intensity of the component of the rotating magnetic field MF in the fourth direction D4. The second signal S2 includes a smaller third error component than the third error components included in the output signals S12 and S22. The first signal S1 includes the first ideal component and the first error component. The second signal S2 includes the second ideal component and the second error component.

Figure 18:
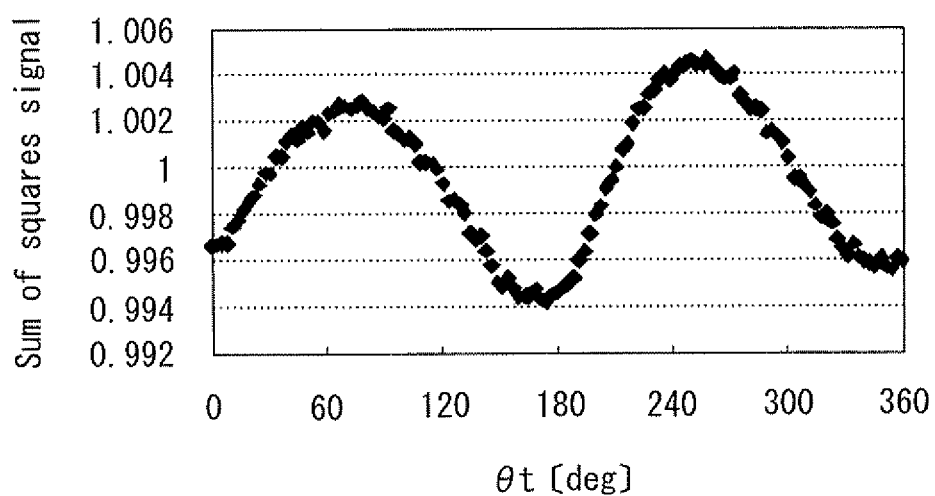
FIG. 18 is a waveform chart showing the waveform of the sum of squares signal of the first embodiment of the invention.

The first arithmetic unit 31 generates the sum of squares signal $S1^2+S2^2$. The first arithmetic unit 31 calculates the temporary detected angle value θt based on the first and second signals S1 and S2, and expresses the sum of squares signal $S1^2+S2^2$ as a function of the temporary detected angle value θt. FIG. 18 shows actually measured values of the sum of squares signal $S1^2+S2^2$. In FIG. 18, the horizontal axis indicates the temporary detected angle value θt, while the vertical axis indicates values of the sum of squares signal $S1^2+S2^2$.

The second arithmetic unit 32 calculates the first and second error component estimates et1 and et2 based on the sum of squares signal $S1^2+S2^2$ shown in FIG. 18. The third arithmetic unit 33 generates the first corrected signal St1 by subtracting the first error component estimate et1 from the first signal S1, and generates the second corrected signal St2 by subtracting the second error component estimate et2 from the second signal S2. The third arithmetic unit 33 then calculates the detected angle value θs based on the first and second corrected signals St1 and St2.

Figure 19:
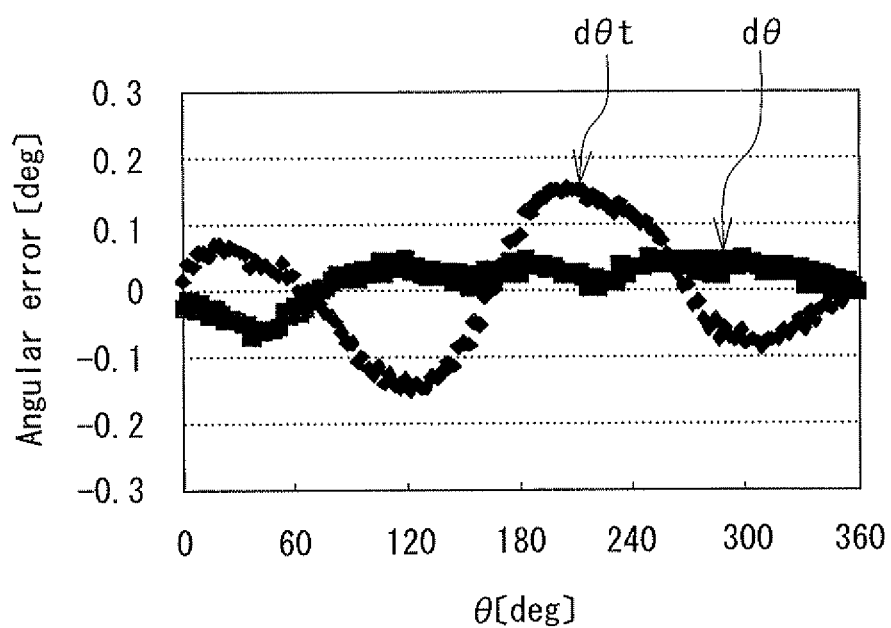
FIG. 19 is a waveform chart showing the waveforms of an angular error included in the detected angle value calculated based on the first and second signals and an angular error included in the detected angle value calculated based on the first and second corrected signals.

FIG. 19 shows an angular error de that is included in the detected angle value θs calculated as described above. FIG. 19 also shows an angular error dθt that is included in the temporary detected angle value θt calculated based on the first and second signals S1 and S2. In FIG. 19, the horizontal axis indicates the angle θ, and the vertical axis indicates the angular error. As shown in FIG. 19, the angular error dθ is smaller than the angular error dθt. In the example shown in FIG. 19, the angular error dθt has an amplitude of ±0.15°, and the angular error de has an amplitude of ±0.07°.

According to the present embodiment, as described above, the detected angle value θs is calculated based on the first corrected signal St1 generated by subtracting the first error component estimate et1 from the first signal S1, and the second corrected signal et2 generated by subtracting the second error component estimate et2 from the second signal S2. This makes it possible to reduce the angular error included in the detected angle value θs.

The fail-safe function of the rotating field sensor 1 will now be described in detail. The fail-safe function allows the angle detection unit 3 to output the detected angle value θs even if any of the first to fourth detection circuits 11, 12, 21, and 22 is broken down. The operation of the fail-safe function, i.e., the operation of the control unit 4, will now be described with reference to FIG. 3. In a normal state, i.e., when all the first to fourth detection circuits 11, 12, 21, and 22 are normally operated, the control unit 4 brings each of the switches SW1 to SW8 shown in FIG. 3 into a conduction state. In this case, the angle detection unit 3 calculates the detected angle value θs by the method that has been described with reference to the equations (5) to (13).

If one or both of the third and fourth detection circuits 21 and 22 are broken down, the control unit 4 brings each of the switches SW1 to SW4 into a conduction state and brings each of the switches SW5 to SW8 into a non-conduction state. In this case, only the output signal S11 of the difference circuit 111 is supplied to the first arithmetic circuit 131, and only the output signal S12 of the difference circuit 112 is supplied to the second arithmetic circuit 132. In this case, the yet-to-be-normalized first signal S1 is equal to the output signal S11, and the yet-to-be-normalized second signal S2 is equal to the output signal S12. The angle detection unit 3 then calculates the detected angle value θs using the following equation (14).

$$\theta s = a\tan(S1/S2) - \pi/6 \qquad (14)$$
$$= a\tan(S11/S12) - \pi/6$$

If the output signal S11 includes only the ideal sinusoidal component sin θ1 and the output signal S12 includes only the ideal sinusoidal component cos θ1, then S11/S12 in the equation (14) is equal to sin θ1/cos θ1, and θs calculated by the equation (14) is equal to θ1−π/6.

The angle detection unit 3 may also calculate the detected angle value θs by the method that has been described with reference to the equations (5) to (13). That is, according to this method, the first arithmetic unit 31 generates a sum of squares signal $S11^2+S12^2$ that is made up of the sum of the square of the normalized first signal S1 or the normalized output signal S11 and the square of the normalized second signal S2 or the normalized output signal S12. The sum of squares signal $S11^2+S12^2$ has a period of ½ the signal period T. The first arithmetic unit 31 calculates a temporary detected angle value based on the normalized output signals S11 and S12, and expresses the sum of squares signal $S11^2+S12^2$ as a function of the temporary detected angle value. The second arithmetic unit 32 calculates first and second error component estimates based on the sum of squares signal $S11^2+S12^2$. The third arithmetic unit 33 generates a first corrected signal by subtracting the first error component estimate from the normalized output signal S11, and generates a second corrected signal by subtracting the second error component estimate from the normalized output signal S12. Based on the first and second corrected signals, the third arithmetic unit 33 then calculates the detected angle value θs.

If one or both of the first and second detection circuits 11 and 12 are broken down, the control unit 4 brings each of the switches SW1 to SW4 into a non-conduction state and brings each of the switches SW5 to SW8 into a conduction state. In this case, only the output signal S21 of the difference circuit 121 is supplied to the first arithmetic circuit 131, and only the output signal S22 of the difference circuit 122 is supplied to the second arithmetic circuit 132. In this case, the yet-to-be-normalized first signal S1 is equal to the output signal S21, and the yet-to-be-normalized second signal S2 is equal to the output signal S22. The angle detection unit 3 then calculates the detected angle value θs using the following equation (15).

$$\theta s = a\tan(S1/S2) + \pi/6 \qquad (15)$$
$$= a\tan(S21/S22) + \pi/6$$

If the output signal S21 includes only the ideal sinusoidal component sin θ2 and the output signal S22 includes only the ideal sinusoidal component cos θ2, then S21/S22 in the equation (15) is equal to sin θ2/cos θ2, and θs calculated by the equation (15) is equal to θ2+π/6.

The angle detection unit 3 may also calculate the detected angle value θs by the method that has been described with reference to the equations (5) to (13). That is, according to this method, the first arithmetic unit 31 of the angle detection unit 3 generates a sum of squares signal $S21^2+S22^2$ that is made up of the sum of the square of the normalized first signal S1 or the normalized output signal S21 and the square of the normalized second signal S2 or the normalized output signal S22. The sum of squares signal $S21^2+S22^2$ has a period of ½ the signal period T. The first arithmetic unit 31 calculates a temporary detected angle value based on the normalized output signals S21 and S22, and expresses the sum of squares signal $S21^2+S22^2$ as a function of the temporary detected angle value. The second arithmetic unit 32 calculates first and second error component estimates based on the sum of squares signal $S21^2+S22^2$. The third arithmetic unit 33 generates a first corrected signal by subtracting the first error component estimate from the normalized output signal S21, and generates a second corrected signal by subtracting the second error component estimate from the normalized output signal S22. Based on the first and second corrected signals, the third arithmetic unit 33 then calculates the detected angle value θs.

The control unit 4 determines the failure of each of the first to fourth detection circuits 11, 12, 21, and 22 in the following manner, for example. The control unit 4 monitors at least one of: the resistance value of the bridge circuit 14 shown in FIG. 3; the potentials at the output ports E11 and E12; and the output values of the A/D converters AD1 and AD2. The resistance value of the bridge circuit 14 is the resistance value between the power supply port V1 and the ground port G1. The control unit 4 determines whether or not the first detection circuit 11 is broken down on the basis of whether or not the value monitored by the control unit 4 falls within a preset normal value range, or whether or not the value monitored by the control unit 4 is an abnormal value. For example, assume that the control unit 4 monitors the potentials at the output ports E11 and E12. In this case, if the power supply voltage supplied to the power supply port V1 is 5 volts and the potentials at the output ports E11 and E12 are 0 volt or 5 volts, the control unit 4 determines that the potentials at the output ports E11 and E12 are abnormal in value, and thus determines that the first detection circuit 11 is broken down. The control unit 4 determines whether or not each of the other detection circuits 12, 21, and 22 is broken down by a method similar to the method of determining the failure of the first detection circuit 11.

MODIFICATION EXAMPLES

Figure 20:
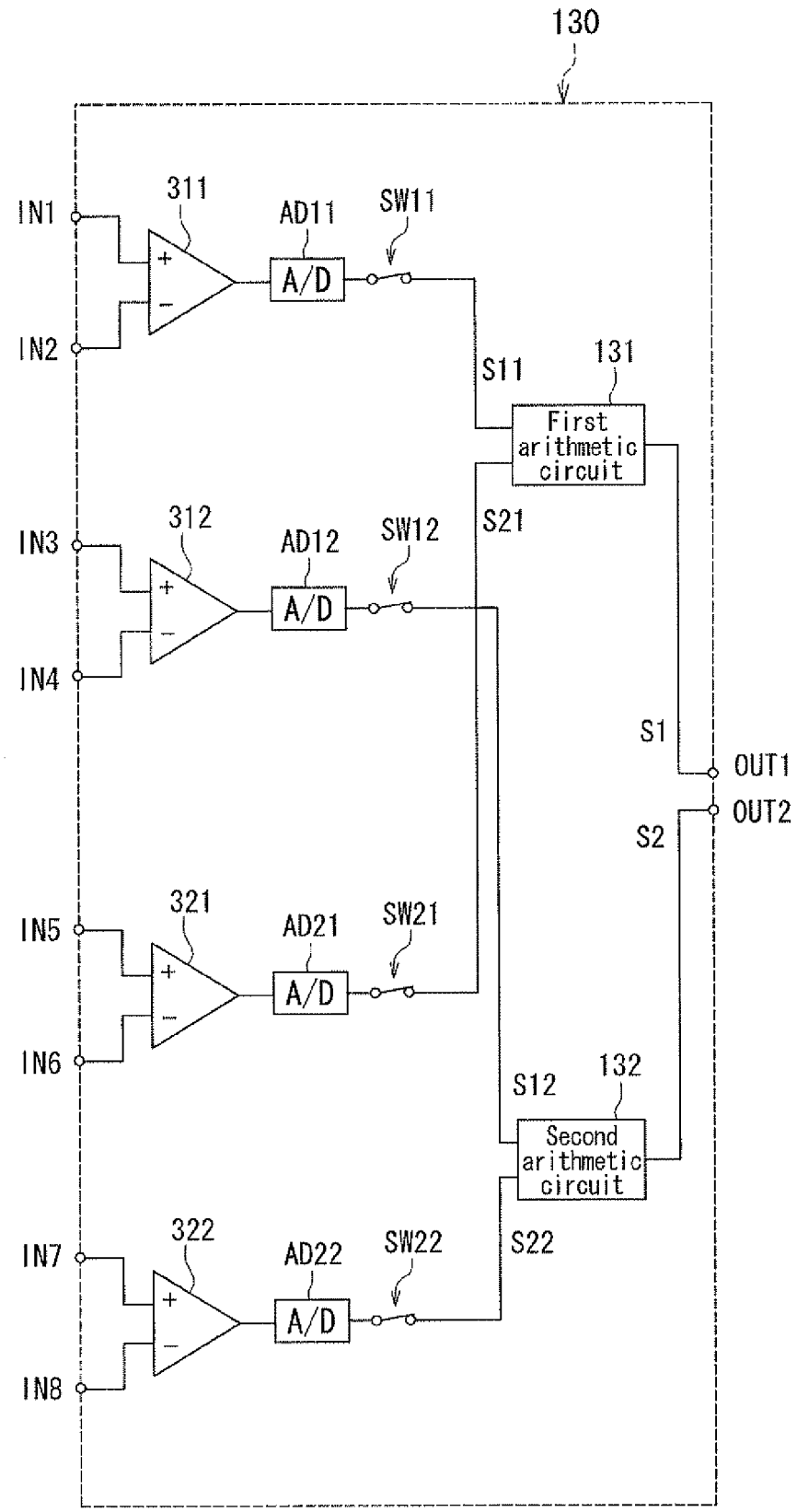
FIG. 20 is a circuit diagram showing an arithmetic unit in a signal generation unit of a first modification example of the first embodiment.
Figure 21:
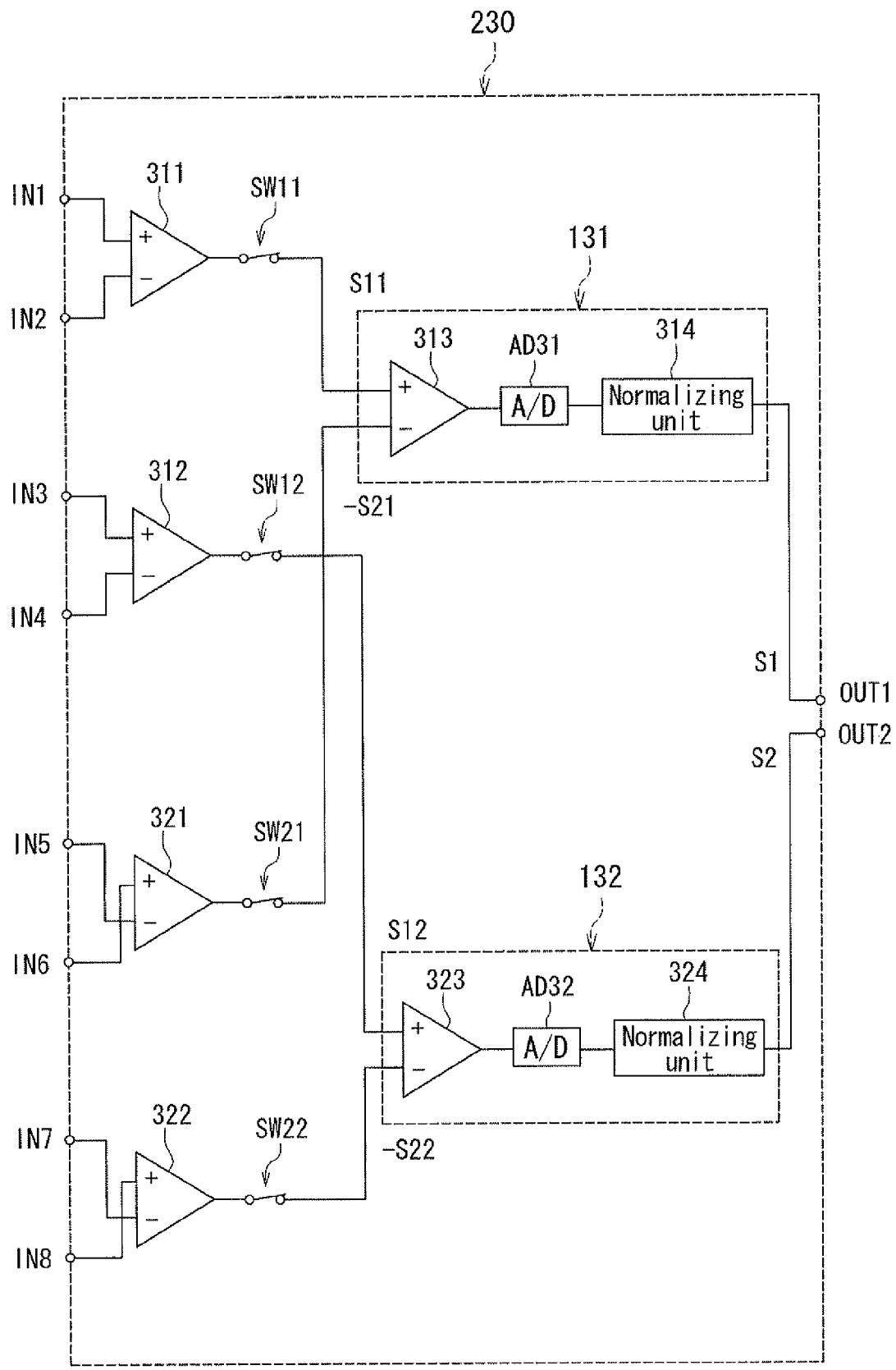
FIG. 21 is a circuit diagram showing an arithmetic unit in a signal generation unit of a second modification example of the first embodiment.
Figure 22:
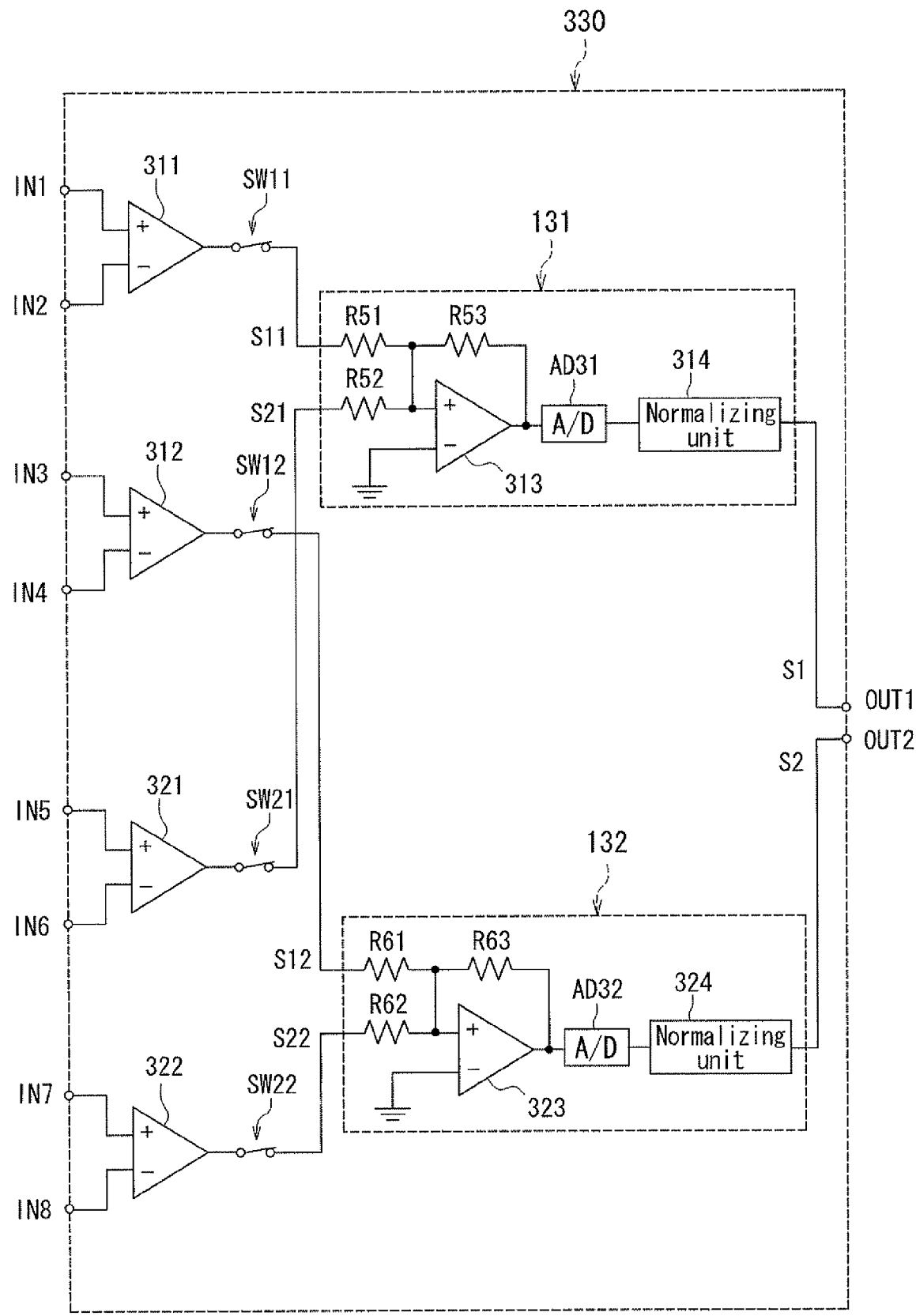
FIG. 22 is a circuit diagram showing an arithmetic unit in a signal generation unit of a third modification example of the first embodiment.

Reference is now made to FIG. 20 to FIG. 22 to describe first to third modification examples of the present embodiment. The first modification example will be described first, with reference to FIG. 20. FIG. 20 is a circuit diagram showing the arithmetic unit of the first modification example. The rotating field sensor of the first modification example has the arithmetic unit 130 shown in FIG. 20, instead of the arithmetic unit 30 shown in FIG. 3. The remainder of the configuration of the rotating field sensor of the first modification example is the same as that of the rotating field sensor 1 shown in FIG. 3.

Like the arithmetic unit 30 shown in FIG. 3, the arithmetic unit 130 has first and second arithmetic circuits 131 and 132, input ports IN1 to IN8, and output ports OUT1 and OUT2. The arithmetic unit 130 further has A/D converters AD11, AD12, AD21, and AD22, switches SW11, SW12, SW21, and SW22, and difference detectors (difference amplifiers) 311, 312, 321, and 322, instead of the A/D converters AD1 to AD8, the switches SW1 to SW8, and the difference circuits 111, 112, 121, and 122 of the arithmetic unit 30 shown in FIG. 3. Each of the switches SW11, SW12, SW21, and SW22 has a first port and a second port, and allows one of the conduction and non-conduction states between the first and second ports to be selected. Each of the difference detectors 311, 312, 321, and 322 has first and second inputs and an output.

The first and second inputs of the difference detector 311 are connected to the input ports IN1 and IN2, respectively. The first and second inputs of the difference detector 312 are connected to the input ports IN3 and IN4, respectively. The first and second inputs of the difference detector 321 are connected to the input ports IN5 and IN6, respectively. The first and second inputs of the difference detector 322 are connected to the input ports IN7 and IN8, respectively. The inputs of the AD converters AD11, AD12, AD21, and AD22 are connected to the outputs of the difference detectors 311, 312, 321, and 322, respectively. The first ports of the switches SW11, SW12, SW21, and SW22 are connected to the outputs of the AD converters AD11, AD12, AD21, and AD22, respectively.

The difference detector 311 outputs a signal corresponding to the potential difference between the output ports E11 and E12 shown in FIG. 3. The A/D converter AD11 converts the signal output from the difference detector 311 to a digital signal and outputs the resultant digital signal. The difference detector 312 outputs a signal corresponding to the potential difference between the output ports E21 and E22 shown in FIG. 3. The A/D converter AD12 converts the signal output from the difference detector 312 to a digital signal and outputs the resultant digital signal. The difference detector 321 outputs a signal corresponding to the potential difference between the output ports E31 and E32 shown in FIG. 3. The A/D converter AD21 converts the signal output from the difference detector 321 to a digital signal and outputs the resultant digital signal. The difference detector 322 outputs a signal corresponding to the potential difference between the output ports E41 and E42 shown in FIG. 3. The A/D converter AD22 converts the signal output from the difference detector 322 to a digital signal and outputs the resultant digital signal.

Ideally, the output signals of the A/D converters AD11 and AD21 have sine waveforms that depend on the angles $\theta 1$ and $\theta 2$, respectively. Ideally, the output signals of the A/D converters AD12 and AD22 have cosine waveforms that depend on the angles $\theta 1$ and $\theta 2$, respectively. Hereinafter, the output signals of the A/D converters AD11, AD12, AD21, and AD22 will be designated by S11, S12, S21, and S22, respectively.

In the first modification example, the first input of the first arithmetic circuit 131 is connected to the second port of the switch SW11. The second input of the first arithmetic circuit 131 is connected to the second port of the switch SW21. The first input of the second arithmetic circuit 132 is connected to the second port of the switch SW12. The second input of the second arithmetic circuit 132 is connected to the second port of the switch SW22.

In a normal state, each of the switches SW11, SW12, SW21, and SW22 is in a conduction state. When in this state, the A/D converter AD11 outputs a signal (S11) corresponding to the potential difference between the output ports E11 and E12 to the first arithmetic circuit 131. The A/D converter AD12 outputs a signal (S12) corresponding to the potential difference between the output ports E21 and E22 to the second arithmetic circuit 132. The A/D converter AD21 outputs a signal (S21) corresponding to the potential difference between the output ports E31 and E32 to the first arithmetic circuit 131. The A/D converter AD22 outputs a signal (S22) corresponding to the potential difference between the output ports E41 and E42 to the second arithmetic circuit 132.

In the first modification example, in a normal state, i.e., when all the first to fourth detection circuits 11, 12, 21, and 22 shown in FIG. 3 are normally operated, the control unit 4 brings each of the switches SW11, SW12, SW21, and SW22 into a conduction state. If one or both of the third and fourth detection circuits 21 and 22 shown in FIG. 3 are broken down, the control unit 4 brings each of the switches SW11 and SW12 into a conduction state and brings each of the switches SW21 and SW22 into a non-conduction state. If one or both of the first and second detection circuits 11 and 12 shown in FIG. 3 are broken down, the control unit 4 brings each of the switches SW11 and SW12 into a non-conduction state and brings each of the switches 21 and 22 into a conduction state.

In the first modification example, the control unit 4 determines the failure of each of the first to fourth detection circuits 11, 12, 21, and 22 shown in FIG. 3 in the following manner, for example. The control unit 4 monitors at least one of the resistance value of the bridge circuit 14 shown in FIG. 3; the potentials at the output ports E11 and E12; the output value of the difference detector 311; and the output value of the A/D converter AD11, and thereby determines whether or not the first detection circuit 11 is broken down. The control unit 4 determines whether or not each of the other detection circuits 12, 21, and 22 is broken down by a method similar to the method of determining the failure of the first detection circuit 11.

Next, the second modification example of the present embodiment will be described with reference to FIG. 21. FIG. 21 is a circuit diagram showing the arithmetic unit of the second modification example. The rotating field sensor of the second modification example has the arithmetic unit 230 shown in FIG. 21, instead of the arithmetic unit 30 shown in FIG. 3. The remainder of the configuration of the rotating field sensor of the second modification example is the same as that of the rotating field sensor 1 shown in FIG. 3.

Like the arithmetic unit 130 shown in FIG. 20, the arithmetic unit 230 has first and second arithmetic circuits 131 and 132, input ports IN1 to IN8, output ports OUT1 and OUT2, switches SW11, SW12, SW21, and SW22, and difference detectors 311, 312, 321, and 322. The arithmetic unit 230 does not have the A/D converters AD11, AD12, AD21, and AD22 provided in the arithmetic unit 130 shown in FIG. 20.

In the second modification example, the first and second inputs of the difference detector 311 are connected to the input ports IN1 and IN2, respectively. The first and second inputs of the difference detector 312 are connected to the input ports IN3 and IN4, respectively. The first and second inputs of the difference detector 321 are connected to the input ports IN6 and IN5, respectively. The first and second inputs of the difference detector 322 are connected to the input ports IN8 and IN7, respectively. The first ports of the switches SW11, SW12, SW21, and SW22 are connected to the outputs of the difference detectors 311, 312, 321, and 322, respectively.

The difference detector 311 outputs a signal corresponding to the potential difference between the output ports E11 and E12 shown in FIG. 3. The difference detector 312 outputs a signal corresponding to the potential difference between the output ports E21 and E22 shown in FIG. 3. The difference detector 321 outputs a signal corresponding to the potential difference between the output ports E31 and E32 shown in FIG. 3. This signal has a sign opposite to the sign of the signal output from the difference detector 321 of the first modification example. The difference detector 322 outputs a signal corresponding to the potential difference between the output ports E41 and E42 shown in FIG. 3. This signal has a sign opposite to the sign of the signal output from the difference detector 322 of the first modification example. Hereinafter, the output signals of the difference detectors 311, 312, 321, and 322 will be designated by S11, S12, −S21, and −S22, respectively.

In the second modification example, the first arithmetic circuit 131 includes a difference detector 313, an A/D converter AD31, and a normalizing unit 314. The difference detector 313 has first and second inputs and an output. The A/D converter AD31 has an input and an output. The normalizing unit 314 has an input and an output. The first input of the difference detector 313 is connected to the second port of the switch SW11. The second input of the difference detector 313 is connected to the second port of the switch SW21. The input of the A/D converter AD31 is connected to the output of the difference detector 313. The input of the normalizing unit 314 is connected to the output of the A/D converter AD31. The output of the normalizing unit 314 is connected to the output port OUT1.

In a normal state, each of the switches SW11 and SW21 is in a conduction state. When in this state, the difference detector 311 outputs a signal (S11) corresponding to the potential difference between the output ports E11 and E12 to the difference detector 313. The difference detector 321 outputs a signal (−S21) corresponding to the potential difference between the output ports E31 and E32 to the difference detector 313. The difference detector 313 outputs a signal (S11+S21) obtained by subtracting the output signal of the difference detector 321 from the output signal of the difference detector 311. The A/D converter AD31 converts the signal output from the difference detector 313 to a digital signal and outputs the resultant digital signal. The normalizing unit 314 normalizes the signal output from the A/D converter AD31 and outputs the resultant normalized signal.

In the second modification example, the second arithmetic circuit 132 includes a difference detector 323, an A/D converter AD32, and a normalizing unit 324. The difference detector 323 has first and second inputs and an output. The A/D converter AD32 has an input and an output. The normalizing unit 324 has an input and an output. The first input of the difference detector 323 is connected to the second port of the switch SW12. The second input of the difference detector 323 is connected to the second port of the switch SW22. The input of the A/D converter AD32 is connected to the output of the difference detector 323. The input of the normalizing unit 324 is connected to the output of the A/D converter AD32. The output of the normalizing unit 324 is connected to the output port OUT2.

In a normal state, each of the switches SW12 and SW22 is in a conduction state. When in this state, the difference detector 312 outputs a signal (S12) corresponding to the potential difference between the output ports E21 and E22 to the difference detector 323. The difference detector 322 outputs a signal (−S22) corresponding to the potential difference between the output ports E41 and E42 to the difference detector 323. The difference detector 323 outputs a signal (S12+S22) obtained by subtracting the output signal of the difference detector 322 from the output signal of the difference detector 312. The A/D converter AD32 converts the signal output from the difference detector 323 to a digital signal and outputs the resultant digital signal. The normalizing unit 324 normalizes the signal output from the A/D converter AD32 and outputs the resultant normalized signal.

In the second modification example, the control unit 4 determines the failure of each of the first to fourth detection circuits 11, 12, 21, and 22 shown in FIG. 3 in the following manner, for example. The control unit 4 monitors at least one of: the resistance value of the bridge circuit 14 shown in FIG. 3; the potentials at the output ports E11 and E12; the output value of the difference detector 311; the output value of the difference detector 313; the output value of the A/D converter AD31; and the output value of the normalizing unit 314, and thereby determines whether or not the first detection circuit 11 is broken down. The control unit 4 determines whether or not each of the other detection circuits 12, 21, and 22 is broken down by a method similar to the method of determining the failure of the first detection circuit 11.

Next, the third modification example of the present embodiment will be described with reference to FIG. 22. FIG. 22 is a circuit diagram showing the arithmetic unit of the third modification example. The rotating field sensor of the third modification example has the arithmetic unit 330 shown in FIG. 22, instead of the arithmetic unit 30 shown in FIG. 3. The remainder of the configuration of the rotating field sensor of the third modification example is the same as that of the rotating field sensor 1 shown in FIG. 3.

Like the arithmetic unit 230 shown in FIG. 21, the arithmetic unit 330 has first and second arithmetic circuits 131 and 132, input ports IN1 to IN8, output ports OUT1 and OUT2, switches SW11, SW12, SW21, and SW22, and difference detectors 311, 312, 321, and 322. The same input ports as in the first modification example shown in FIG. 20 are connected to the respective inputs of the difference detectors 311, 312, 321, and 322. The first arithmetic circuit 131 includes a difference detector 313, an A/D converter AD31, a normalizing unit 314, and three resistors R51, R52, and R53. The second arithmetic circuit 132 includes a difference detector 323, an A/D converter AD32, a normalizing unit 324, and three resistors R61, R62, and R63.

In the third modification example, the second ports of the switches SW11 and SW21 are connected to the first input of the difference detector 313 via the resistors R51 and R52. The output of the difference detector 313 is connected to the first input of the difference detector 313 via the resistor R53. The second input of the difference detector 313 is connected to the ground. In a normal state, each of the switches SW11 and SW21 is in a conduction state. When in this state, the difference detector 311 outputs a signal (S11) corresponding to the potential difference between the output ports E11 and E12 to the difference detector 313. The difference detector 321 outputs a signal (S21) corresponding to the potential difference between the output ports E31 and E32 to the difference detector 313. The difference detector 313 outputs a signal (S11+S21) obtained by adding the output signal of the difference detector 311 and the output signal of the difference detector 321.

In the third modification example, the second ports of the switches SW12 and SW22 are connected to the first input of the difference detector 323 via the resistors R61 and R62. The output of the difference detector 323 is connected to the first input of the difference detector 323 via the resistor R63. The second input of the difference detector 323 is connected to the ground. In a normal state, each of the switches SW12 and SW22 is in a conduction state. When in this state, the difference detector 312 outputs a signal (S12) corresponding to the potential difference between the output ports E21 and E22 to the difference detector 323. The difference detector 322 outputs a signal (S22) corresponding to the potential difference between the output ports E41 and E42 to the difference detector 323. The difference detector 323 outputs a signal (S12+S22) obtained by adding the output signal of the difference detector 312 and the output signal of the difference detector 322.

In the third modification example, the control unit 4 determines the failure of each of the first to fourth detection circuits 11, 12, 21, and 22 shown in FIG. 3 by, for example, the same method as that in the second modification example.

[Second Embodiment]

Figure 23:
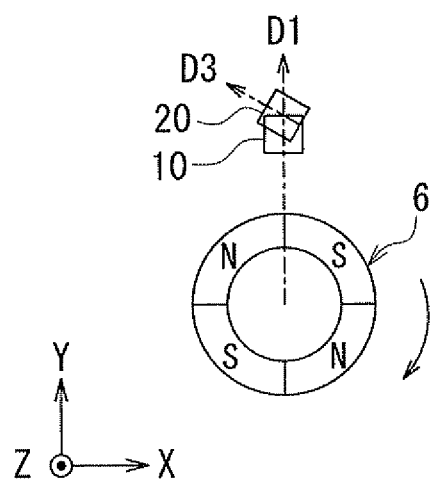
FIG. 23 is an explanatory diagram showing the configuration of a rotating field sensor according to a second embodiment of the invention.

A rotating field sensor according to a second embodiment of the invention will now be described with reference to FIG. 23. FIG. 23 is an explanatory diagram showing the configuration of the rotating field sensor according to the present embodiment. In FIG. 23, a magnet 6 including one or more pairs of N and S poles alternately arranged in a ring shape is shown as an example of the means for generating a rotating magnetic field whose direction rotates. In the example shown in FIG. 23, the magnet 6 includes two pairs of N and S poles. The rotating field sensor 1 according to the present embodiment detects the direction of the rotating magnetic field generated from the outer periphery of the magnet 6. In the example shown in FIG. 23, the plane of the drawing of FIG. 23 is an XY plane, and the direction perpendicular to the plane is the Z direction. The N and S poles of the magnet 6 are arranged symmetrically with respect to the center of rotation parallel to the Z direction. The magnet 6 rotates about the center of rotation. As a result, a rotating magnetic field occurs based on the magnetic field generated by the magnet 6. The rotating magnetic field rotates about the center of rotation (the Z direction). In the example shown in FIG. 23, the magnet 6 rotates in a clockwise direction, and the rotating magnetic field rotates in a counterclockwise direction.

In the example shown in FIG. 23, the first direction D1 representing the direction of one component of the rotating magnetic field detected by the first detection unit 10 is set to a radial direction of the magnet 6. The third direction D3 representing the direction of one component of the rotating magnetic field detected by the second detection unit 20 is set to the direction rotated from the first direction D1 by 60° in the direction of rotation of the rotating magnetic field in the XY plane. Therefore, the first direction D1 and the third direction D3 differ from each other by 60° in the direction of rotation of the rotating magnetic field. The third direction D3 may be set to the direction rotated from the first direction D1 by −60° in the direction of rotation of the rotating magnetic field in the XY plane.

The first direction D1 and a second direction (not shown), which represents the direction of another component of the rotating magnetic field detected by the first detection unit 10, are in the same relationship as that between the first direction D1 and the second direction D2 in the first embodiment shown in FIG. 2. Similarly, the third direction D3 and a fourth direction (not shown), which represents the direction of another component of the rotating magnetic field detected by the second detection unit 20, are in the same relationship as that between the third direction D3 and the fourth direction D4 in the first embodiment shown in FIG. 2. Instead of the first direction D1, the second direction may be set to the radial direction of the magnet 6. In this case, the fourth direction is the direction rotated from the second direction by 60° in the direction of rotation of the rotating magnetic field in the XY plane.

MODIFICATION EXAMPLES

Figure 24:
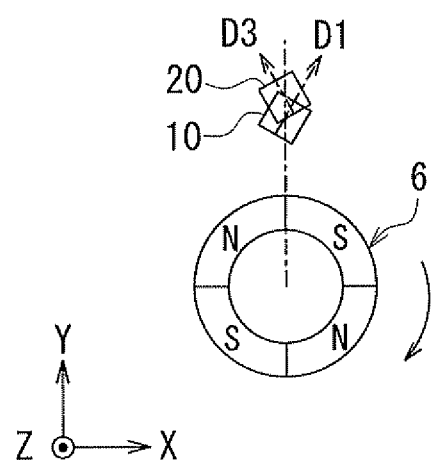
FIG. 24 is an explanatory diagram showing the configuration of a rotating field sensor of a first modification example of the second embodiment of the invention.

Reference is now made to FIG. 24 to FIG. 26 to describe first to third modification examples of the present embodiment. The first modification example will be described first, with reference to FIG. 24. FIG. 24 is an explanatory diagram showing the configuration of a rotating field sensor of the first modification example of the present embodiment. The configuration of the rotating field sensor 1 of the first modification example is basically the same as that of the rotating field sensor shown in FIG. 23. In the example shown in FIG. 24, the first direction D1 and the third direction D3 differ from each other by 60° in the direction of rotation of the rotating magnetic field, and are both tilted with respect to the radial direction of the magnet 6 in the XY plane. Preferably, the angles that the first direction D1 and the third direction D3 form with respect to the radial direction of the magnet 6 are equal in absolute value, and more specifically, −30° and 30° (the direction in which the rotating magnetic field rotates shall be positive). Such a configuration allows the positional relationship between the detection unit 10 and the rotating magnetic field and the positional relationship between the detection unit 20 and the rotating magnetic field to be the same, thereby eliminating the need for a correction that would be required when those positional relationships are different.

Next, the second modification example of the present embodiment will be described with reference to FIG. 25. FIG. 25 is an explanatory diagram showing the configuration of a rotating field sensor of the second modification example. In FIG. 25, a magnet 7 including a plurality of pairs of N and S poles alternately arranged in a line is shown as an example of the means for generating a rotating magnetic field whose direction rotates. The rotating field sensor 1 of the second modification example detects the direction of the rotating magnetic field generated from the outer periphery of the magnet 7. In the example shown in FIG. 25, the plane of the drawing of FIG. 25 is an XY plane, and the direction perpendicular to the plane is the Z direction. The magnet 7 makes a straight movement in its longitudinal direction along with a straight movement of an object. As a result, a rotating magnetic field occurs based on the magnetic field generated by the magnet 7. The rotating magnetic field rotates about the Z direction.

In the example shown in FIG. 25, the first direction D1 is set to a direction orthogonal to the direction of movement of the magnet 7 in the XY plane. The third direction D3 is the direction rotated from the first direction D1 by 60° in the direction of rotation of the rotating magnetic field in the XY plane. Therefore, the first direction D1 and the third direction D3 differ from each other by 60° in the direction of rotation of the rotating magnetic field.

Next, the third modification example of the present embodiment will be described with reference to FIG. 26. FIG. 26 is an explanatory diagram showing the configuration of a rotating field sensor of the third modification example. The configuration of the rotating field sensor 1 of the third modification example is basically the same as that of the rotating field sensor 1 shown in FIG. 25. In the example shown in FIG. 26, the first direction D1 and the third direction D3 differ from each other by 60° in the direction of rotation of the rotating magnetic field, and are both tilted with respect to the direction orthogonal to the direction of movement of the magnet 7 in the XY plane. Preferably, as in the first modification example, the angles that the first direction D1 and the third direction D3 form with respect to the direction orthogonal to the direction of movement of the magnet 7 are equal in absolute value, and more specifically, −30° and 30° (the direction in which the rotating magnetic field rotates shall be positive).

The other configuration, operation, and effects of the present embodiment are the same as those of the first embodiment.

[Third Embodiment]

Figure 27:
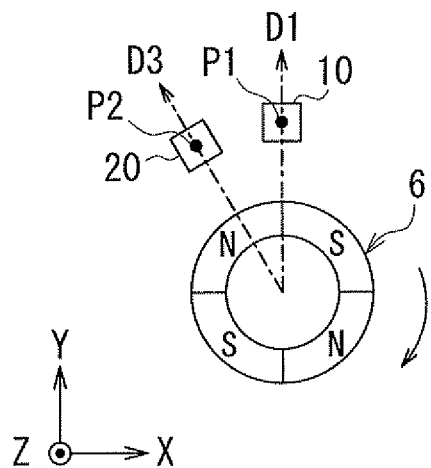
FIG. 27 is an explanatory diagram showing the configuration of a rotating field sensor according to a third embodiment of the invention.

A rotating field sensor according to a third embodiment of the invention will now be described with reference to FIG. 27. FIG. 27 is an explanatory diagram showing the configuration of the rotating field sensor according to the present embodiment. The rotating field sensor 1 according to the present embodiment detects the direction of the rotating magnetic field generated from the outer periphery of the magnet 6, as in the examples of the second embodiment shown in FIG. 23 and FIG. 24. In the rotating field sensor 1 according to the present embodiment, the first position P1 in which the first detection unit 10 detects the rotating magnetic field and the second position P2 in which the second detection unit 20 detects the rotating magnetic field are different from each other. More specifically, in the present embodiment, the first detection unit 10 and the second detection unit 20 are located in different positions. The difference between the first position P1 and the second position P2 is equivalent to an integer multiple of ⅙ the signal period T other than an integer multiple of ½ the signal period T.

In the example shown in FIG. 27, the magnet 6 includes two pairs of N and S poles, and one rotation of the magnet 6 produces two rotations of the rotating magnetic field. In this case, one period of the output signals of the difference circuits 111, 112, 121, and 122 shown in FIG. 3 in the first embodiment, i.e., an electrical angle of 360°, is equivalent to a one-half rotation of the magnet 6, i.e., an angle of rotation of 180° of the magnet 6. The third error components included in the output signals of the difference circuits have a period (a third error component period) of ⅓ the signal period T. The third error component period is equivalent to 120° in electrical angle and to 60° in the angle of rotation of the magnet 6. In the present embodiment, the difference between the first position P1 and the second position P2 is equivalent to an integer multiple of ⅙ the signal period T, i.e., an integer multiple of ½ the third error component period (60° in electrical angle) (other than an integer multiple of ½ the signal period T). FIG. 27 shows an example where the difference between the first position P1 and the second position P2 is equivalent to an integer multiple of 30° in the angle of rotation of the magnet 6 (other than an integer multiple of 90° in the angle of rotation of the magnet 6). In the particular example shown in FIG. 27, the first position P1 and the second position P2 differ from each other by 30° in the angle of rotation of the magnet 6.

In the example shown in FIG. 27, the first direction D1 representing the direction of one component of the rotating magnetic field detected by the first detection unit 10 and the third direction D3 representing the direction of one component of the rotating magnetic field detected by the second detection unit 20 are both set to radial directions of the magnet 6. The first direction D1 and a second direction (not shown), which represents the direction of another component of the rotating magnetic field detected by the first detection unit 10, are in the same relationship as that between the first direction D1 and the second direction D2 in the first embodiment shown in FIG. 2. Similarly, the third direction D3 and a fourth direction (not shown), which represents the direction of another component of the rotating magnetic field detected by the second detection unit 20, are in the same relationship as that between the third direction D3 and the fourth direction D4 in the first embodiment shown in FIG. 2. Consequently, the phase difference between the output signal S11 indicating the intensity of the component of the rotating magnetic field in the first direction D1 at the first position P1 and the output signal S21 indicating the intensity of the component of the rotating magnetic field in the third direction D3 at the second position P2, and the phase difference between the output signal S12 indicating the intensity of the component of the rotating magnetic field in the second direction at the first position P1 and the output signal S22 indicating the intensity of the component of the magnetic field in the fourth direction at the second position P2, are both equivalent to an integer multiple of ⅙ the signal period T, i.e., an integer multiple of ½ the third error component period (60° in electrical angle) (other than an integer multiple of ½ the signal period T).

Instead of the first direction D1 and the third direction D3, the second direction and the fourth direction may be set to radial directions of the magnet 6.

In the present embodiment, as in the first embodiment, the output signals S11 and S21 differ in phase by an integer multiple of ½ the third error component period. Therefore, the third error component included in the output signal S11 and that included in the output signal S21 cancel each other out when the first signal S1 is generated. In the present embodiment, as in the first embodiment, the output signals S12 and S22 differ in phase by an integer multiple of ½ the third error component period. Therefore, the third error component included in the output signal S12 and that included in the output signal S22 cancel each other out when the second signal S2 is generated. Consequently, according to the present embodiment, it is possible to reduce the error in the detected angle value θs.

MODIFICATION EXAMPLE

Figure 28:
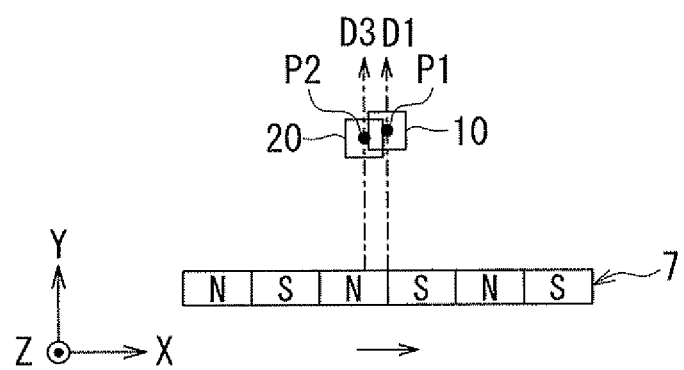
FIG. 28 is an explanatory diagram showing the configuration of a rotating field sensor of a modification example of the third embodiment of the invention.

Reference is now made to FIG. 28 to describe a rotating field sensor of a modification example of the present embodiment. FIG. 28 is an explanatory diagram showing the configuration of the rotating field sensor of the modification example. The rotating field sensor 1 of the modification example detects the direction of the rotating magnetic field generated from the outer periphery of the magnet 7, as in the examples of the second embodiment shown in FIG. 25 and FIG. 26. In the example shown in FIG. 28, while the magnet 7 moves by one pitch, i.e., as much as a pair of N and S poles, the rotating magnetic field makes one rotation. In this case, one period of the output signals of the difference circuits 111, 112, 121, and 122, i.e., an electrical angle of 360°, is equivalent to one pitch of the magnet 7. The third error components included in the output signals have a period (a third error component period) of ⅓ the signal period T. The third error component period is equivalent to a one-third pitch. In the present embodiment, the difference between the first position P1 and the second position P2 is equivalent to an integer multiple of ⅙ the signal period T, i.e., an integer multiple of ½ the third error component period (60° in electrical angle) (other than an integer multiple of ½ the signal period T). FIG. 28 shows an example where the difference between the first position P1 and the second position P2 is equivalent to an integer multiple of a one-sixth pitch of the magnet 7 (other than an integer multiple of a one-half pitch of the magnet 7). In the particular example shown in FIG. 28, the first position P1 and the second position P2 differ from each other by a one-sixth pitch.

In the example shown in FIG. 28, both the first direction D1 and the third direction D3 are set to a direction orthogonal to the direction of movement of the magnet 7 in the XY plane. Consequently, both the phase difference between the output signals S11 and S21 and the phase difference between the output signals S12 and S22 are equivalent to an integer multiple of ⅙ the signal period T, i.e., an integer multiple of ½ the third error component period (60° in electrical angle) (other than an integer multiple of ½ the signal period T).

The other configuration, operation, and effects of the present embodiment are the same as those of the second embodiment.

[Fourth Embodiment]

Figure 29:
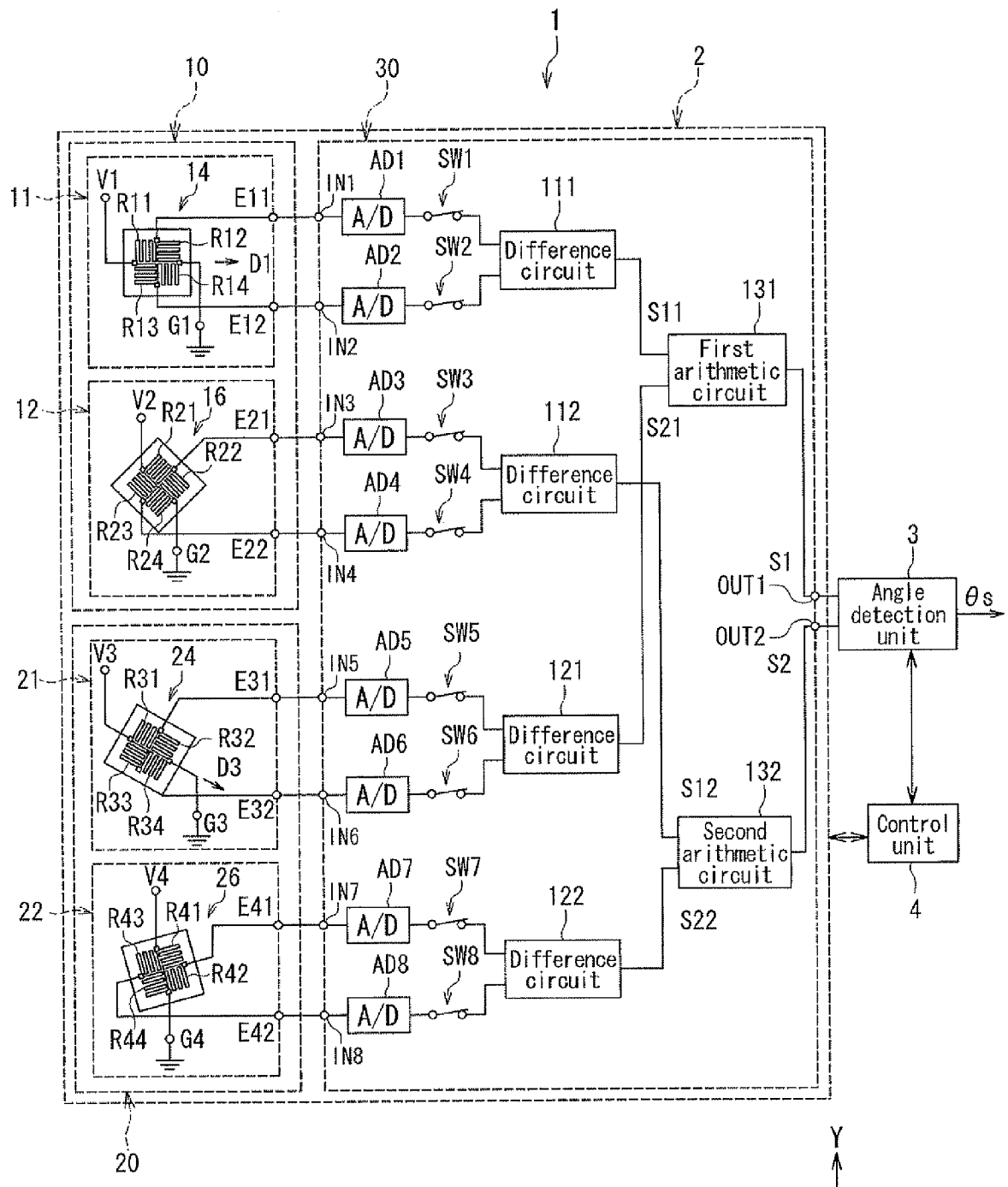
FIG. 29 is a circuit diagram showing the configuration of a rotating field sensor according to a fourth embodiment of the invention.

A rotating field sensor according to a fourth embodiment of the invention will now be described with reference to FIG. 29. FIG. 29 is a circuit diagram showing the configuration of the rotating field sensor according to the present embodiment. The rotating field sensor 1 according to the present embodiment uses anisotropic magnetoresistive (AMR) elements for all the magnetic detection elements in the bridge circuits 14, 16, 24, and 26. In this case, one rotation of the rotating magnetic field produces two periods of variation of the output signals of the difference circuits 111, 112, 121, and 122 corresponding to the output signals of the detection circuits 11, 12, 21, and 22. Consequently, the output signals of the difference circuits 111, 112, 121, and 122 of the present embodiment have a period equivalent to a one-half rotation of the rotating magnetic field, which is ½ the period of the output signals of the difference circuits 111, 112, 121, and 122 of the first embodiment. In the present embodiment, the third error components included in the output signals also have a period (a third error component period) of ½ that in the first embodiment.

FIG. 29 also shows the first direction D1 which serves as the reference direction when the first detection circuit 11 detects the rotating magnetic field, and the third direction D3 which serves as the reference direction when the third detection circuit 21 detects the rotating magnetic field. In the example shown in FIG. 29, the third direction D3 is the direction rotated from the first direction D1 by 30° in the direction of rotation of the rotating magnetic field in the XY plane. The first direction D1 and the third direction D3 therefore differ from each other by 30° in the direction of rotation of the rotating magnetic field. In the present embodiment, the third direction D3 may be the direction rotated from the first direction D1 by −30° in the direction of rotation of the rotating magnetic field in the XY plane. The second direction (not shown), which serves as the reference direction when the second detection circuit 12 detects the rotating magnetic field, is the direction rotated from the first direction D1 by −45° in the direction of rotation of the rotating magnetic field. The fourth direction (not shown), which serves as the reference direction when the fourth detection circuit 22 detects the rotating magnetic field, is the direction rotated from the third direction D3 by −45° in the direction of rotation of the rotating magnetic field.

In the present embodiment, as in the first embodiment, the output signals S11 and S21 differ in phase by an integer multiple of ½ the third error component period. Therefore, the third error component included in the output signal S11 and that included in the output signal S21 cancel each other out when the first signal S1 is generated. In the present embodiment, the output signals S12 and S22 also differ in phase by an integer multiple of ½ the third error component period, as in the first embodiment. Therefore, the third error component included in the output signal S12 and that included in the output signal S22 cancel each other out when the second signal S2 is generated. Consequently, according to the present embodiment, it is possible to reduce the error in the detected angle value θs.

In the present embodiment, the magnet 6 of the second embodiment shown in FIG. 23 and FIG. 24 or the magnet 7 of the second embodiment shown in FIG. 25 and FIG. 26 may be used as the means for generating the rotating magnetic field whose direction rotates. In such a case, the first direction D1 and the third direction D3 are made to differ by 30° in the direction of rotation of the rotating magnetic field. In the case of tilting the first direction D1 and the third direction D3 as in the example shown in FIG. 24, the angles that the first direction D1 and the third direction D3 form with respect to the radial direction of the magnet 6 are preferably equal in absolute value, and more specifically, −15° and 15° (the direction in which the rotating magnetic field rotates shall be positive). Likewise, in the case of tilting the first direction D1 and the third direction D3 as in the example shown in FIG. 26, the angles that the first direction D1 and the third direction D3 form with respect to the direction orthogonal to the direction of movement of the magnet 7 are preferably equal in absolute value, and more specifically, −15° and 15° (the direction in which the rotating magnetic field rotates shall be positive).

In the present embodiment, as in the third embodiment, the first detection unit 10 and the second detection unit 20 may be located in different positions so that the first position P1 and the second position P2 are different from each other. In this case, the difference between the first position P1 and the second position P2 shall be equivalent to an integer multiple of ⅙ the signal period T, i.e., an integer multiple of ½ the third error component period (other than an integer multiple of ½ the signal period T). More specifically, if the rotating field sensor 1 is to detect the direction of the rotating magnetic field generated from the outer periphery of the magnet 6 shown in FIG. 27, the difference between the first position P1 and the second position P2 shall be an integer multiple of 15° in the angle of rotation of the magnet 6 (other than an integer multiple of 45° in the angle of rotation of the magnet 6). If the rotating field sensor 1 is to detect the direction of the rotating magnetic field generated from the outer periphery of the magnet 7 shown in FIG. 28, the difference between the first position P1 and the second position P2 shall be an integer multiple of a 1/12 pitch of the magnet 7 (other than an integer multiple of a ¼ pitch of the magnet 7).

The other configuration, operation, and effects of the present embodiment are the same as those of the first, second, or third embodiment. In the present embodiment, Hall elements may be used instead of the AMR elements.

[Fifth Embodiment]

Figure 30:
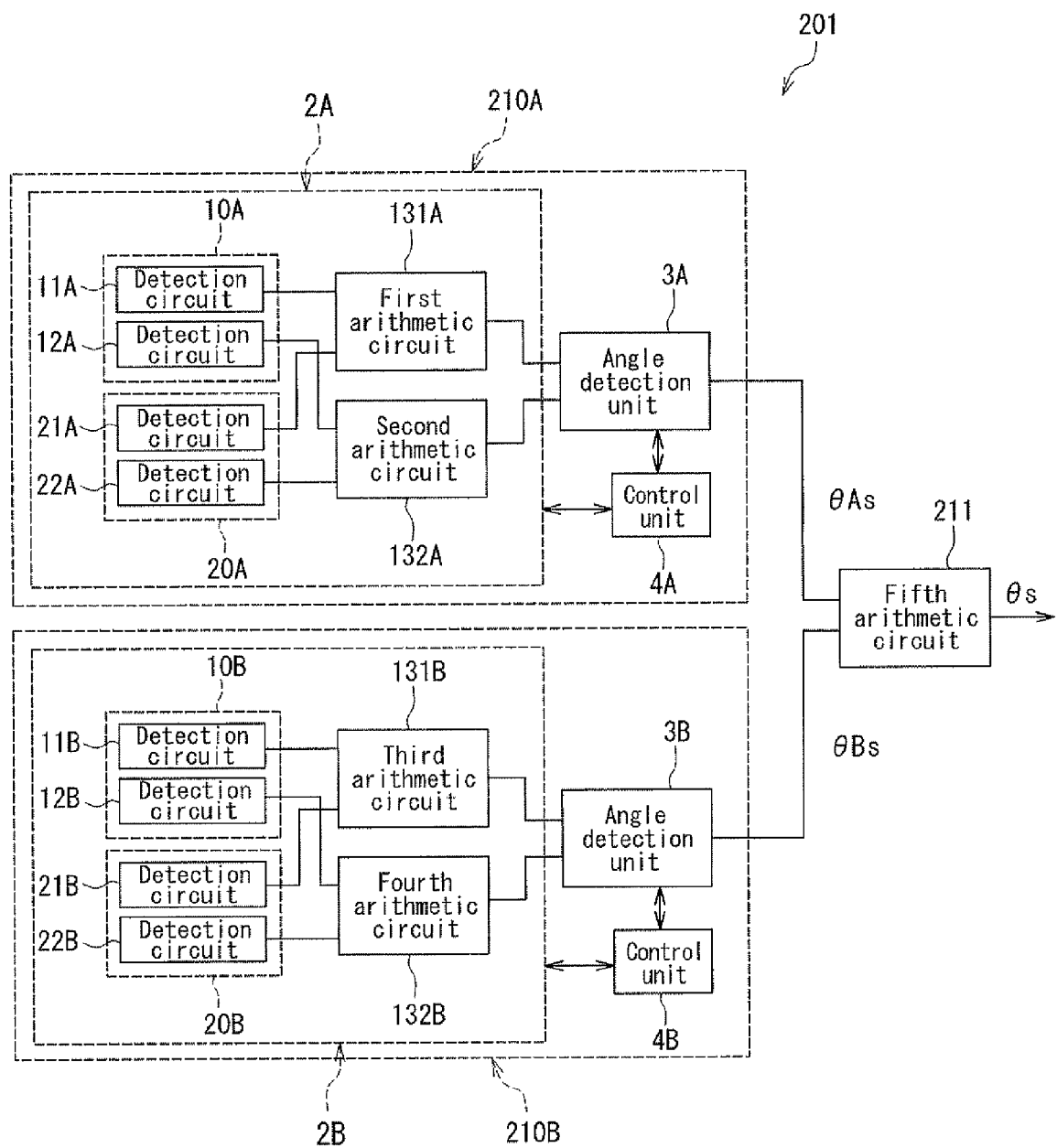
FIG. 30 is a block diagram showing the configuration of a rotating field sensor according to a fifth embodiment of the invention.
Figure 31:
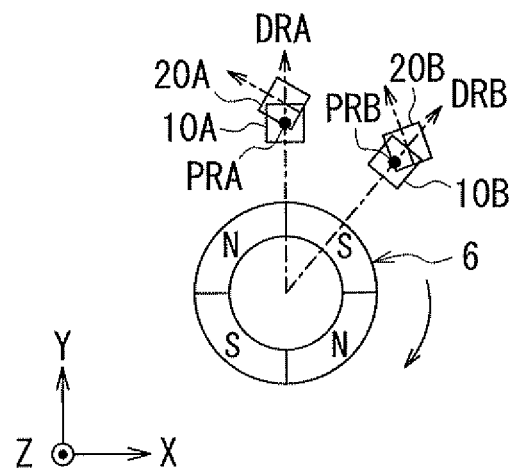
FIG. 31 is an explanatory diagram showing the configuration of the rotating field sensor according to the fifth embodiment of the invention.
Figure 32:
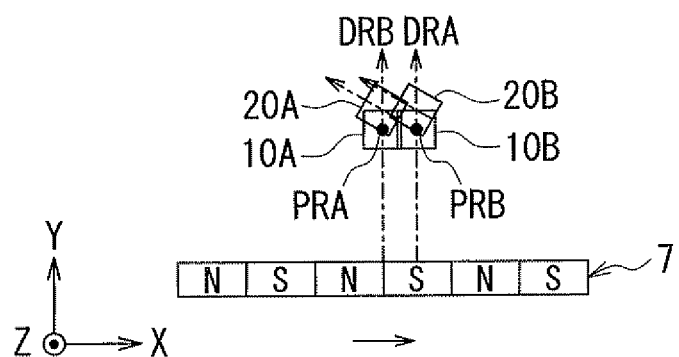
FIG. 32 is an explanatory diagram showing the configuration of a rotating field sensor of a modification example of the fifth embodiment of the invention.

A rotating field sensor according to a fifth embodiment of the invention will now be described with reference to FIG. 30 to FIG. 32. FIG. 30 is a block diagram showing the configuration of the rotating field sensor according to the present embodiment. FIG. 31 is an explanatory diagram showing the configuration of the rotating field sensor according to the present embodiment. FIG. 32 is a perspective view showing the general configuration of a rotating field sensor of a modification example of the present embodiment. First, a description will be given of the configuration of the rotating field sensor 201 according to the present embodiment. In FIG. 31, the magnet 6 of the second embodiment shown in FIG. 23 and FIG. 24 is shown as an example of the means for generating a rotating magnetic field whose direction rotates. The rotating field sensor 201 detects the direction of the rotating magnetic field generated from the outer periphery of the magnet 6, as in the examples of the second embodiment shown in FIG. 23 and FIG. 24.

As shown in FIG. 30, the rotating field sensor 201 has first and second composite detection units 210A and 210B. The first composite detection unit 210A detects an angle θA that the direction of the rotating magnetic field in a first reference position PRA forms with respect to a first reference direction DRA. The second composite detection unit 210B detects an angle θB that the direction of the rotating magnetic field in a second reference position PRB forms with respect to a second reference direction DRB. FIG. 31 shows the first and second reference positions PRA and PRB and also the first and second reference directions DRA and DRB. As shown in FIG. 31, the second reference position PRB is offset from the first reference position PRA by an amount equivalent to ¼ the period of the rotation of the rotating magnetic field, i.e., 90° in electrical angle. The first and second reference directions DRA and DRB are set to radial directions of the magnet 6. The angle θB that the direction of the rotating magnetic field in the second reference position PRB forms with respect to the second reference direction DRB differs from the angle θA that the direction of the rotating magnetic field in the first reference position PRA forms with respect to the first reference direction DRA by an angle equivalent to 90° in electrical angle.

Each of the composite detection units 210A and 210B has the same configuration as that of the rotating field sensor 1 of the first embodiment. Specifically, the first composite detection unit 210A includes a signal generation unit 2A, an angle detection unit 3A, and a control unit 4A that are the same in configuration as the signal generation unit 2, the angle detection unit 3, and the control unit 4, respectively. The signal generation unit 2A includes a first detection unit 10A, a second detection unit 20A, a first arithmetic circuit 131A, and a second arithmetic circuit 132A that are the same in configuration as the first detection unit 10, the second detection unit 20, the first arithmetic circuit 131, and the second arithmetic circuit 132, respectively. Likewise, the second composite detection unit 210B includes a signal generation unit 2B, an angle detection unit 3B, and a control unit 4B that are the same in configuration as the signal generation unit 2, the angle detection unit 3, and the control unit 4, respectively. The signal generation unit 2B includes a third detection unit 10B, a fourth detection unit 20B, a third arithmetic circuit 131B, and a fourth arithmetic circuit 132B that are the same in configuration as the first detection unit 10, the second detection unit 20, the first arithmetic circuit 131, and the second arithmetic circuit 132, respectively. In addition to the aforementioned components, although not shown in FIG. 30, each of the first and second composite detection units 210A and 210B includes the A/D converters AD1 to AD8, the switches SW1 to SW8, and the difference circuits 111, 112, 121, and 122, all of which are shown in FIG. 3. The first detection unit 10A is located in a first position. The second detection unit 20A is located in a second position. The third detection unit 10B is located in a third position. The fourth detection unit 20B is located in a fourth position.

The relative positional relationship of the first and second detection units 10A and 20A with respect to the magnet 6 is the same as that of the first and second detection units 10 and 20 with respect to the magnet 6 in the second embodiment. The relative positional relationship of the third and fourth detection units 10B and 20B with respect to the magnet 6 is also the same as that of the first and second detection units 10 and 20 with respect to the magnet 6 in the second embodiment. The third and fourth detection units 10B and 20B are located in positions offset from the positions of the first and second detection units 10A and 20A, respectively, by an amount equivalent to ¼ the period of the rotation of the rotating magnetic field, i.e., as much as an electrical angle of 90°.

The position where the first detection unit 10A is located is the first position. The position where the second detection unit 20A is located is the second position. The relationships between the first reference position PRA and the first and second positions are the same as the relationships between the reference position PR and the first and second positions P1 and P2 in the first embodiment shown in FIG. 2. The first reference position PRA, the first position, and the second position respectively correspond to the reference position PR, the first position P1, and the second position P2 shown in FIG. 2. The first position and the second position are identical with each other in the direction of rotation of the rotating magnetic field and coincide with the first reference position PRA.

The first detection unit 10A detects, in the first position, a component of the rotating magnetic field in a first direction and a component of the rotating magnetic field in a second direction. The second detection unit 20A detects, in the second position, a component of the rotating magnetic field in a third direction and a component of the rotating magnetic field in a fourth direction. The relationships between the first reference direction DRA and the first to fourth directions are the same as the relationships between the reference direction DR and the first to fourth directions D1 to D4 in the first embodiment shown in FIG. 2. The first reference direction DRA, the first direction, the second direction, the third direction, and the fourth direction respectively correspond to the reference direction DR, the first direction D1, the second direction D2, the third direction D3, and the fourth direction D4 shown in FIG. 2. The first direction and the second direction are orthogonal to each other, and the third direction and the fourth direction are orthogonal to each other. The first direction and the third direction differ from each other by 60° in the direction of rotation of the rotating magnetic field. The second direction is the direction rotated from the first reference direction DRA by −30°. The fourth direction is the direction rotated from the first reference direction DRA by 30°.

The position where the third detection unit 10B is located is the third position. The position where the fourth detection unit 20B is located is the fourth position. The relationships between the second reference position PRB and the third and fourth positions are the same as the relationships between the reference position PR and the first and second positions P1 and P2 in the first embodiment shown in FIG. 2. The second reference position PRB, the third position, and the fourth position respectively correspond to the reference position PR, the first position P1, and the second position P2 shown in FIG. 2. The third position and the fourth position are identical with each other in the direction of rotation of the rotating magnetic field and coincide with the second reference position PRB.

The third detection unit 10B detects, in the third position, a component of the rotating magnetic field in a fifth direction and a component of the rotating magnetic field in a sixth direction. The fourth detection unit 20B detects, in the fourth position, a component of the rotating magnetic field in a seventh direction and a component of the rotating magnetic field in an eighth direction. The relationships between the second reference direction DRB and the fifth to eighth directions are the same as the relationships between the reference direction DR and the first to fourth directions D1 to D4 in the first embodiment shown in FIG. 2. The second reference direction DRB, the fifth direction, the sixth direction, the seventh direction, and the eighth direction respectively correspond to the reference direction DR, the first direction D1, the second direction D2, the third direction D3, and the fourth direction D4 shown in FIG. 2. The fifth direction and the sixth direction are orthogonal to each other, and the seventh direction and the eighth direction are orthogonal to each other. The fifth direction and the seventh direction differ from each other by 60° in the direction of rotation of the rotating magnetic field. The sixth direction is the direction rotated from the second reference direction DRB by −30°. The eighth direction is the direction rotated from the second reference direction DRB by 30°.

The first detection unit 10A includes a first detection circuit 11A and a second detection circuit 12A. The first detection circuit 11A and the second detection circuit 12A are the same in configuration as the first detection circuit 11 and the second detection circuit 12 of the first embodiment, respectively. The first detection circuit 11A detects the intensity of the component of the rotating magnetic field in the first direction and outputs a signal indicating the intensity. The second detection circuit 12A detects the intensity of the component of the rotating magnetic field in the second direction and outputs a signal indicating the intensity. The first direction serves as a reference direction when the first detection circuit 11A detects the rotating magnetic field. The second direction serves as a reference direction when the second detection circuit 12A detects the rotating magnetic field.

The second detection unit 20A includes a third detection circuit 21A and a fourth detection circuit 22A. The third detection circuit 21A and the fourth detection circuit 22A are the same in configuration as the third detection circuit 21 and the fourth detection circuit 22 of the first embodiment, respectively. The third detection circuit 21A detects the intensity of the component of the rotating magnetic field in the third direction and outputs a signal indicating the intensity. The fourth detection circuit 22A detects the intensity of the component of the rotating magnetic field in the fourth direction and outputs a signal indicating the intensity. The third direction serves as a reference direction when the third detection circuit 21A detects the rotating magnetic field. The fourth direction serves as a reference direction when the fourth detection circuit 22A detects the rotating magnetic field.

The third detection unit 10B includes a fifth detection circuit 11B and a sixth detection circuit 12B. The fifth detection circuit 11B and the sixth detection circuit 12B are the same in configuration as the first detection circuit 11 and the second detection circuit 12 of the first embodiment, respectively. The fifth detection circuit 11B detects the intensity of the component of the rotating magnetic field in the fifth direction and outputs a signal indicating the intensity. The sixth detection circuit 12B detects the intensity of the component of the rotating magnetic field in the sixth direction and outputs a signal indicating the intensity. The fifth direction serves as a reference direction when the fifth detection circuit 11B detects the rotating magnetic field. The sixth direction serves as a reference direction when the sixth detection circuit 12B detects the rotating magnetic field.

The fourth detection unit 20B includes a seventh detection circuit 21B and an eighth detection circuit 22B. The seventh detection circuit 21B and the eighth detection circuit 22B are the same in configuration as the third detection circuit 21 and the fourth detection circuit 22 of the first embodiment, respectively. The seventh detection circuit 21B detects the intensity of the component of the rotating magnetic field in the seventh direction and outputs a signal indicating the intensity. The eighth detection circuit 22B detects the intensity of the component of the rotating magnetic field in the eighth direction and outputs a signal indicating the intensity. The seventh direction serves as a reference direction when the seventh detection circuit 21B detects the rotating magnetic field. The eighth direction serves as a reference direction when the eighth detection circuit 22B detects the rotating magnetic field.

In the example shown in FIG. 31, the magnet 6 includes two pairs of N and S poles, and one rotation of the magnet 6 produces two rotations of the rotating magnetic field. In this case, one period of the output signals of the detection circuits 11A, 12A, 21A, 22A, 11B, 12B, 21B, and 22B, i.e., an electrical angle of 360°, is equivalent to a one-half rotation of the magnet 6, i.e., an angle of rotation of 180° of the magnet 6. The output signals of the first to eighth detection circuits 11A, 12A, 21A, 22A, 11B, 12B, 21B, and 22B vary periodically with the same signal period T. The output signal of the third detection circuit 21A differs from the output signal of the first detection circuit 11A in phase. The output signal of the fourth detection circuit 22A differs from the output signal of the second detection circuit 12A in phase. The output signal of the seventh detection circuit 21B differs from the output signal of the fifth detection circuit 11B in phase. The output signal of the eighth detection circuit 22B differs from the output signal of the sixth detection circuit 12B in phase. In the present embodiment, the phases of the output signals of the first to eighth detection circuits 11A, 12A, 21A, 22A, 11B, 12B, 21B, and 22B preferably satisfy the following particular relationships.

Preferably, the output signal of the second detection circuit 12A differs from the output signal of the first detection circuit 11A in phase by an odd number of times ¼ the signal period T. Also preferably, the output signal of the fourth detection circuit 22A differs from the output signal of the third detection circuit 21A in phase by an odd number of times ¼ the signal period T. However, in consideration of the production accuracy of the magnetic detection elements and other factors, the difference in phase between the output signal of the first detection circuit 11A and the output signal of the second detection circuit 12A and the difference in phase between the output signal of the third detection circuit 21A and the output signal of the fourth detection circuit 22A can each be slightly different from an odd number of times ¼ the signal period T. Preferably, the output signal of the third detection circuit 21A differs from the output signal of the first detection circuit 11A in phase by an integer multiple of ⅙ the signal period T other than an integer multiple of ½ the signal period T. Preferably, the output signal of the sixth detection circuit 12B differs from the output signal of the fifth detection circuit 11B in phase by an odd number of times ¼ the signal period T. Also preferably, the output signal of the eighth detection circuit 22B differs from the output signal of the seventh detection circuit 21B in phase by an odd number of times ¼ the signal period T. However, in consideration of the production accuracy of the magnetic detection elements and other factors, the difference in phase between the output signal of the fifth detection circuit 11B and the output signal of the sixth detection circuit 12B and the difference in phase between the output signal of the seventh detection circuit 21B and the output signal of the eighth detection circuit 22B can each be slightly different from an odd number of times ¼ the signal period T. Preferably, the output signal of the seventh detection circuit 21B differs from the output signal of the fifth detection circuit 11B in phase by an integer multiple of ⅙ the signal period T other than an integer multiple of ½ the signal period T. The following description assumes that the phases of the output signals of the first to eighth detection circuits 11A, 12A, 21A, 22A, 11B, 12B, 21B, and 22B satisfy the preferred relationships described above.

The first arithmetic circuit 131A generates, based on the output signals of the first and third detection circuits 11A and 21A, a first signal that has a correspondence relationship with both the intensity of the component of the rotating magnetic field in the first direction and the intensity of the component of the rotating magnetic field in the third direction. As compared with the output signals of the first and third detection circuits 11A and 21A, the first signal achieves a reduction in the third error component with a period of ⅓ the signal period T. The second arithmetic circuit 132A generates, based on the output signals of the second and fourth detection circuits 12A and 22A, a second signal that has a correspondence relationship with both the intensity of the component of the rotating magnetic field in the second direction and the intensity of the component of the rotating magnetic field in the fourth direction. As compared with the output signals of the second and fourth detection circuits 12A and 22A, the second signal achieves a reduction in the third error component with a period of ⅓ the signal period T. The methods by which the first and second signals are generated are the same as those in the first embodiment.

Based on the first signal and the second signal, the angle detection unit 3A calculates a detected value of the angle θA that the direction of the rotating magnetic field in the first reference position PRA forms with respect to the first reference direction DRA. Hereinafter, the detected value calculated by the angle detection unit 3A will be referred to as a first detected angle value and denoted by symbol θAs. Leaving errors aside, the first detected angle value θAs has a difference of constant value (including 0) from the angle that the direction of the rotating magnetic field in a reference position forms with respect to a reference direction. The first detected angle value θAs thus has a correspondence relationship with the angle that the direction of the rotating magnetic field in the reference position forms with the respect to the reference direction. The first detected angle value θAs is calculated by the same method as with the detected angle value θs in the first embodiment.

The third arithmetic circuit 131B generates, based on the output signals of the fifth and seventh detection circuits 11B and 21B, a third signal that has a correspondence relationship with both the intensity of the component of the rotating magnetic field in the fifth direction and the intensity of the component of the rotating magnetic field in the seventh direction. As compared with the output signals of the fifth and seventh detection circuits 11B and 21B, the third signal achieves a reduction in the third error component with a period of ⅓ the signal period T. The fourth arithmetic circuit 132B generates, based on the output signals of the sixth and eighth detection circuits 12B and 22B, a fourth signal that has a correspondence relationship with both the intensity of the component of the rotating magnetic field in the sixth direction and the intensity of the component of the rotating magnetic field in the eighth direction. As compared with the output signals of the sixth and eighth detection circuits 12B and 22B, the fourth signal achieves a reduction in the third error component with a period of ⅓ the signal period T. The methods of generating the third and fourth signals are the same as the methods of generating the first and second signals of the first embodiment.

Based on the third signal and the fourth signal, the angle detection unit 3B calculates a detected value of the angle θB that the direction of the rotating magnetic field in the second reference position PRB forms with respect to the second reference direction DRB. Hereinafter, the detected value calculated by the angle detection unit 3B will be referred to as a second detected angle value and denoted by symbol θBs. Leaving errors aside, the second detected angle value θBs has a difference of constant value (including 0) from the angle that the direction of the rotating magnetic field in a reference position forms with respect to a reference direction. The second detected angle value θBs thus has a correspondence relationship with the angle that the direction of the rotating magnetic field in the reference position forms with the respect to the reference direction. The second detected angle value θs is calculated by the same method as with the detected angle value θs in the first embodiment.

As shown in FIG. 30, the rotating field sensor 201 further includes a fifth arithmetic circuit 211 that calculates a detected angle value θs that has a correspondence relationship with the angle that the direction of the rotating magnetic field in a reference position of the rotating field sensor 201 forms with respect to a reference direction of the rotating field sensor 201. The fifth arithmetic circuit 211 calculates the detected angle value θs based on the first detected angle value θAs calculated by the angle detection unit 3A and the second detected angle value θBs calculated by the angle detection unit 3B. The fifth arithmetic circuit 211 can be implemented by a microcomputer, for example. The reference position and the reference direction of the rotating field sensor 201 may coincide with the first reference position PRA and the first reference direction DRA, respectively, or with the second reference position PRB and the second reference direction DRB, respectively, or may be any position and direction different from those positions and directions.

Reference is now made to FIG. 32 to describe the configuration of a rotating field sensor 201 of a modification example of the present embodiment. In FIG. 32, the magnet 7 of the second embodiment shown in FIG. 25 and FIG. 26 is shown as an example of the means for generating the rotating magnetic field whose direction rotates. The rotating field sensor 201 of the modification example detects the direction of the rotating magnetic field generated from the outer periphery of the magnet 7, as in the examples of the second embodiment shown in FIG. 25 and FIG. 26.

FIG. 32 shows the first and second reference positions PRA and PRB and also the first and second reference directions DRA and DRB. As shown in FIG. 32, the second reference position PRB is offset from the first reference position PRA by an amount equivalent to ¼ the period of the rotation of the rotating magnetic field or 90° in electrical angle, i.e., as much as a one-fourth pitch of the magnet 7. In the example shown in FIG. 32, the first and second reference directions DRA and DRB are both set to a direction orthogonal to the direction of movement of the magnet 7 in the XY plane.

The relative positional relationship of the first and second detection units 10A and 20A with respect to the magnet 7 is the same as that of the first and second detection units 10 and 20 with respect to the magnet 7 in the second embodiment. The relative positional relationship of the third and fourth detection units 10B and 20B with respect to the magnet 7 is also the same as that of the first and second detection units 10 and 20 with respect to the magnet 7 in the second embodiment. In the modification example, the third and fourth detection units 10B and 20B are located in positions offset from the positions of the first and second detection units 10A and 20A, respectively, by an amount equivalent to ¼ the period of the rotation of the rotating magnetic field or 90° in electrical angle, i.e., as much as a one-fourth pitch of the magnet 7.

Next, a description will be given of the method by which the fifth arithmetic circuit 211 calculates the detected angle value θs. In the present embodiment, the fifth arithmetic circuit 211 calculates the detected angle value θs based on the first detected angle value θAs calculated by the angle detection unit 3A of the composite detection unit 210A and the second detected angle value θBs calculated by the angle detection unit 3B of the composite detection unit 210B. In the examples shown in FIG. 31 and FIG. 32, the third and fourth detection units 10B and 20B of the composite detection unit 210B are located in positions offset from the positions of the first and second detection units 10A and 20A of the composite detection unit 210A by an amount equivalent to an electrical angle of 90°. The first detected angle value θAs obtained by the composite detection unit 210A and the second detected angle value θBs obtained by the composite detection unit 210B therefore differ in phase by an electrical angle of 90°. In such examples, the fifth arithmetic circuit 211 calculates θs by the equation (6) below.

$$\theta s = (\theta As + \theta Bs + \pi/2)/2 \qquad (6)$$

The operation and effects of the rotating field sensor 201 will now be described. In the rotating field sensor 201, the angle detection unit 3A calculates the first detected angle value θAs based on the first signal and the second signal. The first signal is generated based on the output signals of the first and third detection circuits 11A and 21A, and the second signal is generated based on the output signals of the second and fourth detection circuits 12A and 22A. In the rotating field sensor 201, the angle detection unit 3B calculates the second detected angle value θBs based on the third signal and the fourth signal. The third signal is generated based on the output signals of the fifth and seventh detection circuits 11B and 21B, and the fourth signal is generated based on the output signals of the sixth and eighth detection circuits 12B and 22B. Based on the first detected angle value θAs and the second detected angle value θBs, the fifth arithmetic circuit 211 calculates, by using the equation (6), the detected angle value θs that has a correspondence relationship with the angle that the direction of the rotating magnetic field in the reference position forms with respect to the reference direction.

Figure 33:
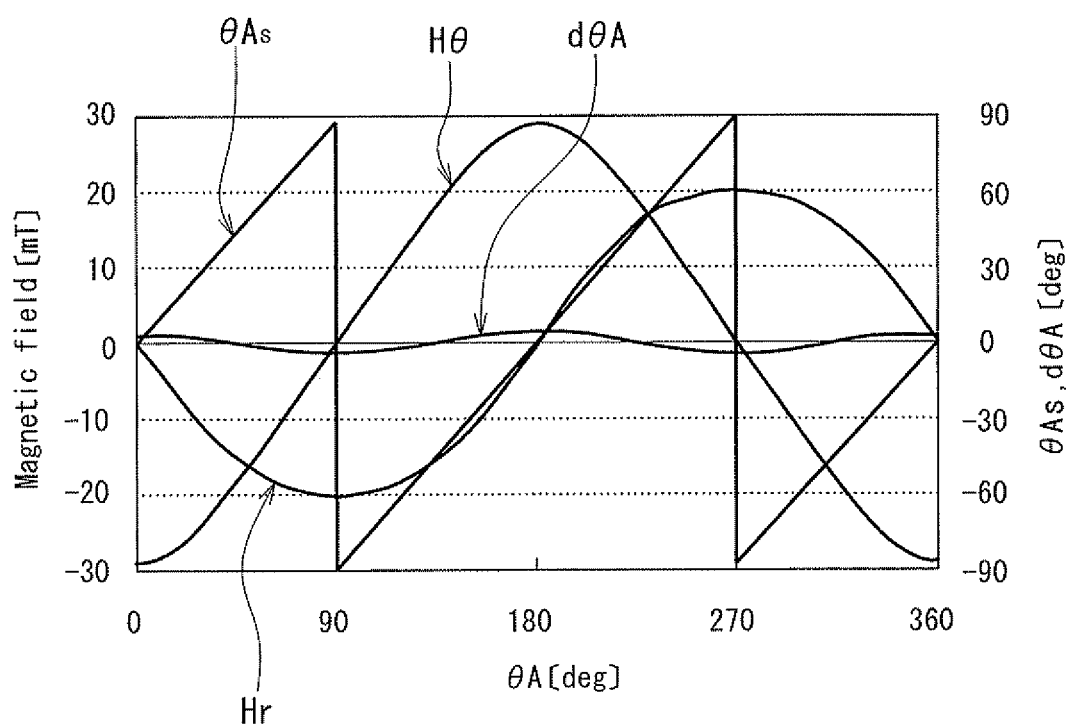
FIG. 33 is a waveform chart showing the relationship between a rotating magnetic field, a first detected angle value, and a first angular error in the fifth embodiment of the invention.

The rotating field sensor 201 according to the present embodiment is suitable for reducing an angular error resulting from the rotating magnetic field. Reference is now made to FIG. 31 to FIG. 33 to describe the reason for the occurrence of the angular error due to the rotating magnetic field. In the example shown in FIG. 31, the rotating magnetic field includes a not-shown component Hr in the radial direction of the magnet 6, and a not-shown component Hθ in the direction orthogonal to Hr in the XY plane. In the example shown in FIG. 32, the rotating magnetic field includes a not-shown component Hr in the direction orthogonal to the direction of movement of the magnet 7 in the XY plane, and a not-shown component Hθ in the direction orthogonal to Hr in the XY plane.

Suppose, in the example shown in FIG. 31 or FIG. 32, that the rotating magnetic field is detected by the first and second detection units 10A and 20A and then the first detected angle value θAs is obtained based on the output signals of the detection units 10A and 20A. FIG. 33 shows an example of the relationship between Hr, Hθ, θAs, and a first angular error dθA in such a case. In FIG. 33, the horizontal axis indicates the angle θA, and the vertical axis indicates Hr, Hθ, θAs, and dθA. For the sake of convenience, FIG. 33 shows θAs on the vertical axis in values after a subtraction of 180° if the actual angle is in the range of 90° to 270°, and in values after a subtraction of 360° if the actual angle is in the range of 270° to 360°. In the following description, charts similar to FIG. 33 will be shown in the same way as with FIG. 33. For ease of understanding, FIG. 33 shows the waveform of the first angular error dθA with exaggerated amplitude. In the example shown in FIG. 31 or FIG. 32, the direction of the rotating magnetic field and the intensity of a component of the rotating magnetic field in one direction sometimes fail to vary sinusoidally. In such a case, the first detected angle value θAs includes the first angular error dθA with respect to a theoretical value of the first detected angle value θAs that is expected when the direction of the rotating magnetic field rotates ideally. Similarly, when the third and fourth detection units 10B and 20B detect the rotating magnetic field and then the second detected angle value θBs is obtained based on the output signals of the detection units 10B and 20B, the second detected angle value θBs includes a second angular error dθB with respect to a theoretical value of the second detected angle value θBs that is expected when the direction of the rotating magnetic field rotates ideally. The first and second angular errors dθA and dθB vary periodically with the same angular error period as the direction of the rotating magnetic field varies. The variations in the first and second angular errors dθA and dθB depend on the variation in the direction of the rotating magnetic field. The angular error period is ½ the period of the rotation of the direction of the rotating magnetic field.

Figure 34:
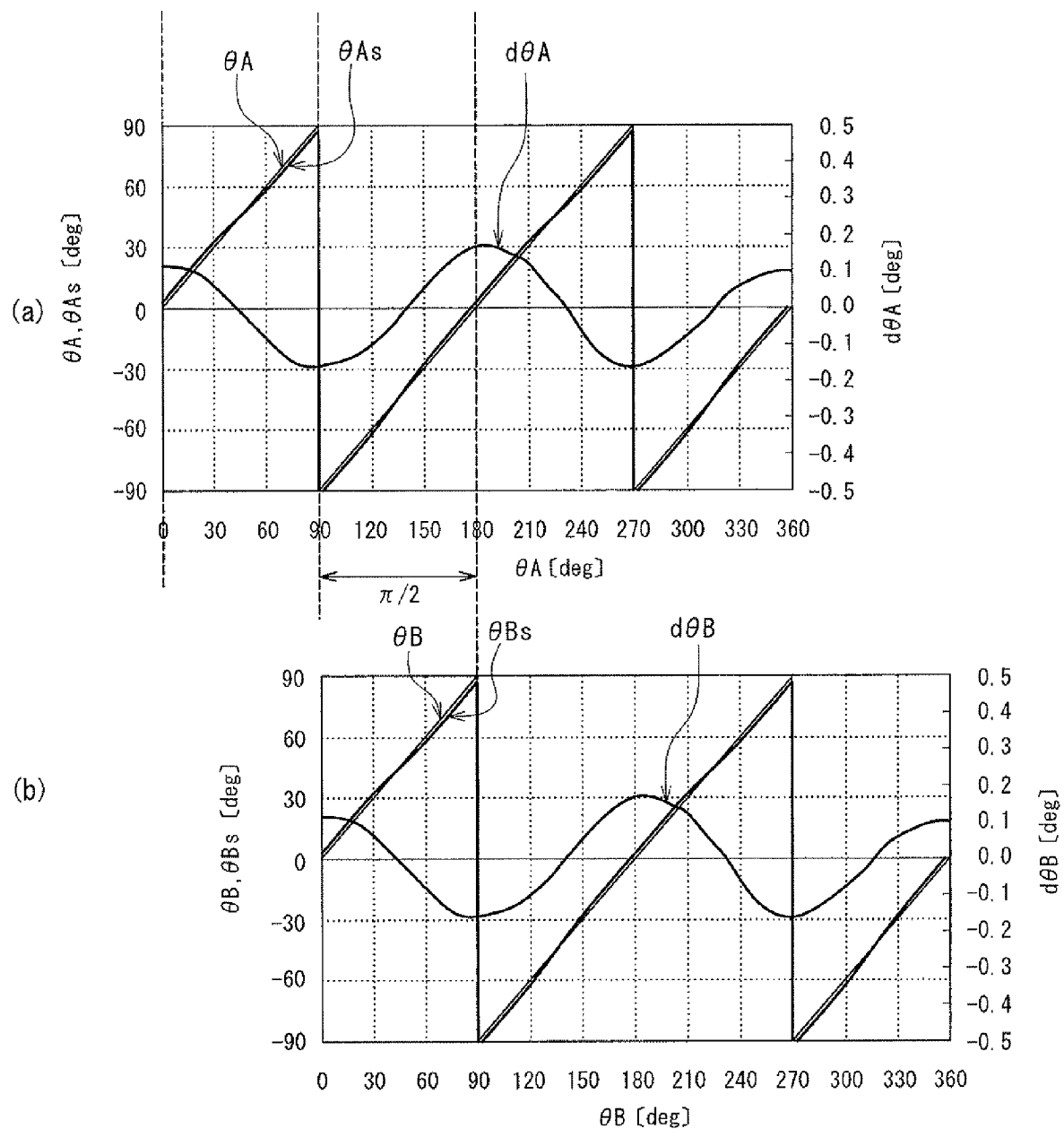
FIG. 34 is an explanatory diagram showing the operation of reducing an angular error in the fifth embodiment of the invention.

Now, with reference to FIG. 34 and FIG. 35, a description will be given of the capability of the rotating field sensor 201 to reduce the angular error resulting from the rotating magnetic field. Portion (a) of FIG. 34 shows the relationship between the first detected angle value θAs and the first angular error dθA included in the first detected angle value θAs. Portion (b) of FIG. 34 shows the relationship between the second detected angle value θBs and the second angular error dθB included in the second detected angle value θBs. In the example shown in FIG. 34, the first angular error dθA and the second angular error dθB have an amplitude of ±0.17°. In the present embodiment, the third position and the fourth position are offset from the first position and the second position, respectively, by an amount equivalent to ½ the angular error period (90° in electrical angle), and the first and second detected angle values θAs and θBs differ in phase by ½ the angular error period (90° in electrical angle). Therefore, when calculating the detected angle value θs, the first angular error dθA and the second angular error dθB are in opposite phases. Consequently, the first angular error dθA and the second angular error dθB cancel each other out.

Figure 35:
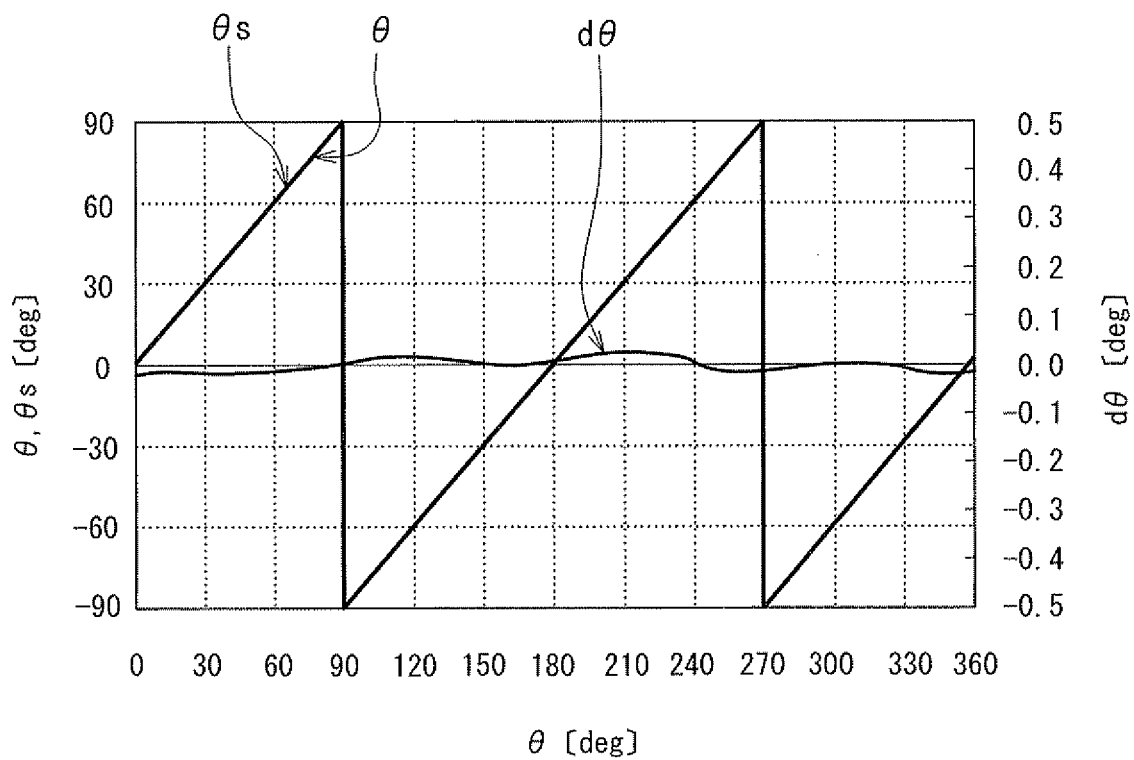
FIG. 35 is a waveform chart showing the relationship between a detected angle value and an angular error in the fifth embodiment of the invention.

FIG. 35 shows the relationship between the detected angle value θs calculated as described above and an angular error dθ included in the detected angle value θs. In FIG. 35, symbol θ represents the angle that the direction of the rotating magnetic field in the reference position forms with respect to the reference direction. As shown in FIG. 35, the angular error dθ is significantly smaller than the first angular error dθA and the second angular error dθB. In the example shown in FIG. 35, the angular error dθ has an amplitude of ±0.03°.

In the present embodiment, the third position and the fourth position are offset from the first position and the second position, respectively, by an amount equivalent to ½ the angular error period. However, the third position and the fourth position may be offset from the first position and the second position by an amount equivalent to an odd number of times ½ the angular error period. In such a case, the angular error dθA and the angular error dθB cancel each other out to significantly reduce the angular error dθ included in the detected angle value θs.

In the present embodiment, the phase difference between the first detected angle value θAs and the second detected angle value θBs is not limited to 90° in electrical angle, and may be of any value. The fifth arithmetic circuit 211 calculates θs by the following equation (7), where β represents the phase difference between the first detected angle value θAs and the second detected angle value θBs.

$$\theta s=(\theta As+\theta Bs+\beta)/2 \tag{7}$$

In the present embodiment, the first detected angle value θAs is calculated by the same method as with the detected angle value θs in the first embodiment. Consequently, as discussed in relation to the first embodiment, if the output signal waveforms of the MR elements are distorted due to the MR elements themselves and the output signals of the detection circuits respectively include the third error components, the third error component included in the output signal of the first detection circuit 11A and that included in the output signal of the third detection circuit 21A are in opposite phases when the first signal is generated, and the third error component included in the output signal of the second detection circuit 12A and that included in the output signal of the fourth detection circuit 22A are in opposite phases when the second signal is generated. For the same reason as in the description of the first embodiment, the present embodiment thus makes it possible to reduce the error in the first detected angle value θAs resulting from the MR elements.

Furthermore, as described in relation to the first embodiment, if the output signals of the detection circuits respectively include the out-of-phase error components, the first signal includes the first error component resulting from the out-of-phase error components and the second signal includes the second error component resulting from the out-of-phase error components. As with the first embodiment, the present embodiment calculates a first error component estimate which is an estimated value of the first error component, and a second error component estimate which is an estimated value of the second error component, by taking advantage of the property of a sum of squares signal that is made up of the sum of the square of the first signal and the square of the second signal and that has a period of ½ the signal period T. According to the present embodiment, the first detected angle value θAs is calculated based on a first corrected signal generated by subtracting the first error component estimate from the first signal, and a second corrected signal generated by subtracting the second error component estimate from the second signal. This makes it possible to reduce the error in the first detected angle value θAs.

In the present embodiment, the second detected angle value θBs is calculated by the same method as with the detected angle value θs in the first embodiment. Consequently, as discussed in relation to the first embodiment, if the output signal waveforms of the MR elements are distorted due to the MR elements themselves and the output signals of the detection circuits respectively include the third error components, the third error component included in the output signal of the fifth detection circuit 11B and that included in the output signal of the seventh detection circuit 21B are in opposite phases when the third signal is generated, and the third error component included in the output signal of the sixth detection circuit 12B and that included in the output signal of the eighth detection circuit 22B are in opposite phases when the fourth signal is generated. For the same reason as in the description of the first embodiment, the present embodiment thus makes it possible to reduce the error in the second detected angle value θBs resulting from the MR elements.

If the output signals of the detection circuits respectively include the out-of-phase error components, the third signal includes the first error component resulting from the out-of-phase error components and the fourth signal includes the second error component resulting from the out-of-phase error components, as with the first and second signals. The present embodiment calculates a first error component estimate which is an estimated value of the first error component, and a second error component estimate which is an estimated value of the second error component, by taking advantage of the property of a sum of squares signal that is made up of the sum of the square of the third signal and the square of the fourth signal and that has a period of ½ the signal period T, as with the first and second signals. According to the present embodiment, the second detected angle value θBs is calculated based on a third corrected signal generated by subtracting the first error component estimate from the third signal, and a fourth corrected signal generated by subtracting the second error component estimate from the fourth signal. This makes it possible to reduce the error in the second detected angle value θBs.

As described above, according to the present embodiment, it is possible to reduce the error resulting from the MR elements in each of the first and second detected angle values θAs and θBs. This makes it possible to reduce the error resulting from the MR elements even in the detected angle value θs, the final result.

The other configuration, operation, and effects of the present embodiment are the same as those of the second embodiment.

The present invention is not limited to the foregoing embodiments, and various modifications may be made thereto. For example, the arrangement of the plurality of detection units in the foregoing embodiments are illustrative only. Various modifications may be made to the arrangement of the plurality of detection units within the scope of the requirements set forth in the claims.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A rotating field sensor for detecting an angle that a direction of a rotating magnetic field in a reference position forms with respect to a reference direction, the rotating field sensor comprising:

a signal generation unit that includes a plurality of magnetic detection elements for detecting the rotating magnetic field, and generates a first signal and a second signal based on output signals of the plurality of magnetic detection elements, the first and second signals being associated with intensities of components of the rotating magnetic field in mutually different directions; and an angle detection unit that calculates, based on the first and second signals generated by the signal generation unit, a detected angle value that has a correspondence relationship with the angle that the direction of the rotating magnetic field in the reference position forms with respect to the reference direction, wherein:

the first signal includes a first ideal component and a first error component;

the second signal includes a second ideal component and a second error component;

the first ideal component and the second ideal component vary periodically with the same signal period in an ideal sinusoidal manner;

the second ideal component differs from the first ideal component in phase;

the sum of the square of the first ideal component and the square of the second ideal component takes on a constant value;

the first error component and the second error component vary in synchronization with each other, each with a period of ⅓ the signal period; and the angle detection unit includes:
  a first arithmetic unit that generates a sum of squares signal, the sum of squares signal being made up of the sum of the square of the first signal and the square of the second signal, and having a period of ½ the signal period;
  a second arithmetic unit that calculates a first error component estimate and a second error component estimate based on the sum of squares signal, the first error component estimate being an estimated value of the first error component, the second error component estimate being an estimated value of the second error component; and
  a third arithmetic unit that generates a first corrected signal by subtracting the first error component estimate from the first signal, generates a second corrected signal by subtracting the second error component estimate from the second signal, and calculates the detected angle value based on the first and second corrected signals.

2. The rotating field sensor according to claim 1, wherein:
the first arithmetic unit calculates a temporary detected angle value based on the first and second signals, and expresses the sum of squares signal as a function of the temporary detected angle value; and
the second arithmetic unit detects an amplitude of the sum of squares signal and an initial phase of the sum of squares signal expressed as the function of the temporary detected angle value, and calculates the first and second error component estimates using the amplitude and the initial phase of the sum of squares signal and the temporary detected angle value.

3. The rotating field sensor according to claim 2, wherein the temporary detected angle value is calculated as $\operatorname{atan}(S1/S2)$, the sum of squares signal is expressed as $1+Ft^2+2Ft\cdot\cos(2\theta t+\phi t)$, the first error component estimate is calculated as $Ft\cdot\sin(3\theta t+\phi t)$, and the second error component estimate is calculated as $Ft\cdot\cos(3\theta t+\phi t)$, where S1 and S2 represent the first and second signals, respectively, $\theta t$ represents the temporary detected angle value, $2Ft$ represents the amplitude of the sum of squares signal, and $\phi t$ represents the initial phase of the sum of squares signal.

4. The rotating field sensor according to claim 1, wherein:
the signal generation unit includes a first detection circuit and a second detection circuit that detect the intensities of the components of the rotating magnetic field in mutually different directions and output respective signals indicating the intensities;
each of the first and second detection circuits includes at least one magnetic detection element;
the output signals of the first and second detection circuits vary periodically with the signal period;
the output signal of the second detection circuit differs from the output signal of the first detection circuit in phase by an odd number of times ¼ the signal period; and
the first signal is generated based on the output signal of the first detection circuit, and the second signal is generated based on the output signal of the second detection circuit.

5. The rotating field sensor according to claim 4, wherein each of the first and second detection circuits includes, as the at least one magnetic detection element, a pair of magnetic detection elements connected in series.

6. The rotating field sensor according to claim 5, wherein each of the first and second detection circuits has a Wheatstone bridge circuit that includes a first pair of magnetic detection elements connected in series and a second pair of magnetic detection elements connected in series.

7. The rotating field sensor according to claim 5, wherein the magnetic detection elements are magnetoresistive elements.

8. The rotating field sensor according to claim 7, wherein each of the magnetoresistive elements has a magnetization pinned layer whose direction of magnetization is pinned, a free layer whose direction of magnetization varies according to the direction of the rotating magnetic field, and a nonmagnetic layer disposed between the magnetization pinned layer and the free layer.

9. The rotating field sensor according to claim 8, wherein the directions of magnetization of the magnetization pinned layers of the magnetoresistive elements in the second detection circuit are orthogonal to those of the magnetization pinned layers of the magnetoresistive elements in the first detection circuit.

10. The rotating field sensor according to claim 1, wherein:
the signal generation unit includes a first detection unit that detects the rotating magnetic field in a first position, and a second detection unit that detects the rotating magnetic field in a second position;
the first detection unit has a first detection circuit that detects an intensity of a component of the rotating magnetic field in a first direction and outputs a signal indicating the intensity, and a second detection circuit that detects an intensity of a component of the rotating magnetic field in a second direction and outputs a signal indicating the intensity;
the second detection unit has a third detection circuit that detects an intensity of a component of the rotating magnetic field in a third direction and outputs a signal indicating the intensity, and a fourth detection circuit that detects an intensity of a component of the rotating magnetic field in a fourth direction and outputs a signal indicating the intensity;
each of the first to fourth detection circuits includes at least one magnetic detection element;
the output signals of the first to fourth detection circuits vary periodically with the signal period;
the output signal of the third detection circuit differs from the output signal of the first detection circuit in phase;
the output signal of the fourth detection circuit differs from the output signal of the second detection circuit in phase;
the output signals of the first to fourth detection circuits include respective third error components that vary in synchronization with the output signals of the first to fourth detection circuits, respectively, each with a period of ⅓ the signal period; and the signal generation unit further includes:
- a first arithmetic circuit that generates the first signal based on the output signals of the first and third detection circuits, the first signal having a correspondence relationship with both the intensity of the component of the rotating magnetic field in the first direction and the intensity of the component of the rotating magnetic field in the third direction, the first signal including a smaller third error component than the third error components included in the output signals of the first and third detection circuits; and
- a second arithmetic circuit that generates the second signal based on the output signals of the second and fourth detection circuits, the second signal having a correspondence relationship with both the intensity of the component of the rotating magnetic field in the second direction and the intensity of the component of the rotating magnetic field in the fourth direction, the second signal including a smaller third error component than the third error components included in the output signals of the second and fourth detection circuits.

11. The rotating field sensor according to claim 10, wherein the first and second arithmetic circuits generate the first and second signals that are normalized to have the same amplitude.

12. The rotating field sensor according to claim 10, wherein:
- the output signal of the second detection circuit differs from the output signal of the first detection circuit in phase by an odd number of times ¼ the signal period;
- the output signal of the third detection circuit differs from the output signal of the first detection circuit in phase by an integer multiple of ⅙ the signal period other than an integer multiple of ½ the signal period; and
- the output signal of the fourth detection circuit differs from the output signal of the third detection circuit in phase by an odd number of times ¼ the signal period.

13. The rotating field sensor according to claim 10, wherein each of the first to fourth detection circuits includes, as the at least one magnetic detection element, a pair of magnetic detection elements connected in series.

14. The rotating field sensor according to claim 13, wherein each of the first to fourth detection circuits has a Wheatstone bridge circuit that includes a first pair of magnetic detection elements connected in series and a second pair of magnetic detection elements connected in series.

15. The rotating field sensor according to claim 13, wherein the magnetic detection elements are magnetoresistive elements.

16. The rotating field sensor according to claim 15, wherein each of the magnetoresistive elements has a magnetization pinned layer whose direction of magnetization is pinned, a free layer whose direction of magnetization varies according to the direction of the rotating magnetic field, and a nonmagnetic layer disposed between the magnetization pinned layer and the free layer.

17. The rotating field sensor according to claim 16, wherein:
- the directions of magnetization of the magnetization pinned layers of the magnetoresistive elements in the second detection circuit are orthogonal to those of the magnetization pinned layers of the magnetoresistive elements in the first detection circuit; and
- the directions of magnetization of the magnetization pinned layers of the magnetoresistive elements in the fourth detection circuit are orthogonal to those of the magnetization pinned layers of the magnetoresistive elements in the third detection circuit.

* * * * *